(12) United States Patent
Sasakura et al.

(10) Patent No.: US 8,918,906 B2
(45) Date of Patent: Dec. 23, 2014

(54) COMMUNICATION SERVICE SYSTEM

(75) Inventors: Shuhei Sasakura, Osaka (JP);
Katsuyuki Morita, Osaka (JP); Eiji Fukumiya, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/617,353

(22) Filed: Sep. 14, 2012

(65) Prior Publication Data

US 2013/0014285 A1 Jan. 10, 2013

Related U.S. Application Data

(63) Continuation of application No. PCT/JP2011/006086, filed on Oct. 31, 2011.

(30) Foreign Application Priority Data

Oct. 29, 2010 (JP) ................................. 2010-244205

(51) Int. Cl.
| G06F 17/30 | (2006.01) |
| G06F 7/04 | (2006.01) |
| H04N 7/16 | (2011.01) |
| G06Q 50/00 | (2012.01) |
| G06F 12/14 | (2006.01) |
| H04K 1/00 | (2006.01) |

(52) U.S. Cl.
CPC ............ *G06Q 50/01* (2013.01); *G60Q 30/0241* (2013.01)

USPC .................. 726/29; 726/26; 726/27; 380/251; 713/187

(58) Field of Classification Search
USPC ............ 726/29, 2–8; 713/168–174, 182–186, 713/202; 709/206, 225, 229, 249, 389
See application file for complete search history.

(56) References Cited

U.S. PATENT DOCUMENTS

| 5,870,767 | A | 2/1999 | Kraft, IV |
| 8,175,585 | B2 | 5/2012 | Ramer et al. |
| 8,176,118 | B2 | 5/2012 | Nagasaka et al. |
| 2001/0056463 | A1 | 12/2001 | Grady et al. |
| 2003/0074671 | A1* | 4/2003 | Murakami et al. ............ 725/109 |
| 2004/0140975 | A1 | 7/2004 | Saito et al. |

(Continued)

FOREIGN PATENT DOCUMENTS

| JP | 10-162030 | 6/1998 |
| JP | 2003-283981 | 10/2003 |

(Continued)

*Primary Examiner* — Evans Desrosiers
(74) *Attorney, Agent, or Firm* — Hamre, Schumann, Mueller & Larson, P.C.

(57) ABSTRACT

A communication service system includes a SNS server 1 that manages contents, and client terminals 10 to 30 that can make access to the SNS server 1 via a network 40. Each of the client terminals 10 to 30 includes a portion with which the client terminal can obtain an object. The SNS server 1 manages objects input by the client terminals 10 to 30, and allows a plurality of client terminals that are connected to the network 40 and browse the same content to share objects.

21 Claims, 45 Drawing Sheets

(56) References Cited

U.S. PATENT DOCUMENTS

| | | | |
|---|---|---|---|
| 2006/0167754 A1 | 7/2006 | Carro et al. | |
| 2006/0293909 A1 | 12/2006 | Miyajima et al. | |
| 2007/0107039 A1 | 5/2007 | Miyakawa et al. | |
| 2007/0245249 A1 | 10/2007 | Weisberg | |
| 2007/0282907 A1 | 12/2007 | Chambers | |
| 2009/0077472 A1* | 3/2009 | Bonforte | 715/753 |
| 2009/0138276 A1* | 5/2009 | Hayashida et al. | 705/1 |
| 2009/0177607 A1 | 7/2009 | Matsushima | |
| 2009/0212923 A1 | 8/2009 | Tokashiki et al. | |
| 2009/0240703 A1* | 9/2009 | Yoshino | 707/10 |
| 2009/0265432 A1 | 10/2009 | Suehiro | |
| 2009/0313304 A1 | 12/2009 | Goodger et al. | |
| 2010/0017709 A1* | 1/2010 | Wakai et al. | 715/273 |
| 2010/0121912 A1 | 5/2010 | Kawakami et al. | |
| 2010/0131385 A1* | 5/2010 | Harrang et al. | 705/26 |
| 2010/0169363 A1* | 7/2010 | Gaedcke | 707/769 |
| 2010/0202761 A1* | 8/2010 | Bhogal et al. | 386/124 |
| 2011/0041063 A1* | 2/2011 | Lee et al. | 715/733 |
| 2011/0067066 A1* | 3/2011 | Barton et al. | 725/46 |
| 2012/0011540 A1* | 1/2012 | Pulford | 725/32 |

FOREIGN PATENT DOCUMENTS

| | | |
|---|---|---|
| JP | 2004-139440 | 5/2004 |
| JP | 2004-157846 | 6/2004 |
| JP | 2006-508425 | 3/2006 |
| JP | 2006-146823 | 6/2006 |
| JP | 2006-285716 | 10/2006 |
| JP | 2007-159098 | 6/2007 |
| JP | 2008-020961 | 1/2008 |
| JP | 2008-092163 | 4/2008 |
| JP | 2008-133524 | 6/2008 |
| JP | 2008-186216 | 8/2008 |
| JP | 2008-278271 | 11/2008 |
| JP | 2008-305435 | 12/2008 |
| JP | 2009-064220 | 3/2009 |
| JP | 2009-176032 | 8/2009 |
| JP | 2009-199500 | 9/2009 |
| JP | 2009-301532 | 12/2009 |
| JP | 2010-165310 | 7/2010 |
| WO | 2007/026810 | 3/2007 |

* cited by examiner

| User Name | Content name | Purchase | Participation in community |
|---|---|---|---|
| User A | Weekly magazine A | ○ | ○ |
| | Weekly magazine B | ○ | ○ |
| | Weekly magazine C | ○ | ○ |
| | Monthly magazine A | ○ | ○ |
| | Monthly magazine B | ○ | ○ |
| | Monthly magazine C | ○ | ○ |
| | Novel A | × | × |
| | Novel B | × | × |
| | Business book | × | × |
| | Photo collection | ○ | ○ |
| User B | Weekly magazine A | × | × |
| | Weekly magazine B | × | × |
| | Weekly magazine C | × | × |
| | Monthly magazine A | × | × |
| | Monthly magazine B | × | × |
| | Monthly magazine C | × | × |
| | Novel A | ○ | ○ |
| | Novel B | ○ | × |
| | Business book | ○ | × |
| | Photo collection | × | × |
| User C | Weekly magazine A | × | × |
| | Weekly magazine B | × | × |
| | Weekly magazine C | ○ | ○ |
| | Monthly magazine A | × | × |
| | Monthly magazine B | × | × |
| | Monthly magazine C | ○ | × |
| | Novel A | ○ | ○ |
| | Novel B | ○ | ○ |
| | Business book | × | × |
| | Photo collection | × | × |

FIG. 8

```
Transmitting message
  User name: user A
  1. Select transmission destination
        ☑ User B
        ☐ User C
        ☐ User D
        ☐ User E
        ☐ User F
  2. Select content cited in message
```
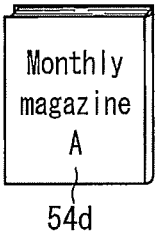
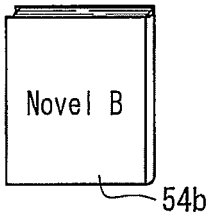
Weekly magazine A — 54c
Monthly magazine A — 54d
Novel B — 54b
```
  3. Input message
     [                                    ]
                                  [Transmit]
```
FIG. 22D

COMMUNICATION SERVICE SYSTEM

BACKGROUND

1. Field

The present application relates to a communication service system.

2. Description of Related Art

Patent Document 1 discloses a system that causes the latest advertisement to be reproduced at any time while allowing contents and advertisements to be distributed. Patent Document 2 discloses a system that allows annotations to digital contents of various types to be added by using a general annotation server, and allows annotation information to be shared among an unspecified number of users.

3. Prior Art Document

[Patent Document 1] JP2008-186216A
[Patent Document 2] JP2009-199500A

With the systems disclosed by Patent Documents 1 and 2, however, it is difficult to improve communication among users.

SUMMARY

A communication service system disclosed in the present application is a communication service system that includes a server and a plurality of clients, wherein the server manages the presence/absence of an authority for use of a content per client; authorizes the client who actually has the authority for use of the content to transmit an object to the server, the object being added to a display image displaying the content, with correspondence to a certain coordinate position in the display image; manages the object in association with the coordinate position in the display image displaying the content and authorizes the client who actually has the authority for use of the content to browse the content to which the object is added with correspondence to the coordinate position in the display image displaying the content.

A communication service system disclosed in the present application is a communication service system that includes a server and a plurality of clients, wherein the server manages the generation of an authority for use of a content per client; authorizes the client who actually has the authority for use of the content to transmit an object to the server, the object being added to a display image displaying the content, with correspondence to a certain coordinate position in the display image; manages the object in association with the coordinate position in the display image displaying the content; and authorizes the client who actually has the authority for use of the content to browse the content to which the object is added with correspondence to the coordinate position in the display image displaying the content.

A communication service system disclosed in the present application is a communication service system that includes a server and a plurality of clients, wherein the server manages the generation and extinction of an authority for use of a content per client; authorizes the client who actually has the authority for use of the content to transmit an object to the server, the object being added to a display image displaying the content, with correspondence to a certain coordinate position in the display image; manages the object in association with the coordinate position in the display image displaying the content; and authorizes the client who actually has the authority for use of the content to browse the content to which the object is added with correspondence to the coordinate position in the display image displaying the content.

BRIEF DESCRIPTION OF THE DRAWINGS

The figures depict one or more implementations in accordance with the present teachings, by way of example only, not by way of limitations. In the figures, like reference numerals refer to the same or similar elements.

FIG. 8 is an exemplary schematic diagram showing a management table held by a SNS server.

FIG. 22D is an exemplary schematic view showing a message transmission window.

DETAILED DESCRIPTION OF THE INVENTION

In the following detailed description, numerous specific details are set forth by way of examples in order to provide a thorough understanding of the relevant teachings. However, it should be apparent to those skilled in the art that the present teachings may be practiced without exemplary details. In other instances, well known methods, procedures, components, and/or circuitry have been described at a relatively high-level, without detail, in order to avoid unnecessarily obscuring aspects of the present concepts.

Embodiment 1

[1. Configuration of Communication Service System]

A communication service system according to the present embodiment (hereinafter referred to simply as "the system" in some cases) is explained.

It should be noted that the following explanation refers mainly to electronic books as contents handled by the present system, but this configuration can be applied to contents of other types (music, moving images, newspapers, games, etc.) in some cases. The application to contents of other types will be explained as appropriate.

The "objects" referred to in the description of the present embodiment are, for example, characters, graphics, and the like that are arbitrarily input by users by operating the client terminals 10 to 30. The "objects" may be images, sounds, etc., other than characters and graphics, and the forms thereof are not limited. A distribution range for a content and a distribution range for an object are different in some cases.

Besides, "contents" referred to in the description of the present embodiment include right-managed contents for which the reproduction rights are managed, and right-managed contents for which the viewing/listening rights are managed. The present embodiment is explained by referring to non-free contents as exemplary right-managed contents for which the reproduction rights are managed.

Figure 1:
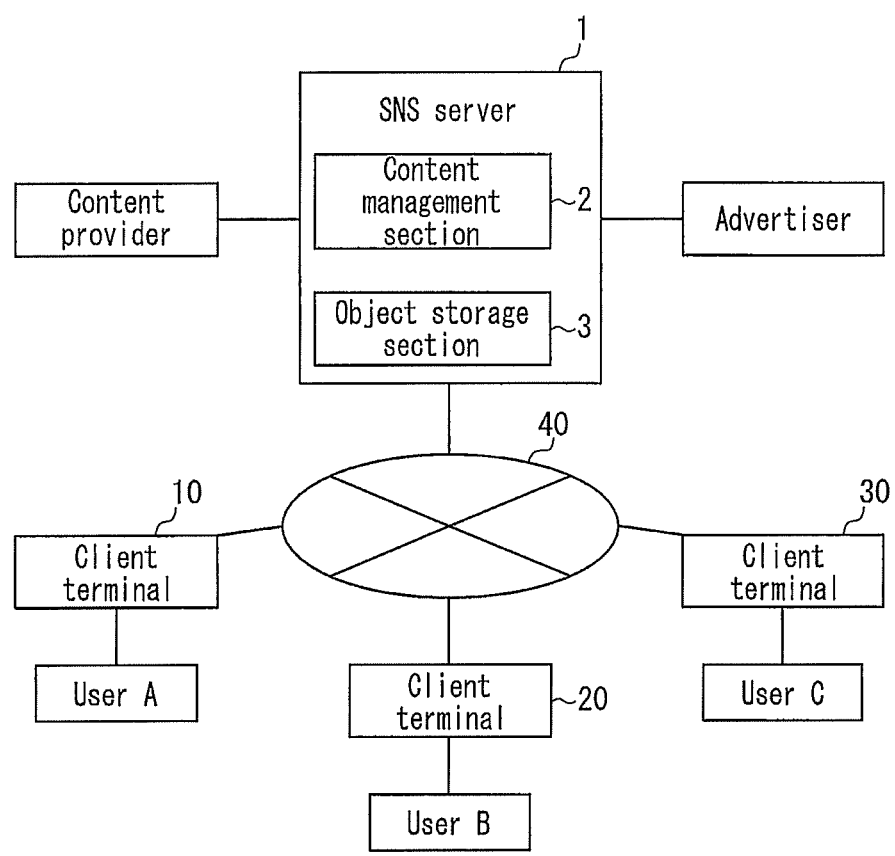
FIG. 1 shows an exemplary block diagram of a communication service system.

FIG. 1 is a block diagram showing an outline of a communication service system according to the present embodiment. As shown in FIG. 1, the communication service system includes a SNS (social network service) server 1, and client terminals 10, 20, and 30. The SNS server 1 and the client terminals 10 to 30 can be connected via a network 40 so as to be able to communicate with one another. It should be noted that the number of the client terminals shown in FIG. 1 is exemplary.

The SNS server 1 has SNS community functions. One of the SNS community functions is a community site. The SNS server 1 includes a content management section 2 that is capable of transmitting contents provided by content providers to the client terminals 10 to 30 in response to requests from the client terminals 10 to 30. The SNS server 1 has a function of transmitting advertisement information provided by advertisers to the client terminals 10 to 30. The SNS server 1 includes an object storage section 3 that is capable of storing objects transmitted from the client terminals 10 to 30.

Each of the client terminals 10 to 30 includes a communication portion that can be connected with the network 40 so as to be communicable therewith, an input portion (a touch panel, etc.) with which a user can input information, and a display portion (a display panel, etc.) that is capable of displaying information of various types such as a content. Each of the client terminals 10 to 30 can be realized with, for example, an information communication terminal, a portable telephone terminal, a personal computer having a communication function, or the like. In each of the client terminals 10 to 30, browser software for making access to a community site in the SNS server 1 is installed.

Examples of contents in the present embodiment include video information such as electronic books, newspapers, and scores, audio information such as music, video/audio information such as moving images, applications of various types of games and various types of tools, etc., but are not limited to these.

The network 40 is a network capable of connecting the SNS server 1 and the client terminals 10 to 30 with one another so that they are communicable with one another, and it is the Internet in the present embodiment. The network 40, however, is not limited to the Internet, and may be anything as long as it at least can connect the SNS server 1 and the client terminals 10 to 30 so that they are able to communicate with one another.

Figure 2:
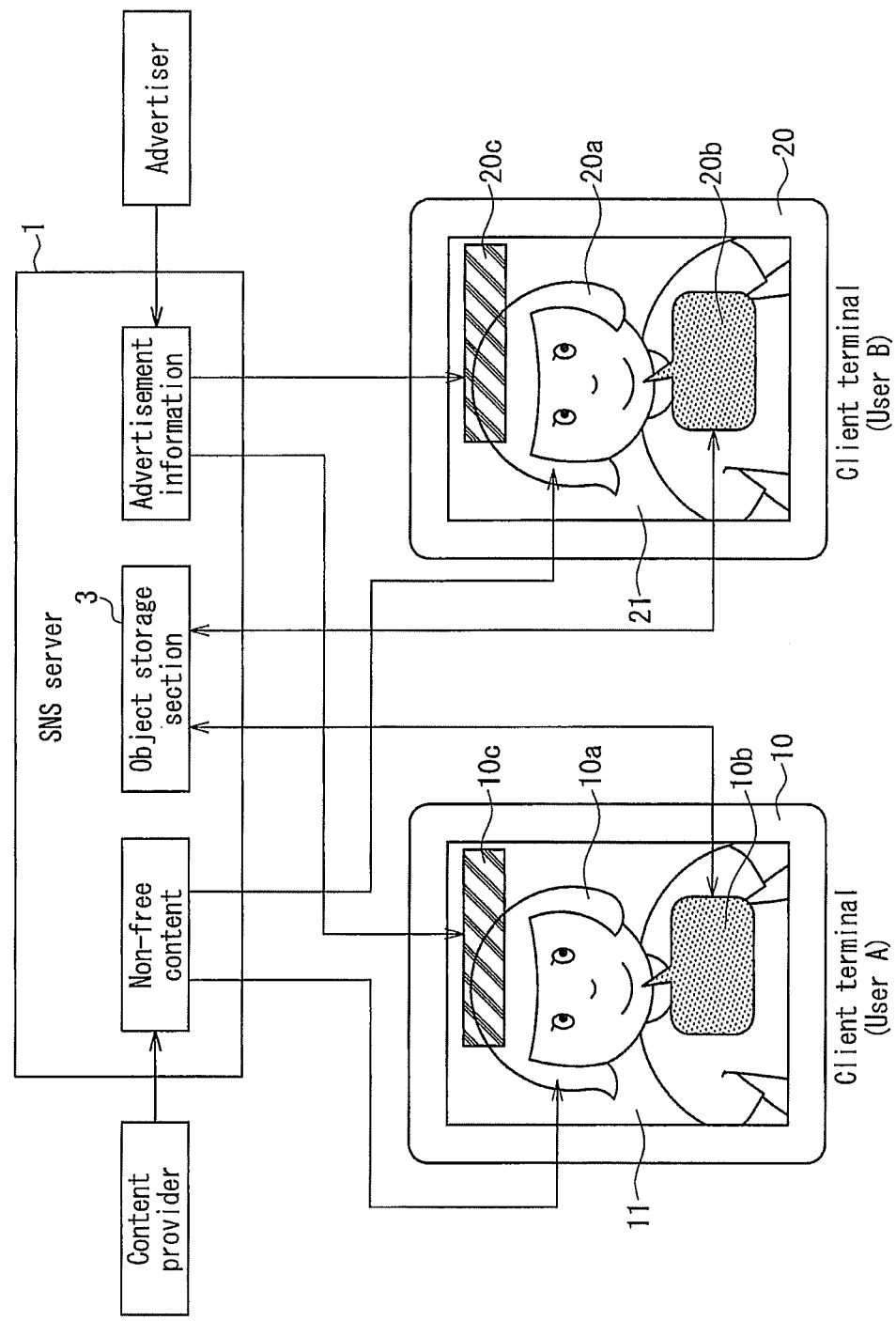
FIG. 2 is an exemplary schematic diagram showing a basic concept of the communication service system.
Figure 3:
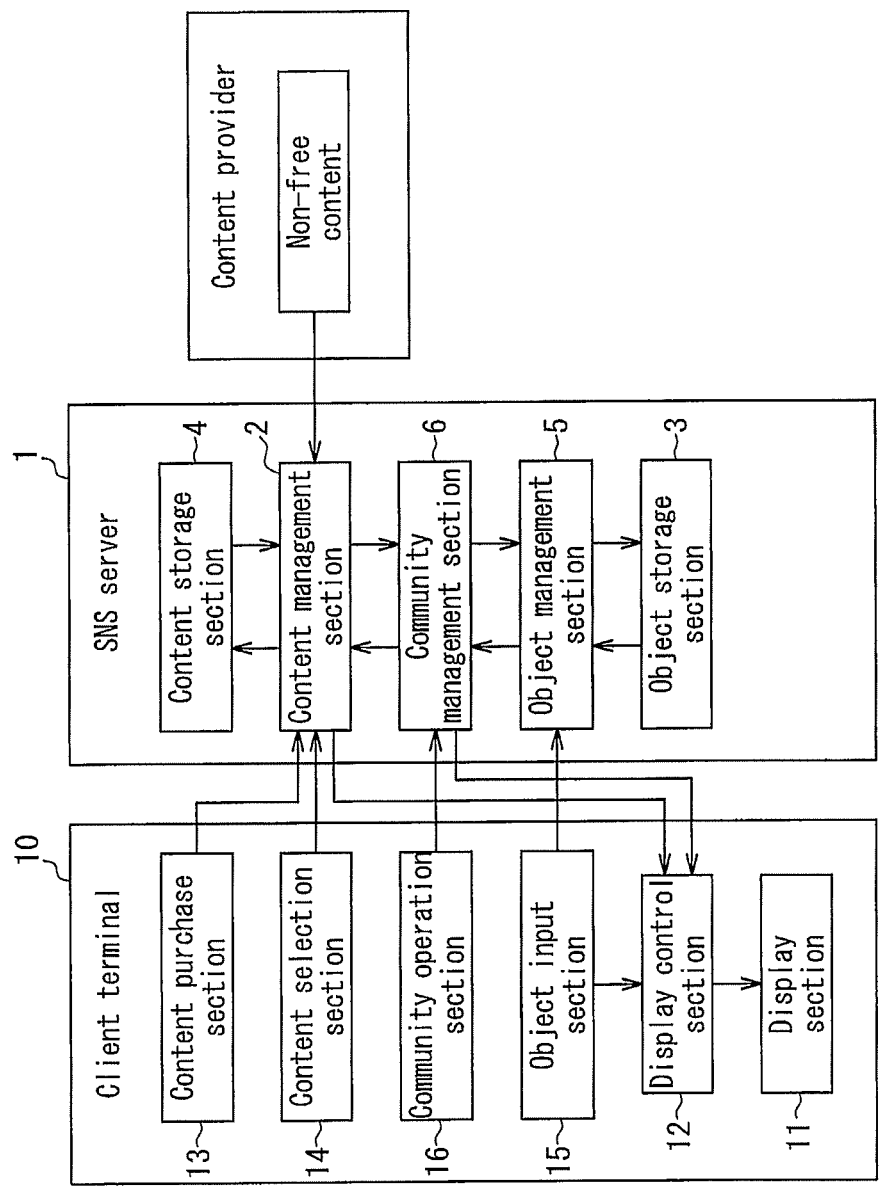
FIG. 3 is an exemplary block diagram showing a detailed configuration of the communication service system.

FIG. 2 is a schematic view showing an outline of operations of the communication service system according to the present embodiment. FIG. 3 is a block diagram showing configurations of the SNS server and the client terminal according to the present embodiment.

It should be noted that FIG. 3 shows the client terminal 10 alone, but each of the client terminals 20 and 30 shown in FIG. 1 has the same configuration. Besides, FIG. 2 illustrates a configuration in which the client terminals 10 and 20 are capable of displaying advertisement images, based on advertisement information transmitted from advertisers, but the function of transmitting advertisement information and the function of displaying advertisement images are not essential. The client terminals 10 and 20, and the SNS server 1 are connected so as to be able to communicate with one another via the Internet.

As shown in FIG. 3, the SNS server 1 includes a content management section 2, an object storage section 3, a content storage section 4, an object management section 5, and a community management section 6.

The content management section 2 manages contents provided by content providers. More specifically, the content management section 2 is capable of executing processing of writing contents into the content storage section 4, processing of reading contents from the content storage section 4, processing of receiving a content purchase instruction from the client terminal 10, processing of receiving a content selection instruction from the client terminal 10, processing of making a request for a content to a content provider, processing of transmitting a content to the client terminal 10, and the like.

The object storage section 3 stores an object sent from the object management section 5.

The content storage section 4 stores a content sent from the content management section 2.

The object management section 5 manages objects. More specifically, the object management section 5 is capable of executing processing of storing an object sent from the client terminal 10 in the object storage section 3, processing of reading an object from the object storage section 3, processing of sending an object to the community management section 6, and the like.

The community management section 6 manages a community site. More specifically, the community management section 6 has community information corresponding to a content, and is capable of transmitting a community site corresponding to the community information to a client terminal based on a request from the client terminal.

The client terminal 10 includes a display section 11, a display control section 12, a content purchase section 13, a content selection section 14, an object input section 15, and a community operation section 16.

The display section 11, controlled by the display control section 12, is capable of displaying images of various types. As shown in FIG. 2, the display section 11 is capable of displaying images of various types, for example, a content image 10*a*, an object 10*b*, and an advertisement image 10*c*. The display section 21 is capable of displaying images of various types, for example, a content image 20*a*, an object 20*b*, and an advertisement image 20*c*. Each of the display sections 11 and 21 includes a display panel capable of displaying images and the like, and a touch panel that is touched by a finger of a user, a stylus pen, or the like so that an arbitrary operation can be performed. The display panels provided in the display sections 11 and 21 can be realized with, for example, liquid crystal display panels. The touch panels provided in the display sections 11 and 21 can be realized with, for example, touch panels of the electrostatic capacitance type, the contact pressure detection type, etc. In each of the client terminals 10 and 20, software for detecting an operation of a finger of a user, a stylus pen, etc. with respect to the touch panel, and converting the detected contents into characters, graphics, etc. is installed. In other words, users are allowed to input arbitrary characters, graphics, etc. by making touch operations using the fingers or stylus pens with respect to the display sections 11 and 21.

It should be noted that as shown in FIG. 2, a content image 10*a* (20*a*) and an object 10*b* (20*b*) are displayed in a synthesized state on the display section 11 (21), but the SNS server 1 manages contents and objects separately.

The advertisement images 10*c* and 20*c* can be changed to advertisements suited to users. More specifically, it is possible for advertisers, book publishers, etc. to change the advertisement images 10*c* and 20*c* appropriately with advertisements suited to users based on marketing data. It should be noted that the style shown in FIG. 2 is a style in which advertisements with contents suited to users are displayed as the advertisement images 10*c* and 20*c* around a content or the like (so-called banner advertisements), but the configuration may be such that contents in an advertisement page in an electronic book such as a magazine are changed to contents suited to a user.

It should be noted that in the description of the present embodiment, an action of a user briefly touching an arbitrary position on a touch panel with the finger or a stylus pen is referred to as a "click". Operations generally referred to as "touch", "tap", etc. are operations identical to the click. Besides, an action of a user touching an arbitrary position on a touch panel with the finger or a stylus pen and sliding the finger or the stylus pen while keeping them in the touching state is referred to as a "drag". An operation of separating the finger or the stylus pen from the touch panel after the drag operation is referred to as a "drop".

The display control section 12 is capable of controlling objects sent from the object input section 15, content images sent from the content management section 2, images and the like of a community site sent from the community management section 6, etc. so that the images are displayed on the display section 11.

The content purchase section 13 receives a procedure operation by a user for purchasing a content. Contents of the purchase procedure operation received by the content purchase section 13 are sent to the content management section 2.

The content selection section 14 accepts an operation of selecting an arbitrary content (a browsing request, etc.). The contents of the content selection operation accepted by the content selection section 14 are sent to the content management section 2.

The object input section 15 accepts an operation of inputting an arbitrary object by a user. More specifically, the object input section 15 is a portion capable of inputting an arbitrary character, graphic, etc. at an arbitrary position on the content displayed on the display section 11 by operating a touch panel provided in the display section 11.

The community operation section 16 is capable of executing an arbitrary operation in a community site displayed on the display section 11.

[2. Content Browsing Operation]

Figure 4:
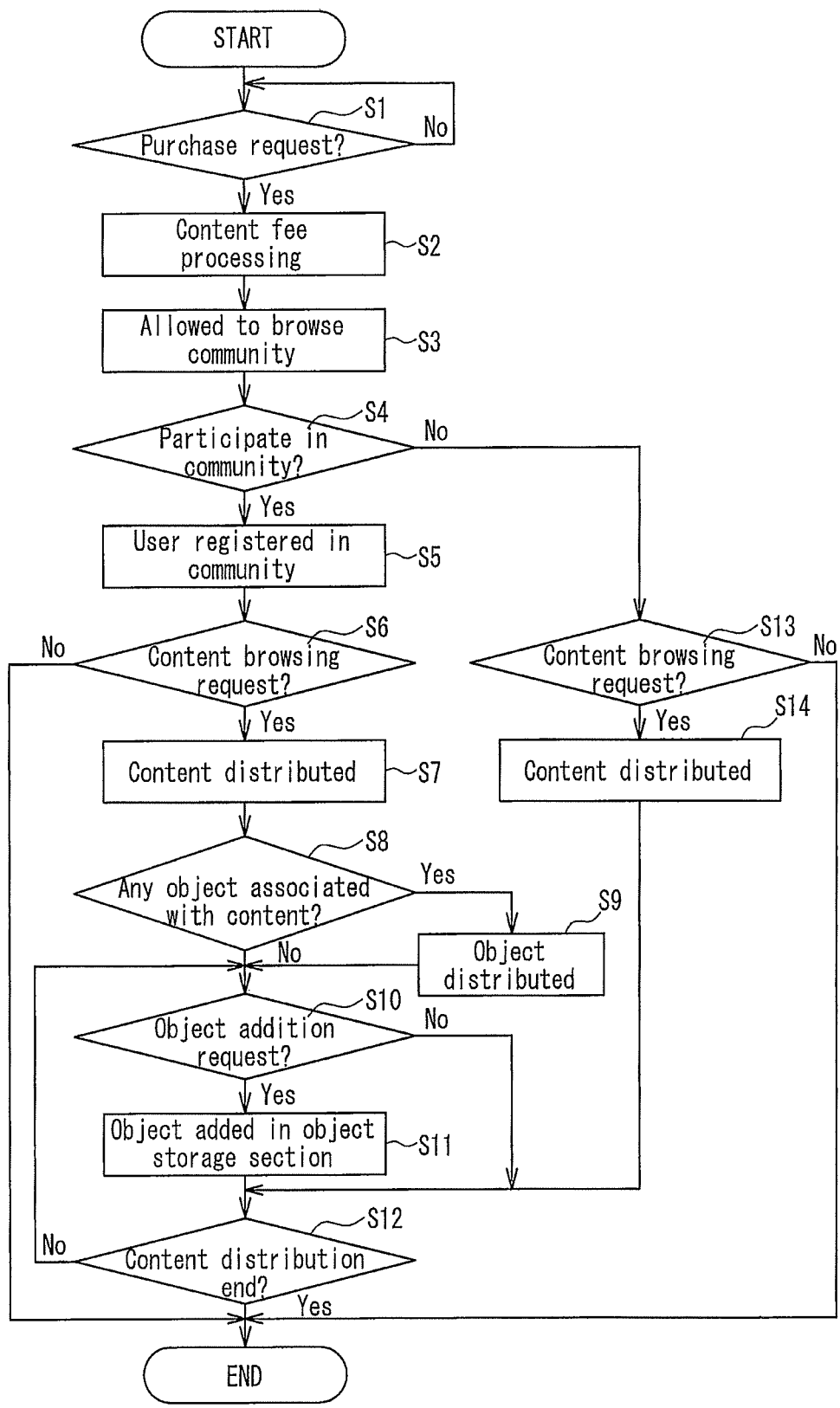
FIG. 4 is an exemplary flowchart showing a basic operation of the communication service system.

FIG. 4 shows an operation flow of a system according to the present embodiment.

It should be noted that in the following description, electronic books that are distributed for value are mentioned as exemplary contents. Since electronic books are mentioned as exemplary contents dealt with in the description of the present embodiment, the action of a user checking the contents of a content is referred to as "browsing". However, in the case where the content involved includes videos and audios as is the case with a moving image, the action of a user checking the contents of a content is referred to as "viewing/listening", and in the case where the content involved includes audios alone as is the case with music, the action of a user checking contents of a content is referred to as "listening".

In the present system, in the case where a user browses a content, for example, the user first operates the client terminal 10 so as to execute the procedure for purchasing an arbitrary content. More specifically, the user operates the content purchase section 13 so as to make a request for purchasing the arbitrary content to the SNS server 1 (S1).

It should be noted that the present embodiment is explained under an assumption that users and client terminals correspond one to one. In the case where a client terminal is possibly used by an unspecified number of users, it is necessary that a user be identified with a log-in procedure when he/she starts using a client terminal. For example, the log-in procedure is carried out by determining whether or not a user ID and a password input by a user are valid.

The content management section 2, upon receiving a purchase request from the content purchase section 13, sends information about a content fee to the content purchase section 13 (S2).

The user is allowed to browse the arbitrary content by paying the content fee thus charged. For example, the user can pay the content fee by inputting a credit card number of the like on a payment window (not shown). The content, which can be browsed, is displayed on the user's own top page, in a list form, an icon form, or the like, as shown in FIG. 5 (S3).

Figure 5:
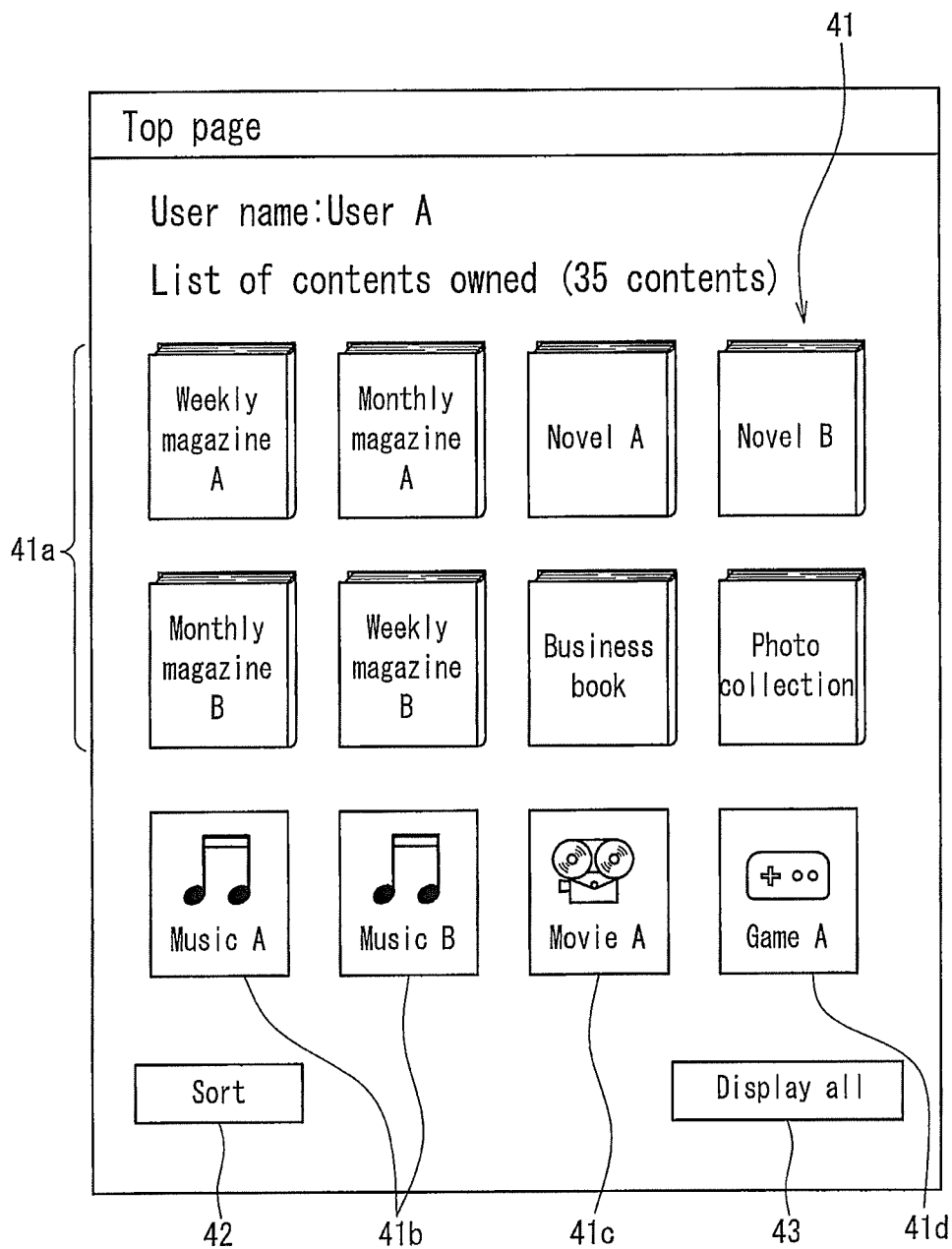
FIG. 5 is an exemplary schematic diagram showing a top page.

It should be noted that the top page shown in FIG. 5 is a window that is transmitted from the SNS server 1 and is displayed on the display section 11 of the client terminal 10, and operates on the browser software installed in the client terminal 10. In the example shown in FIG. 5, contents owned by a user (e.g., the user A) are displayed on the top page in the icon form (reference numeral: 41). For example, a content icon 41a in FIG. 5 is an icon corresponding to a book content such as an electronic content owned by the user. A content icon 41b is an icon that corresponds to a music content owned by the user. A content icon 41c is an icon corresponding to a moving image content of a movie owned by the user. A content icon 41d is an icon corresponding to a game content owned by the user. It should be noted that "owing" indicates that a non-free content is made browsable by paying the fee for the content. It should be noted that cases indicated by the phrase of "the case where a client has an authority for the use of the content" include a case where a user using a client terminal "owns" the content.

For example, the SNS server 1 can cause content icons 41a to 41d and the like to be displayed by the display 11 of the client terminal 10, by transmitting, to the client terminal 10, information for causing content icons for contents owned by a user to be displayed (content display information). Thus, with the content icons of the contents owned by the user being displayed by the client terminal 10, the user easily can manage and browse the contents after the purchase of the contents. Particularly, with a configuration of the SNS that allows the user to manage contents on his/her own top page, the user is allowed to easily browse the contents, and is allowed to communicate with other users via objects displayed together with the content that the user is browsing.

A sort button 42 shown in FIG. 5 is a button with which listed contents displayed in a content list 41 can be sorted in an arbitrary order. With a click of the sort button 42, for example, a pull-down menu is displayed. The pull-down menu indicates selectable orders, and by selecting an arbitrary order out of the orders indicated in the pull-down menu, the content icons can be rearranged in the arbitrary order. Exemplary sorting orders include the alphabetical order of the names of contents, the order of the Japanese syllabary of the names of contents, the order of the types of contents, the chronological order of purchase dates and times of contents, the order of most favorite to least, and the order of popularity. The order of popularity can be presumed based on the number of objects associated with each content, the reproduction history of each content, and the like. As the sorting order, either of the ascending order or the descending order may be selected. It should be noted that the provision of the sorting button 42 is not essential.

With a display all button 43 shown in FIG. 5, when clicked in the case where only a part of the contents owned are displayed in the content list 41, the window is caused to shift to a state in which all the content icons are displayed. Here, in the case where the number of all the contents is so large that it is difficult to display all the content icons in the display area of the display section 11, it is preferable that the intervals of the displayed content icons are reduced, that the size of each content icon is reduced, that only the names of contents are displayed in a list form, of the like. It should be noted that the provision of the display all button 43 is not essential.

Figure 6:
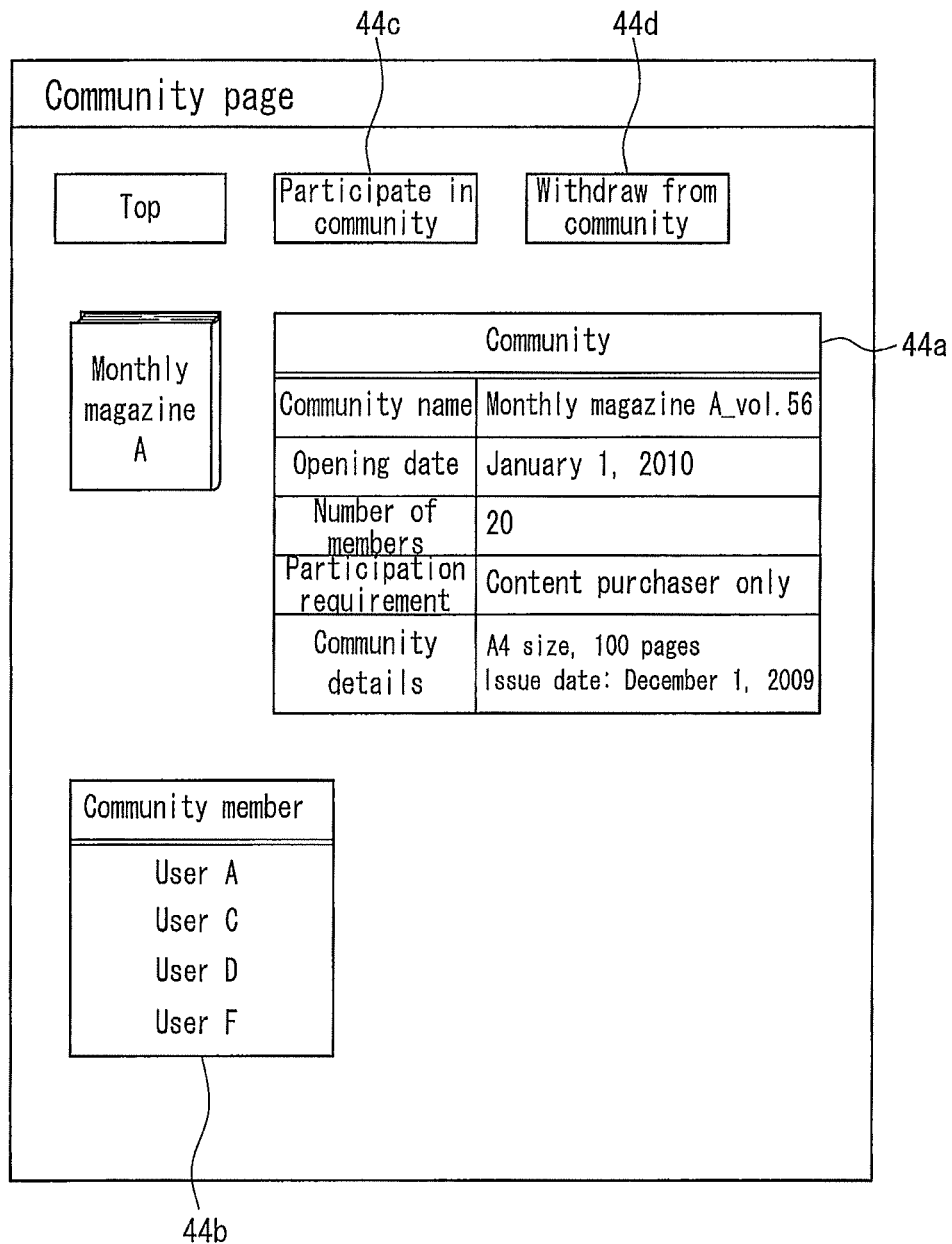
FIG. 6 is an exemplary schematic diagram showing a community page.

Next, the user can select whether or not he/she participates in the community or not. More specifically, after the purchase procedure for the content is completed, the community management section 6 authorizes the user who has purchased the content to browse a community page. FIG. 6 shows an exemplary community page. The community page shown in FIG. 6 includes information 44a of the community, a list 44b of members who have purchased contents and participate in the community, a registration button 44c for participation in the community, and a withdrawal button 44d for withdrawal from the community. In the case where a user participates in a community, he/she operates the community operation section 16 and clicks the registration button 44c shown in FIG. 6, so as to execute an operation for participating in a community associated with an arbitrary content. On the other hand, in the case where a user withdraws from a community, he/she operates the community operation section 16 and clicks the withdrawal button 44d shown in FIG. 6, so as to execute an operation for withdrawing from a community associated with an arbitrary content. It should be noted that information carried on the community page shown in FIG. 6 is exemplary (S4).

When a user operates the community operation section 16 and clicks the registration button 44c shown in FIG. 6, the community management section 6 adds, to the community, user information about the user who has executed the foregoing operation (S5). On the other hand, when the user operates the community operation section 16 and clicks the withdrawal button 44d shown in FIG. 6, the community management section 6 deletes the user information about the user who has executed the foregoing operation from the community (not shown).

For example, when the registration button 44c is clicked at the client terminal 10, the client terminal 10 transmits, to the SNS server 1, information indicating that the user is willing to participate in the community. The user clicks the registration button 44c to participate in the community, and this results in he/she disclosing that he/she owns the content, to the other users who own the same content. Therefore, "the information indicating that the user is willing to participate in the community" can be regarded as disclosure/non-disclosure information that indicates whether or not that the user owns the same content is to be disclosed to the other users.

In the case where the received disclosure/non-disclosure information indicates disclosure, the SNS server 1 can cause the fact that the user owns the same content to be disclosed to the other users. In other words, in this case, the participation of the user in the community is set. Besides, in the case where the disclosure/non-disclosure information is not received from the client terminal 10, or in the case where the received disclosure/non-disclosure information indicates non-disclosure, the SNS server 1 can cause the fact that the user owns the same content to be not disclosed to the other users. In other words, in this case, the non-participation of the user in the community is set.

Thus, whether or not the user participates in the community associated with the content can be selected according to the user's choice. Therefore, the system is sufficiently capable of responding to a demand of a user who does not wish for communication on the SNS, or a user who does not wish the other users to know his/her purchase of a content.

Next, when the user operates the content selection section 14 and selects an arbitrary content (S6), the content management section 2 makes a request for the selected content to the content provider. The content management section 2, when receiving the content provided by the content provider, stores the provided content in the content storage section 4 temporarily, while authorizing the client terminal 10 to browse the content. The display control section 12 of the client terminal 10 controls the display section 11 so that a video of the content transmitted from the content management section 2 thereto is displayed on the display section 11. Thus, the user is allowed to browse an arbitrary content. It should be noted that an operation of the content management section 2 of causing a content to be stored in the content storage section 4 is an operation of temporary storage needed for, for example, streaming transmission to the client terminal 10, and the content stored is deleted from the content storage section 4 after the browsing is finished (S7).

Here, the community management section 6 controls the object management section 5 so that the object management section 5 reads out objects associated with the content that the user is to browse. The object management section 5 checks whether or not there is any object associated with the content that the user is to browse (S8), and if there is any, the object management section 5 reads out the object from the object storage section 3. The community management section 6 overlays the object read out of the object storage section 3 by the object management section 5 on the video of the content. The display control section 12 controls the display section 11 so that the video of the content on which the object is overlaid, which is transmitted from the community management section 6, is displayed by the display section 11. It should be noted that the method for displaying the object is to be described later (S9).

When the user, while browsing the content, makes an operation for creating an object by operating the object input section 15 (S10), the object created by the user is caused by the display control section 12 to be displayed by the display section 11, and at the same time, the object is transmitted to the object management section 5. The object management section 5 stores the created object in the object storage section 3. It should be noted that an exemplary method for creating an object is a method of inputting arbitrary characters and graphics by operating the touch panel (S11).

Figure 11:
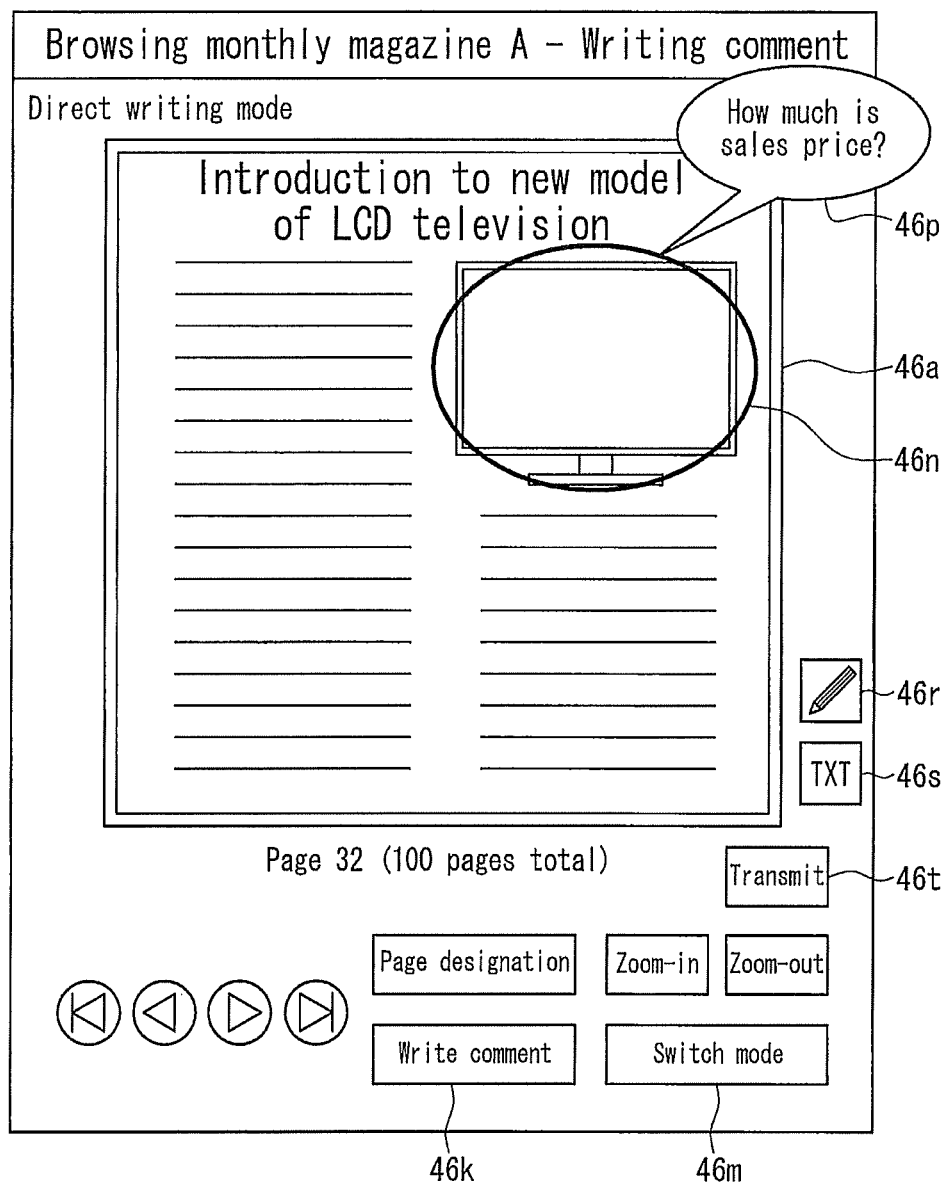
FIG. 11 is an exemplary schematic diagram showing the content browser window in which an object is written.

Here, in the case where the same content as the content that the user is browsing is browsed by another user via the SNS server 1, the object created by the user is transmitted also to the content browsed by the another user. For example, as shown in FIG. 2, while a user A is browsing an arbitrary content 10a with the client terminal 10 and a user B is browsing the same content 20a as the content 10a with the client terminal 20, if the user A adds a new object 10b by operating the client terminal 10, the information of the added object 10b is sent to the client terminal 20 via the SNS server 1. At the client terminal 20, an object 20b having the same details as those of the object 10b is displayed. Likewise, in the case where the user B adds a new object by operating the client terminal 20, the same object as the added object is displayed at the client terminal 10. An object is transmitted to the SNS server 1 by, for example, a user operating the touch panel of the client terminal 10, inputting frame lines in arbitrary shapes, characters, and the like, and clicking a transmission button displayed on the display section 11 (the illustration of the transmission button is omitted in FIG. 2, and it is illustrated in FIG. 11 and the like as a transmission button 46t). It should be noted that the configuration may be such that immediately after an object is created by one user, or while an object is being created by one user, the object is displayed on a client terminal of another user. With such a configuration, comments can be exchanged promptly.

The above-described operations are executed until the user executes an operation for stopping browsing the content (S12).

It should be noted that in the case where the user does not participate in the community (decision of "No" at S4), the content management section 2 waits for a content browsing request from the content selection section 14. When the user operates the content selection section 14 and selects an arbitrary content (S13), the content management section 2 makes a request for the selected content to the content provider. The content management section 2, when provided with the content by the content provider, stores the provided content in the content storage section 4, and at the same time, authorizes the client terminal 10 to browse the content. The display control section 12 of the client terminal 10 controls the display section 11 so that a video of the content transmitted from the content management section 2 thereto is displayed on the display section 11. Thus, the user can browse an arbitrary content. However, the user cannot browse an object, since the user does not participate in the community (S14).

The configuration referred to in the foregoing description is the following configuration: in the case where a user browses a content by operating a client terminal, the SNS server 1 makes a request for the content to a content provider, and the SNS server 1 stores the content provided by the content provider in the content storage section 4, while authorizing the client terminal to browse the content, and after the end of the browsing of the content, the SNS server 1 deletes the content stored in the content storage section 4. However, the configuration may be such that the SNS server 1 has the content provided by the content provider left in the content storage section 4 after the end of the browsing as well.

[3. Configuration of Community]

The SNS server 1 creates a community per content. As shown in FIG. 6, a user who does not own a content is allowed to browse pages up to a community page that displays an outline of a community as shown in FIG. 6. In the case where a user is to participate in the community, however, the user has to own the content.

Figure 7:
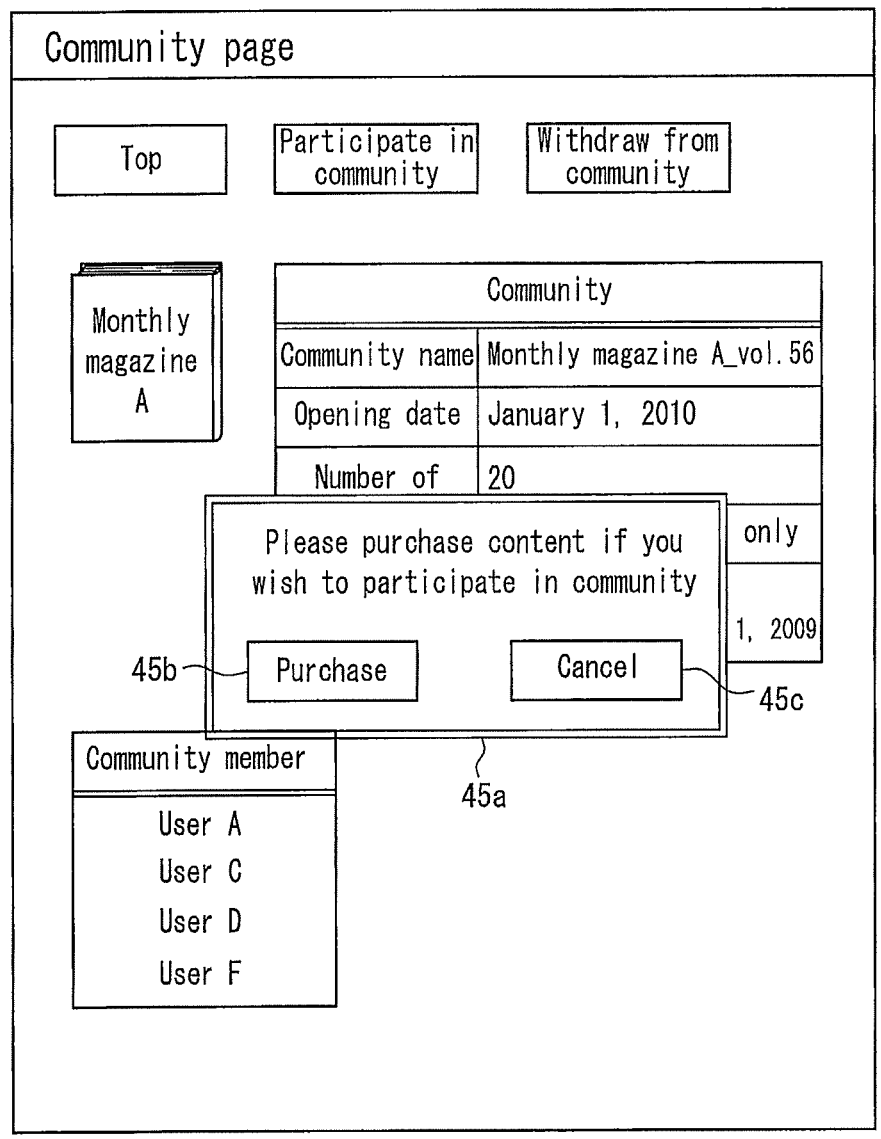
FIG. 7 is an exemplary schematic diagram showing a community page.

A user who does not own the content cannot participate in the community. For example, if a user who does not own the content operates a client terminal and clicks the registration button 44c shown in FIG. 6, the SNS server 1 controls the client terminal so that a message window 45a shown in FIG. 7 is displayed. If the user clicks a purchase button 45b in the state in which this message window 45a is displayed, the client terminal sends a purchase request for purchasing the content to the SNS server 1, and proceeds to the content purchase procedure. When the purchase of the content is completed, the user can participate in the community. On the other hand, if the user clicks a cancel button 45c in the message window 45a, the SNS server 1 closes the message window 45a, and without authorizing participation in the community, the SNS server 1 causes the display on the client terminal to shift to the community page shown in FIG. 6.

It should be noted that the SNS server 1 has a function of managing users and contents. FIG. 8 is a management table showing contents owned by each user and a state of participation of each user in a community. "User name" shown in FIG. 8 indicates the names of users who own contents. "Content name" indicates the names of contents managed by the SNS server 1. "Purchase" indicates whether or not each content has been purchased: "○" means that the content has been purchased already, and "x" means that the content has not been purchased yet. "Participation in community" indicates a state of participation in a community of each content: "○" means participation in the community, and "x" means non-participation in the community. It should be noted that the management table shown in FIG. 8 is exemplary The SNS server 1 manages users and contents based on the management table shown in FIG. 8.

Further, a community can be configured to exist per content in the SNS server 1. Therefore, a user who has purchased contents can participate in individual communities of the respective contents. For example, in the case where a user owns a plurality of contents as indicated by the content list 41 shown in FIG. 5, the user can participate in each of communities that exist for the contents, respectively. Further, as shown in FIG. 6, with the member list 44b shown in the community page, members who participate in the community concerned can be grasped. For example, the example shown in FIG. 6 indicates that users A, C, D, and F participate in a community for a monthly magazine A, No. 56.

Figure 9:
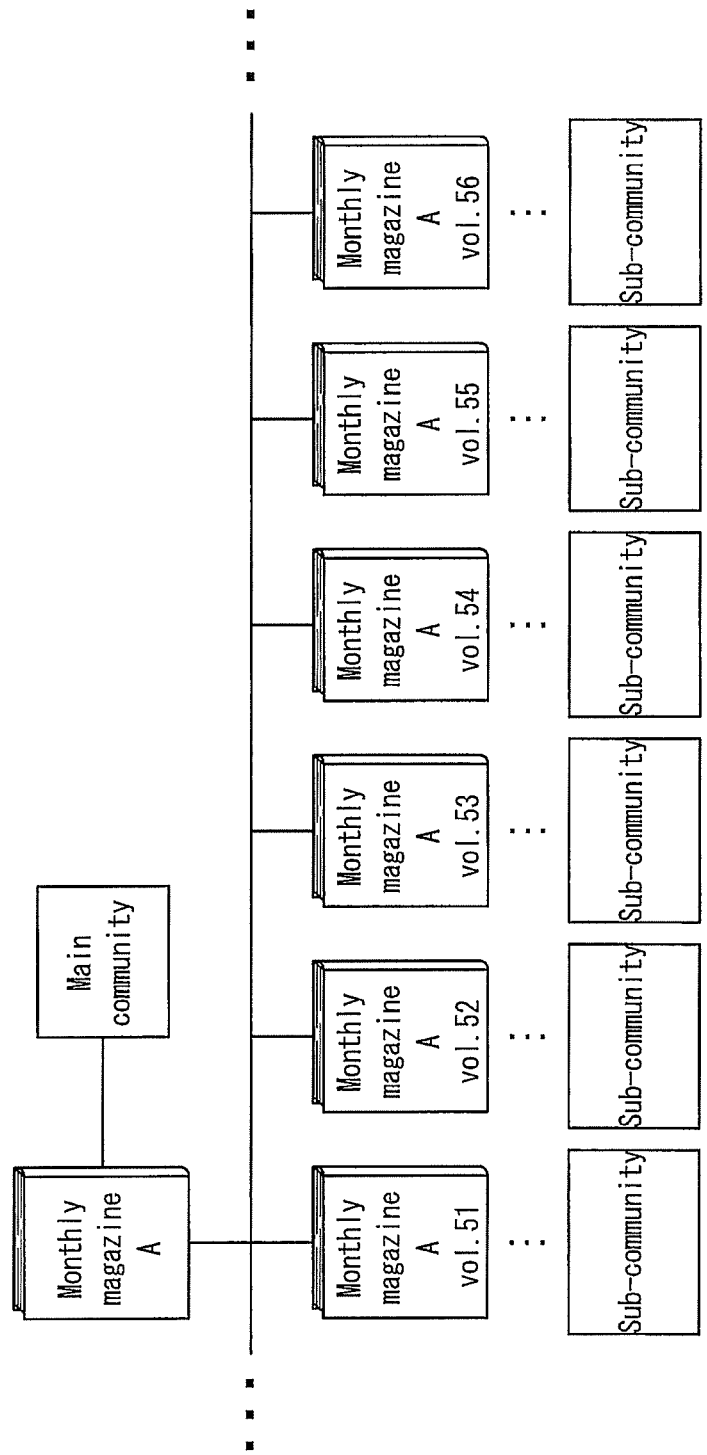
FIG. 9 is an exemplary schematic diagram showing a relationship between contents and communities.

As communities, there are main communities and sub-communities. FIG. 9 shows a hierarchy of communities. In the case of a book that is published regularly such as a weekly magazine or a monthly magazine, there are individually numbered editions for each magazine. In the case of a book such as a novel or a comic, there are multiple volumes under one title in some cases. In the case where thus there are numbered editions or volumes for one kind of a book, the SNS server 1 creates a main community for the kind of the book, as well as a sub-community for each numbered edition or volume. For example, a community of a monthly magazine A shown in FIG. 9 is composed of a main community corresponding to the monthly magazine A, and sub-communities corresponding to numbered editions (e.g., No. 51 to No. 56) of the monthly magazine A. The SNS server 1 authorizes a user to participate in the main community of the monthly magazine A as long as the user participates in at least one sub-community of a plurality of sub-communities of the same. The SNS server 1, however, does not authorize the user to participate in a sub-community corresponding to an edition of the magazine that the user does not own. For example, in the case where a user owns the edition No. 56 of the monthly magazine A, the user can participate in the main community of the monthly magazine A, but cannot participate in sub-communities except for the sub-community corresponding to the edition No. 56 of the monthly magazine A. The phrase of "associated contents" means, for example, contents that are same kind of a book and are different numbered editions or different volumes of a book, respectively.

It should be noted that an object written in a page for a trailer of a next edition of a magazine, a next episode of a serial drama, or the like can be displayed in the community for the next edition or episode that is created when the next edition or episode is put into market.

Though the foregoing description explains the case where contents are electronic books, this configuration can be applied to contents of other types.

In the case where contents are music, the SNS server 1 can create communities for, for example, each piece, each album, each singer, etc. For example, a user who has purchased an album can participate in a community for the album, and communities for respective pieces contained in the album. A user who has purchased a piece can participate in a community for the piece and a community for an album that contains the piece, but cannot participate in communities for the other pieces contained in the album.

In the case where contents are moving images, the SNS server 1 can create communities for, for example, each moving image file, each movie title, each performer in movies, each movie production company, etc.

In the case where contents are newspapers, the SNS server 1 can create communities for, for example, each newspaper name, each publication date, each type of newspapers (local newspapers, economic newspapers, sport journals, etc.), etc.

In the case where contents are games, the SNS server 1 can create communities for, for example, each title of games, each series of games, each game production company, etc.

[4. Method for Displaying Contents and Objects]

Figure 10:
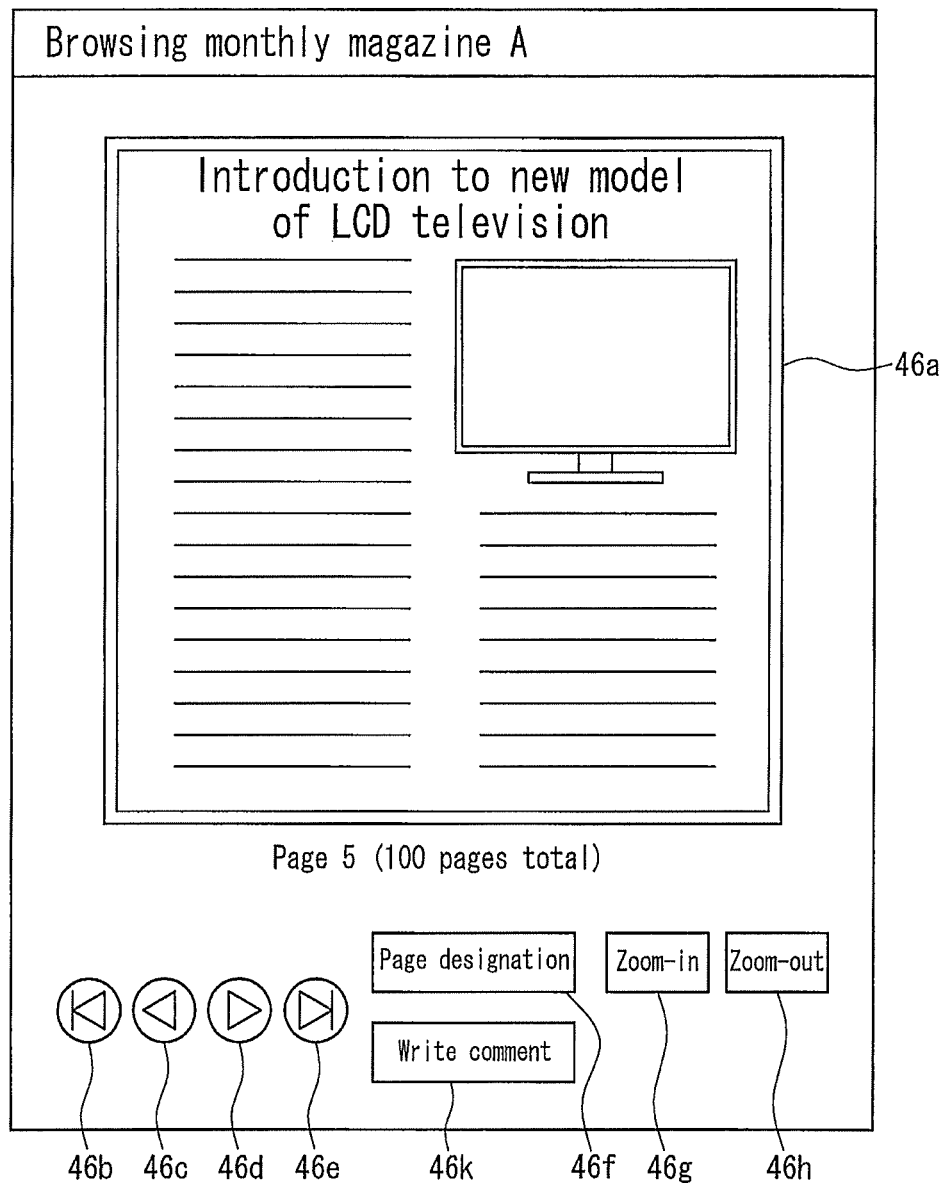
FIG. 10 is an exemplary schematic diagram showing a content browser window.

FIG. 10 is a schematic diagram showing a state in which electronic books are displayed on a display section of a client terminal, as an exemplary display of contents. FIG. 10 shows an exemplary content browser window.

When contents are browsed, the SNS server 1 causes a display section of a client terminal to display a content image 46a, a "go to top" button 46b, a "previous page" button 46c, a "next page" button 46d, a "go to bottom" button 46e, a page designation button 46f, a zoom-in button 46g, a zoom-out button 46h, and an object input button 46k, as shown in FIG. 10. With the "go to top" button 46b, an operation for switching the display to a top page of an electronic book can be carried out. With the "previous page" button 46c, an operation for switching the display from the currently displayed page to one page back can be carried out. With the "next page" button 46d, an operation for switching the display from the currently display page to one page ahead can be carried out. With the "go to bottom" button 46e, an operation for switching the display to the last page of an electronic book can be carried out. With the page designation button 46f, an arbitrary page number can be designated, and an operation for switching the display to the designated page can be carried out. With the zoom-in button 46g, an operation for zooming in the display of the whole or an arbitrary part of the content image 46a can be carried out. With the zoom-out button 46h, an operation for zooming out the display of the whole or an arbitrary part of the content image 46a can be carried out. The object input button 46k is operated when a user inputs an object such as arbitrary comments. It should be noted that the various kinds of buttons shown in FIG. 10 are exemplary.

When a user operates the object input button 46k in a state where the content image 46 is displayed as shown in FIG. 10, the SNS server 1 causes the content browser window to shift to a mode in which an object can be input.

Figure 12:
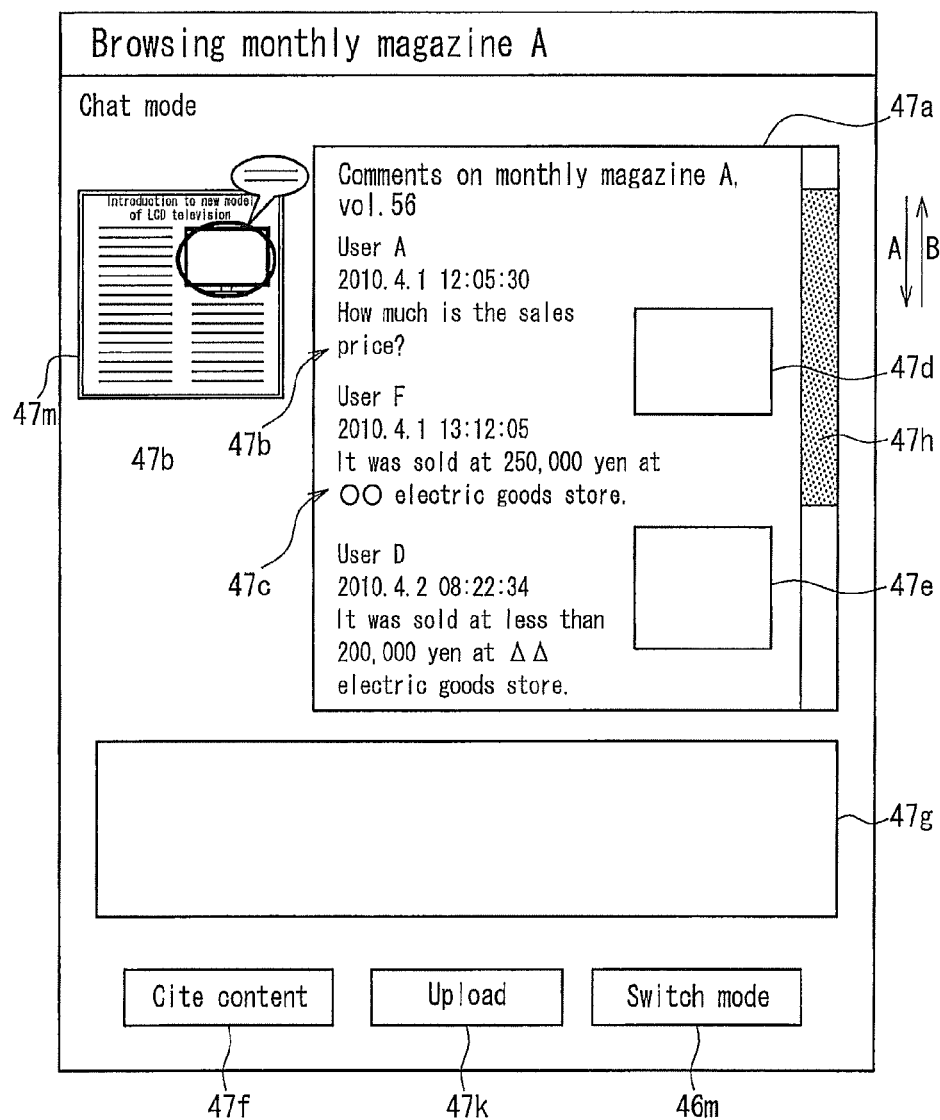
FIG. 12 is an exemplary schematic diagram showing the content browser window that is operating in a chat mode.

As methods for displaying objects, the following methods are available: a method of displaying the object in such a manner that the object is overlaid on a content as shown in FIG. 11 (direct writing mode); and a method of displaying comments in the chronological order of input date and time, and citing and displaying a content as shown in FIG. 12 (chat mode). The method for displaying objects can be switched by clicking a mode switch button 46m. When the mode switch button 46m is clicked in the direct writing mode shown in FIG. 11, the SNS server 1 switches the method for displaying objects to the chat mode shown in FIG. 12.

For example, when the mode switch button 46m is clicked in the direct writing mode (first display style) shown in FIG. 11, the client terminal 10 transmits, to the SNS server 1, display style selection information for switching the display to the chat mode (second display style). On the other hand, for example, when the mode switch button 46m is clicked in the chat mode (second display style) shown in FIG. 12, the client terminal 10 transmits, to the SNS server 1, display style selection information for switching the display to the direct writing mode (first display style). The SNS server 1 determines the display style for displaying objects and contents (the direct writing mode or the chat mode) based on the display style selection information transmitted from the client terminal 10.

[4-1. Direct Writing Mode]

In the direct writing mode shown in FIG. 11, an object can be input at such a position that the object is overlaid on the content image 46a, with use of a line 46n, a balloon 46p, etc. For example, an object is arranged in a higher layer displayed in an overlaid state over a content. Thus, by overlaying an object on a content by arranging the object in a higher layer, the object is displayed in the vicinity of an associated portion of the content. In the case where a display area of the content and a display area of the higher layer coincide with each other, the object is added, with correspondence to a certain coordinate position in a display image displaying the content. In this case, the SNS server 1 manages the object in association with the coordinate position in the display image displaying the content. Therefore, the user can communicate with other users easily, without explaining the position on the content. It should be noted that the line 46n and the balloon 46p are exemplary objects.

The line 46n and the balloon 46p can be written by, for example, clicking a line input button 46r and thereafter tracing a position on a touch panel corresponding to an arbitrary position on the content image 46a with a finger or a stylus pen. In other words, the line that can be input after clicking the line input button 46r is a free curve.

Comments written in the balloon 46p can be input with a software keyboard or the like. More specifically, when a user clicks the text button 46s and clicks the balloon 46p, the SNS server 1 causes a display section of a client terminal to display a software keyboard. The software keyboard (illustration is omitted) is software with which an arbitrary character can be input by clicking an arbitrary key of a virtual keyboard an image of which is displayed on the display section.

Objects such as the line 46n and the balloon 46p shown in FIG. 11 are shared with the other users via the SNS server 1. More specifically, objects such as the line 46n and the balloon 46p are stored in the object storage section 3 of the SNS server 1 together with position information about its position in a content (position information such as a page, a time, a frame, a coordinate in a frame, etc.). When the content is browsed by another client terminal, the SNS server 1 sends the object together with the content to the another client terminal, and at the same time, arranges the object at the predetermined position (a page, a time, a frame, a coordinate in a frame, etc.) in the content, based on the position information read out of the object storage section 3. With this, the content in which the object is arranged at the same position can be displayed at the another client terminal. It should be noted that position information of an object may not be exclusively a position defined by a large unit such as a page, a time, a frame, etc., but may be a position defined by a smaller unit such as an image, a sentence, etc., so that an object can be positioned with respect to a content even if the concept of a page or the like is ambiguous.

Thus, in the direct writing mode, an object can be displayed in an overlaid state on a content. Therefore, the associativity between a content and an object can be increased, so that other users than the user who has input the object, when viewing the content, can intuitively understand contents of the object.

Besides, in the direct writing mode, a diagram can be used as an object. Therefore, the degree of freedom in inputting an object is increased. For example, in the case of an electronic book, when an arbitrary portion in an arbitrary page is designated, the portion can be encircled with the line 46n. Therefore, the arbitrary portion can be designated clearly.

It should be noted that objects are not limited to characters or graphics, but may be composed of images and sounds. In the case where a sound is used as an object, it may be an object hyperlinked to a sound file that is created separately.

Further, an object can be carried not only at a position at which it is overlaid on the content image 46a. The object can be carried at a position where the content image 46a is not present, as long as it is in a range where the touch panel can be operated.

Further, not only the line input button 46r, but also a circle input button, a rectangle input button, a balloon input button, and the like may be provided. A user can input not only a free curve but also a diagram in a circular shape, a rectangular shape, a balloon shape, or the like, as an object, by selecting any of these buttons.

The configuration may be modified so that a type of the line 46n, and a line that forms a circumference of the balloon 46p can be set to an arbitrary type of a line (a thick line, a dotted line, etc.). Alternatively, the configuration may be modified so that the color of the line 46n can be set to an arbitrary color. In this case, the SNS server 1 allows a display section to display, for example, a line type setting button, a line color setting button, etc. When a user clicks such a setting button, the SNS server 1 causes a client terminal to shift to a mode for arbitrarily setting the line type and the line color.

The shape of an object, such as the balloon 46p, is not essential. The configuration may be modified so that comments can be written in a circle or a rectangle. Further, the configuration may be modified so that the color of an object such as the balloon 46p can be set to an arbitrary color. Still further, the configuration may be modified so that the size of an object such as the balloon 46p may be changed to an arbitrary size by, for example, a user dragging an edge part of the balloon 46p.

Further, the configuration is preferably such that an object such as the line 46n, the balloon 46p, etc. is displayed automatically at a position at which it does not obstruct the browsing of the content. The position at which an object does not obstruct the browsing of a content is, for example, a position at which the object does not overlap character information or an image information (illustration, etc.) in the case where a content is an electronic book. In the case where a content is a moving image, an object is preferably arranged at a position at which the object does not overlap the moving image displayed. In the case where a content is music, an object is preferably arranged at a position at which the object does not overlap character information or image information in lyrics data, score data, or fingering data corresponding to the music.

An object can be moved to an arbitrary position. An available moving method is, for example, a method of clicking an object to be moved and thereafter dragging the clicked object to an arbitrary position.

The input of a character is not limited to the input by a method using a software keyboard. In the case where a client terminal is equipped with a keyboard or a numeric keyboard as hardware, or in the case where a client terminal can be connected with a keyboard or a numeric keyboard outside, a character can be input using the keyboard or the numeric keyboard.

Still further, the input of a character may be carried out by handwriting input. The handwriting input is an inputting method of causing a display section to display a handwriting input area, allowing a user to input an arbitrary character in the handwriting input area by handwriting with a finger or a stylus pen, and thereafter converting the handwritten character thus input into text information.

Further, the configuration may be modified so that the size, the font type, and the color of a character to be input can be set arbitrarily. In this case, the SNS server 1 causes a display section of a client terminal to display a character size setting button, a font type setting button, a character color setting button, etc.

As described above, in the direct writing mode, a user is allowed to communicate with another user easily without explaining a position on a content. However, in such a case as the case where a user wishes to make communication about not a part of a content (e.g., one scene) but a story as a whole, the case where a user wishes to make communication about a subject extending to a plurality of contents, or the case where a user wishes to make communication about a topic irrelevant to a content, the position on the content does not have to be specified, and hence the direct writing mode is not necessarily suitable. Besides, the direct writing mode has a drawback of limited amount of information that can be displayed on a screen at once. Then, by switching the mode to the chat mode described below, a user is allowed to make deeper communication with another user. Besides, in the chat mode, another content can be cited, and therefore, communication can be activated further.

[4-2. Chat Mode]

In the case of the chat mode shown in FIG. 12, the SNS server 1 causes a client terminal to display a comment display area 47a, and a comment input area 47g. In this case, the comment display area 47a and the comment input area 47g are displayed independently from a content. In the case where the mode is switched from the direct input mode to the chat mode, a link 47m to the direct input mode is preferably displayed, as shown in FIG. 12. This allows a user who participates in the chat mode in the middle of conversation to easily grasp the background of the conversation.

The comment display area 47a is an area where a comment 47b input by a user him/herself and comments 47c input by other users who participate in the community, are displayed.

In the comment display area 47a, citation images 47d and 47e are displayed. The citation images 47d and 47e are images relevant to comments input in the comment display area 47a, and a user who has input a comment can cite the images arbitrarily. For example, the citation image 47d is an image that is cited by the user F, who has input the comment 47c. In the case where a citation image is cited, a citation button 47f is clicked. With the click of the citation button 47f, a window for selecting a content to be cited, and a window for specifying an arbitrary portion in the selected content, are displayed, and a user specifies a content to be cited and an arbitrary portion thereof. A user can put an electronic bookmark at an arbitrary portion of a citable content preliminarily, and by designating the electronic bookmark put at the content to be cited, he/she can specify the content to be cited and the arbitrary portion thereof.

When a content to be cited and an arbitrary portion thereof are specified by a user, the client terminal 10 creates a hyperlink (link information) for specifying the content to be cited and the arbitrary portion, and transmits an object containing the created hyperlink to the SNS server 1. The SNS server 1, receiving the object thus transmitted, records the object containing the hyperlink in the object storage section 3. Thus, in the case where the object containing the hyperlink is displayed on the another client terminal 20, the SNS server 1 can specify the content cited and the arbitrary portion thereof easily, based on the hyperlink in the object displayed on the client terminal 20.

Further, in the case where all the comments input cannot be displayed in the window at once, a scroll bar 47h is displayed in the comment display area 47a. By sliding the scroll bar 47h in a direction indicated by an arrow A or an arrow B, the comment display area 47a is slid in the direction indicated by the arrow A or the arrow B. With this configuration, even if the number of comments increases, a comment that a user wishes to view can be displayed.

The comment input area 47g is an area where a user can input an arbitrary comment. When a user wishes to input a comment, he/she can input an arbitrary comment with use of a software keyboard that is displayed by clicking the comment input area 47g. After inputting a comment, he/she clicks an upload button 47k, thereby causing the comment input in the comment input area 47g to be written in the comment display area 47a. The comment written in the comment display area 47a is shared by other users via the SNS server 1. In other words, contents in the comment display area 47a are stored in the object storage section 3 (comment holding section) of the SNS server 1, and is displayed when the content is browsed by another client terminal. It should be noted that together with the contents in the comment display area 47a, position information about the position of the comment in the content is preferably stored in the object storage section 3.

According to the chat mode, a long comment can be input, whereby users can have deeper discussion.

It should be noted that in the example shown in FIG. 12, one citation image is cited per one comment, but a plurality of citation images can be cited per one comment.

Further, a subject that can be cited as to a comment is not limited to an image (a still image), but a moving image, a hyperlink to a sound file, etc. may be cited.

Still further, in the above description, the direct input mode shown in FIG. 11 and the chat mode shown in FIG. 12 are separate, independent modes, but both the modes may be combined.

Still further, though the above description explains a case where contents are electronic books, this configuration can be applied to contents of other types.

In the case where the content is music, since music data per se do not include visual information, an object can be written in, for example, visual information such as lyrics data, score data, or fingering data corresponding to the music data, in the direct writing mode. For example, lyrics data, score data, or fingering data are provided in an interlocked manner with music data while the data are being reproduced. With this configuration, even music data can be visualized, and a user arbitrarily can add an object with characters and images.

Further, an object can be written, in the direct writing mode, in a time line that is displayed when application software capable of reproducing music data is activated. In the case where a part of a content is cited in the chat mode, a part of lyrics data, score data, or fingering data can be cited. It should be noted that a combination of two or more of lyrics data, score data, fingering data, and the like may be used as visual information.

In the chat mode, a part of a music content can be cited. In this case, a window of music reproduction software is displayed in a comment. The music reproduction software is set so as to reproduce at least a part of arbitrary music data. The configuration may be such that sounds are reproduced when a user clicks the window of the music reproduction software.

In the case where the content is a moving image, an object can be written, in the direct writing mode, for example, in an arbitrary scene in a moving image file. More specifically, an object is written in arbitrary serial frames among a plurality of frames that compose the moving image. In the case where a part of the content is cited in the chat mode, an arbitrary one frame among a plurality of frames that compose the moving image may be cited as a still image, or a plurality of frames in series may be cited as a moving image.

In the case where the content is a newspaper, as is the aforementioned case of an electronic book, an object can be written, in the direct writing mode, at an arbitrary portion in an arbitrary page. In the case of the chat mode as well, an arbitrary page or an arbitrary portion thereof can be cited.

In the case where the content is a game, for example, an arbitrary portion in videos of the game is captured as an image file, and an object can be written in the image file in the direct writing mode. In the case of the chat mode, for example, an arbitrary portion in a video of a game can be captured as an image file, and the image file can be cited.

[4-3. When Too Many Comments are Input in Direct Input Mode]

In the direct input mode shown in FIG. 11, in the case where objects to be displayed on the content browser window have increased, there arises a problem that the content gets behind the objects, a problem that a relevance among objects decreases, and the like, in some cases. The "relevance among objects" means the connection among comments input as objects regarding their subjects. In other words, since comments that are input as objects tend to have contents like conversations of a plurality of users, when the contents of the comments are referred to, arraying comments in a chronological order makes it easier to grasp the contents of the comments. Therefore, it is preferable to increase the relevance among the objects.

Figure 13A:
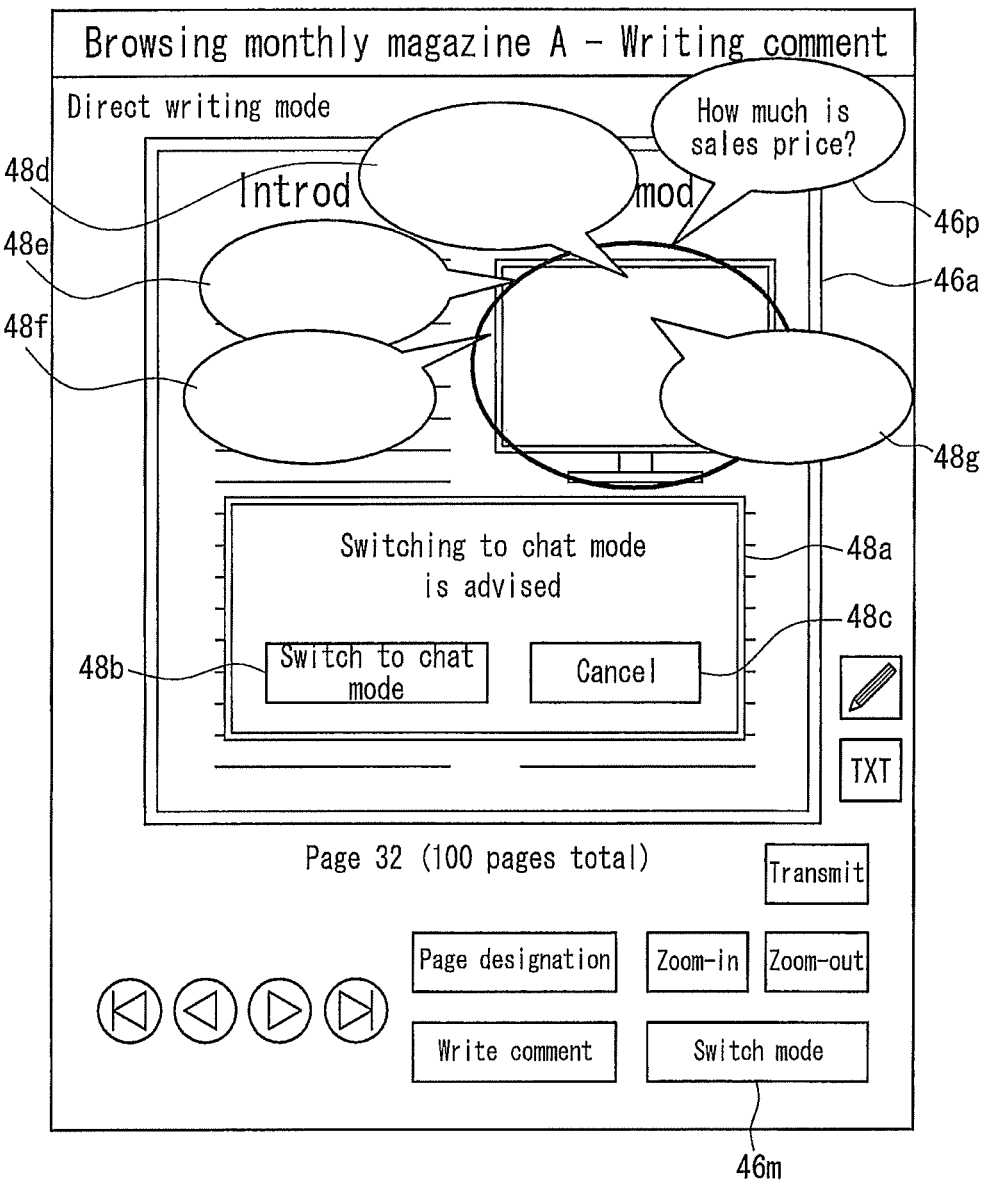
FIG. 13A is an exemplary schematic diagram showing a content browser window in a state in which a warning message regarding many objects is displayed.

In the present embodiment, in the case where the number of objects displayed at once or the area needed for displaying the objects exceeds a predetermined value, the SNS server 1 can address this problem by any of methods shown below. One of the methods is a method of advising switching the mode to the chat mode. In this method, when determining that the number of objects that are displayed at once or the area needed for displaying the objects exceeds a predetermined value, the SNS server 1 displays a message window 48a as shown in FIG. 13A on a client terminal. More specifically, as shown in FIG. 13A, there are too many objects 46p, 48d to 48g that are displayed so as to be overlaid on the content image 46a, the order in which the objects are input becomes unclear. Then, the SNS server 1 displays the message window 48a on the client terminal. The message window 48a carries a message that advises a user to switch the mode to the chat mode. Here, when the user clicks a shift button 48b or the mode switch button 46m, the SNS server 1 switches the display on a display section of the client terminal to, for example, the chat mode shown in FIG. 12. As shown in FIG. 12, comments (objects) arranged in the chronological order according to their input dates and times are displayed, and therefore, even if there are too many comments (objects), the order in which the comments (objects) are input is clarified, which allows a user to grasp the conversational connection of the comments easily.

Another method is a method of filtering objects. This is a method of narrowing down objects under predetermined conditions. More specifically, in a state of causing a client terminal to display the content browser window, the SNS server 1 causes buttons with which narrowing conditions can be set to be displayed together with the contents. As the conditions for narrowing down objects, for example, the following are available: the community member; the input date and time of an object; and a topic discussed in an object. For example, if a user sets the condition of object input date and time to "within past 24 hours from now", the SNS server 1 performs a controlling operation so as to allow only objects that match the condition to be displayed on the content browser window, while preventing objects that do not match the condition from being displayed. This makes it possible to decrease the number of objects that are displayed at once or the area needed for displaying the objects, thereby making contents of a content and an object easily viewable. Further, since the objects can be narrowed down to those having higher relevance regarding their contents, the contents of the objects can be grasped easily.

Figure 13B:
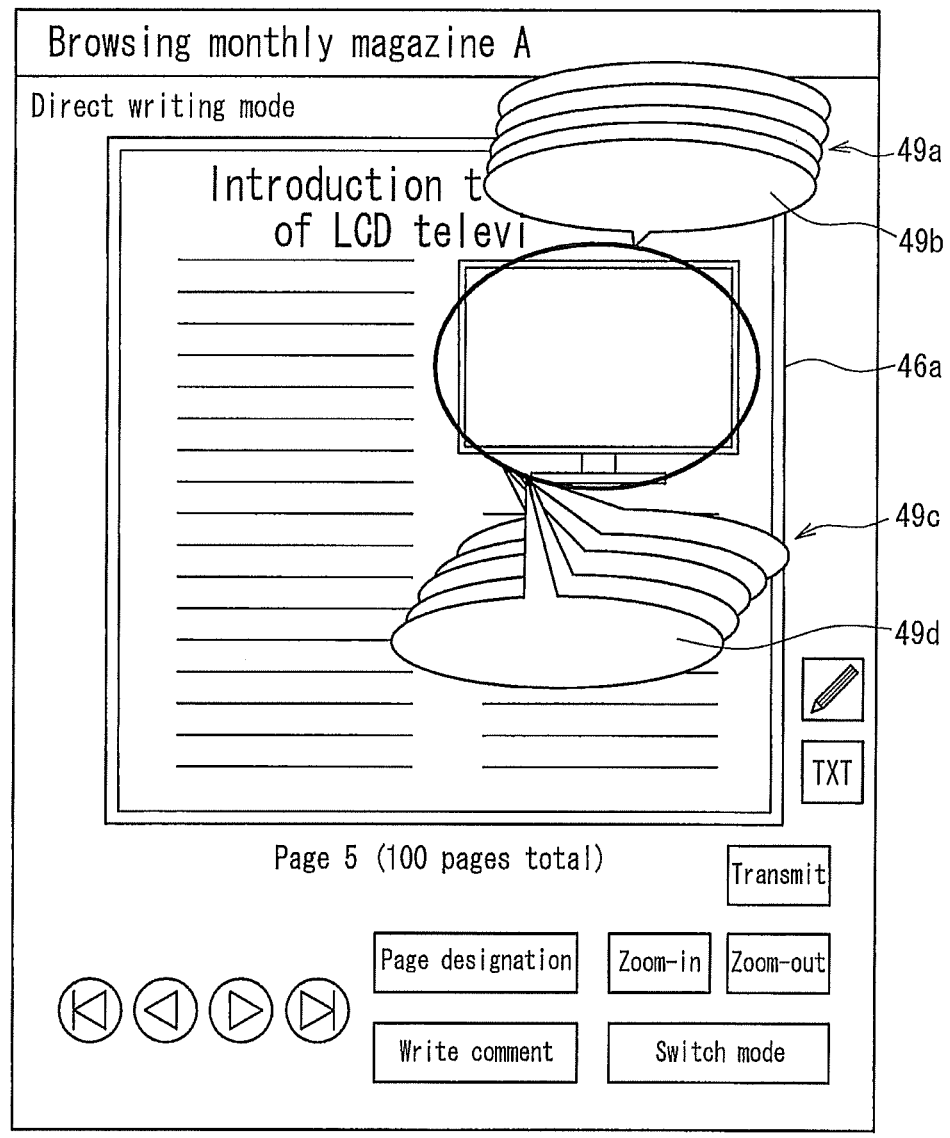
FIG. 13B is an exemplary schematic diagram showing a content browser window in a state in which a multiplicity of objects are cascaded.

Still another method is a method of arranging objects chronologically. In this method, when determining that the number of objects displayed at once or the area needed for displaying the objects exceeds a predetermined value, the SNS server 1 causes a client terminal to display relevant objects in a cascaded state as shown in FIG. 13B. The phrase "relevant objects" refers to objects having comments that are connected conversationally. For example, in the case where a comment is responded to by a comment of another user, the original comment and the responding comment are regarded as relevant. In the example shown in FIG. 13B, objects are divided into two object groups 49a and 49c and displayed. In each of the object groups 49a and 49c, a plurality of objects are displayed in a cascaded state. The order in which the objects are cascaded is such that those with newer dates are displayed in upper layers, while those with older dates are displayed in lower layers. Therefore, objects 49b and 49d displayed in the top layer in each object group are the newest objects. This configuration makes it possible to decrease the number of objects or the area needed for objects displayed at once, thereby making contents of a content and objects easily viewable.

It should be noted that in the example shown in FIG. 13B, only the contents of the objects 49b and 49d in the top layer can be viewed, and contents of objects in the lower layers cannot be viewed. To view the contents of an object in a lower layer, an edge of the object should be clicked, whereby the clicked object is moved to the top layer and is displayed, so that the contents of the same can be viewed. In the present embodiment, since a plurality of objects thus cascaded are displayed in a slightly displaced state from one another so that a part of the edge of each object can be viewed, the edge of each object can be clicked.

Figure 13C:
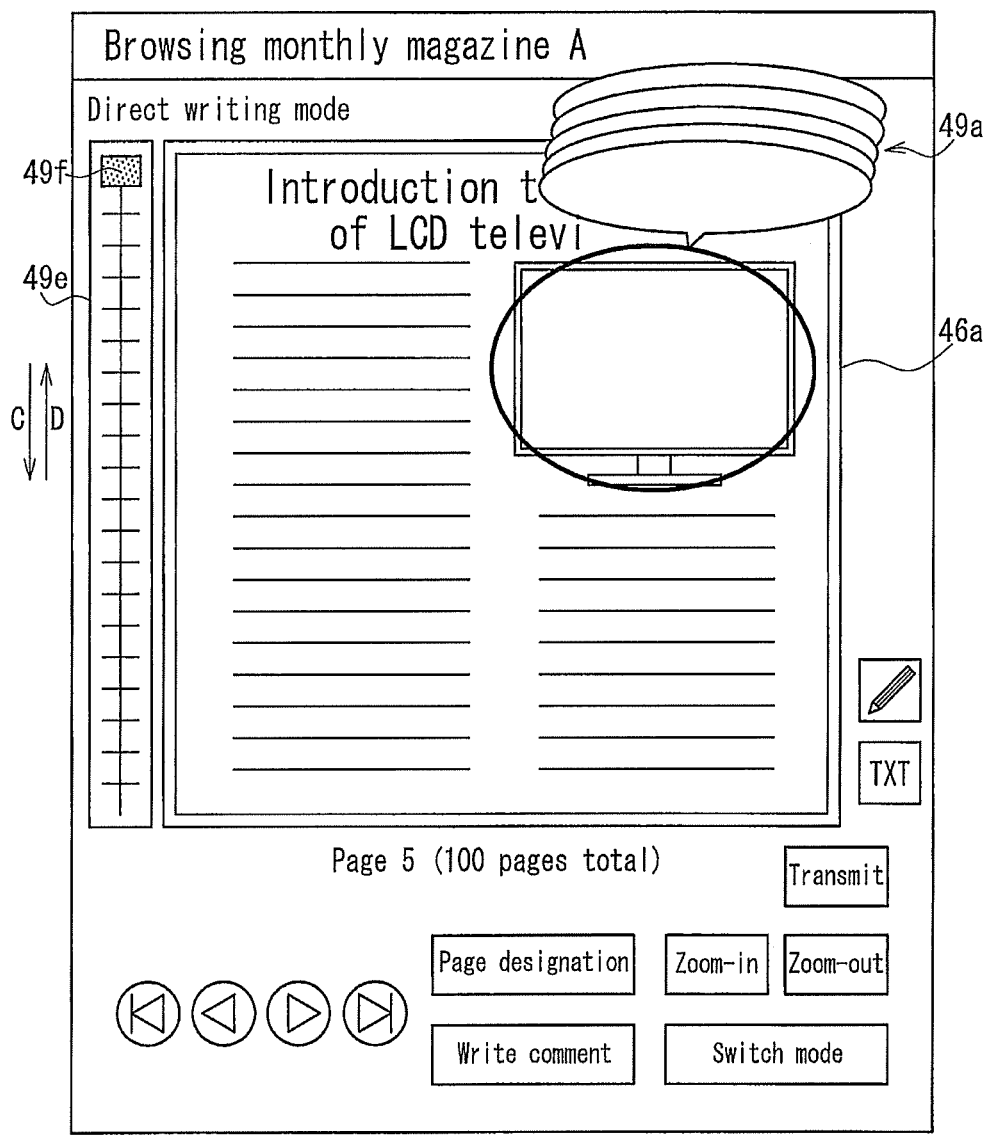
FIG. 13C is an exemplary schematic diagram showing a content browser window in a state in which a scroll bar is displayed with respect to a multiplicity of objects.

Still another method is a method in which a slider is provided so as to display objects chronologically. In this method, when determining that the number of objects that are displayed at once or the area needed for displaying the objects exceeds a predetermined value, the SNS server 1 causes a client terminal to display a slide section 49e as shown in FIG. 13C. The slide section 49e indicates a time axis in its lengthwise direction. The slide section 49e is provided with a slider 49f, and by sliding the slider 49f in a direction indicated by an arrow C or an arrow D (in the lengthwise direction of the slide section 49e), the display of objects can be switched chronologically. For example, when the slider 49f is positioned at the top of the slide section 49e, an object of the newest input date is displayed. As the slider 49f is slid in the direction indicated by the arrow C, the display can be switched gradually so that older objects are displayed. This makes it possible to decrease the number of objects displayed at once and the area needed for displaying the objects, thereby making the contents of a content and objects easily viewable. Besides, only by sliding the slider 49f, contents of all the objects can be browsed one by one.

Figure 13D:
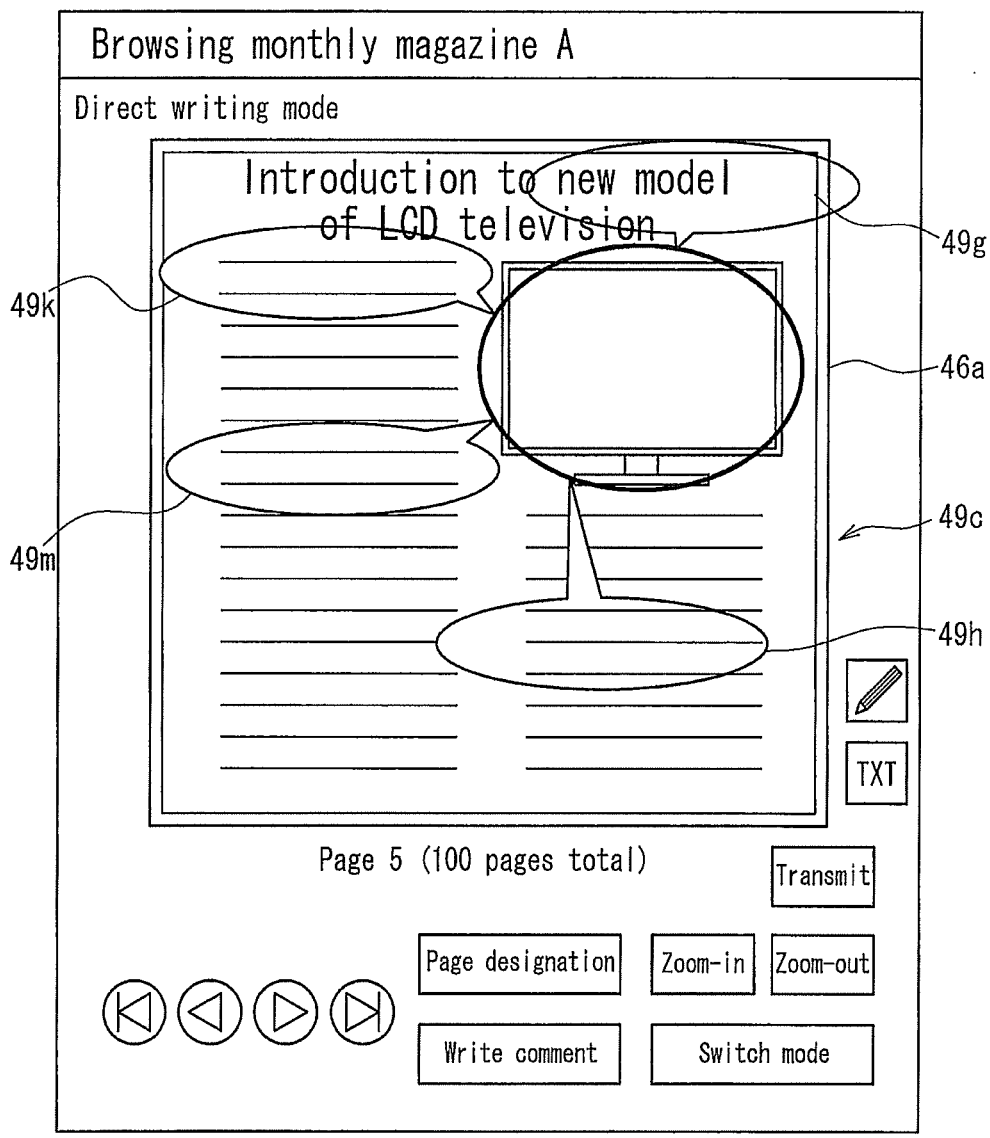
FIG. 13D is an exemplary schematic diagram showing a content browser window in a state in which a multiplicity of objects that are made transparent or semitransparent are displayed.

Still another method is a method of making an object transparent (or semi-transparent) and displaying the same. In this method, when determining that the number of objects that are displayed at once or the area needed for displaying the objects exceeds a predetermined value, the SNS server 1 causes a region encircled with frame lines of objects 49g to 49m displayed on a client terminal to be displayed in a transparent or semi-transparent state as shown in FIG. 13D. The frame lines are preferably displayed not transparent so as to visually make the presence of objects known to a user. When detecting during such display that an arbitrary object among the objects 49g to 49m is clicked or the like by a user, the SNS server 1 shifts the object thus clicked from a transparent or semi-transparent display state to the original display state, so as to cause contents of the object to be displayed. Such a display style makes it possible to decrease the area needed for displaying the objects, thereby making contents of the content easily viewable.

Figure 13E:
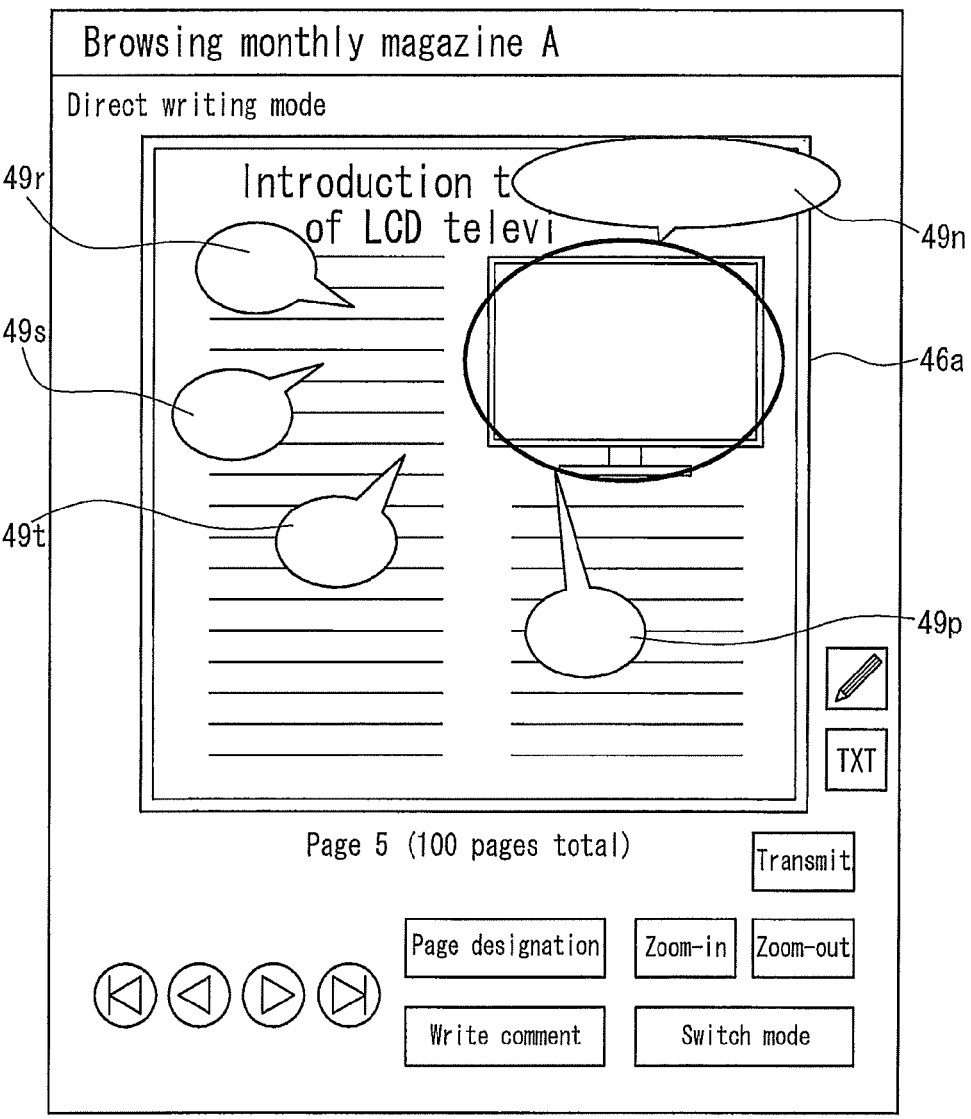
FIG. 13E is an exemplary schematic diagram showing a content browser window in which a multiplicity of objects that are reduced in size are displayed.

Still another method is a method of adjusting sizes of objects according to an area needed for displaying objects. In this method, the SNS server 1 monitors an area needed for displaying objects to be displayed at once, and when determining that the area exceeds a predetermined value, the SNS server 1 reduces respective sizes of objects 49n to 49t so that the area needed for displaying the objects does not exceed a predetermined value, as shown in FIG. 13E. In this display style, as the number of objects increases, the size of each object decreases. Therefore, characters of comments provided in an object are reduced in size, and in some cases, it becomes difficult to view the characters. Therefore, in this display style, when detecting that an arbitrary object (e.g., the object 49n) is clicked or the like by a user in a state where objects are reduced in size, the SNS server 1 shifts the clicked object from the state in which the object is reduced in size to a state where the object has an original size, as shown in FIG. 13E. This makes it possible to control an area needed for displaying objects to a predetermined value, thereby making contents of a content easily viewable.

Figure 13F:
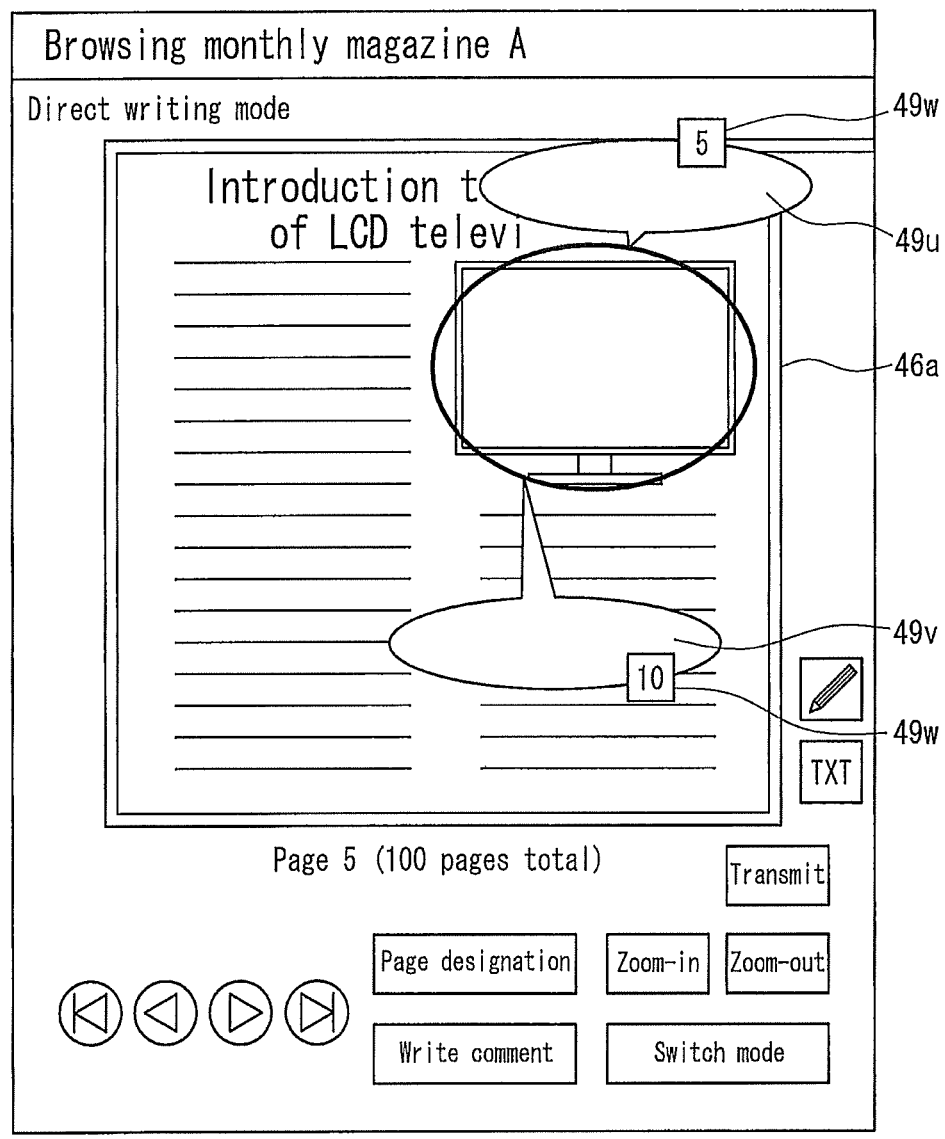
FIG. 13F is an exemplary schematic view showing a content browser window in which numerical values are displayed as to a multiplicity of objects.

Still another method is a method of displaying the number of objects that are connected conversationally, or the like, on the objects. In this method, when determining that the number of objects to be displayed at once exceeds a predetermined value, the SNS server 1 displays numerical values 49w on objects 49u and 49v as shown in FIG. 13F. This numerical value 49w represents the number of objects that are connected conversationally. Here, the objects displayed can be set to be comments that have been input most recently. When detecting that an object is clicked or the like by a user in this display style, the SNS server 1 causes all of, or a part of, the objects that are connected conversationally with the object clicked to be displayed. This makes it possible to decrease the area needed for displaying objects, thereby making contents of a content easily viewable. It should be noted that information displayed along with objects is not limited to the numerical numbers 49w, but marks or the like may be displayed.

Still another method is a method of setting a degree of priority with respect to each object based on personal attributes, friendships, etc. In this method, as to each object, the SNS server 1 grasps personal attributes and friendships of a user who has created the object, based on attributes ("family", "friend", etc.) of the user that have been set preliminarily by him/herself. A user can set degrees of priority regarding personal attributes and friendships of the other users. The SNS server 1 controls the display style, for example, displaying objects with lower degrees of priority in a cascade display state, in a transparent or semi-transparent display state, a reduced display state, or the like, based on the degrees of priority about the personal attributes and friendships set by the user. It should be noted that preferably the SNS server 1 monitors the area needed for displaying objects that are displayed at once, and controls the display of objects by switching the style of display to the cascade display, the transparent or semi-transparent display, the reduced display, etc. so that the display area does not exceed a predetermined value. This makes it possible to reduce the area needed for displaying objects, thereby making contents of a content easily viewable.

Though the foregoing description thus explains a case where contents are electronic books, this configuration can be applied to contents of other types.

Further, the above explanation thus explains a configuration in which a content is cited in a comment in the chat mode, but there may be provided with a function of citing a content in the same manner in a diary text under a diary function of the SNS, in a message text under a message transmission function of the SNS, schedule contents under a scheduler function of the SNS, or the like.

[5. Jump to Popular Page (Scene)]

In the case where a content is an electronic book, the content has a plurality of pages in many cases. To jump to an arbitrary page in such a content, a user may operates, for example, the "previous page" button 46c, the "next page" button 46d, the page designation button 46f, etc. as shown in FIG. 10, so as to jump to the page. However, in the case of jumping to a popular page in an electronic book, a user has to check the number of objects or the like page by page, which is very cumbersome. Particularly in the case of electronic books, some of them have many pages, and the above-described operation is very cumbersome. Therefore, in the present embodiment, the above-described problem is solved by displaying information representing the popularity on a community page.

Figure 14:
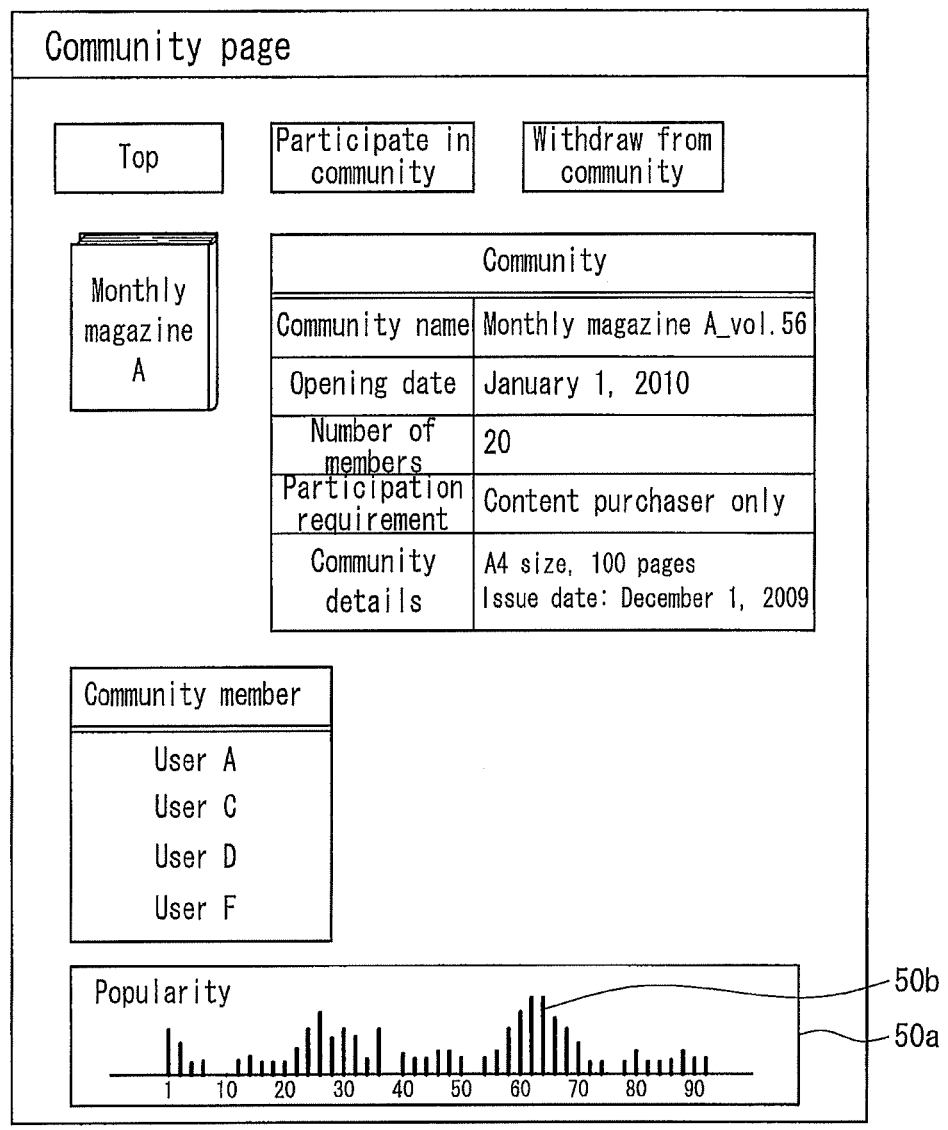
FIG. 14 is an exemplary schematic view showing a community page on which a popularity graph is displayed.

FIG. 14 is a schematic view showing a community page having a popularity graph 50a. In the popularity graph 50a, the horizontal axis indicates the number of pages of an electronic book, and the vertical axis represents the number of objects. This shows that a page having a greater number of objects is more popular. A user, referring to the popularity graph 50a, can specify a more popular page.

It should be noted that the vertical axis of the popularity graph 50a may indicate anything other than the number of objects, such as the number of times of being cited, the number of times of being referred to, or combination of these. The configuration may be such that the vertical axis of the popularity graph may be selected arbitrarily by a user among the number of objects, the number of times of being cited, etc. The popularity graph 50*a* shown in FIG. 14 is a bar graph, but the graph may be a line graph, or the like; the type of the graph is not limited.

Figure 15:
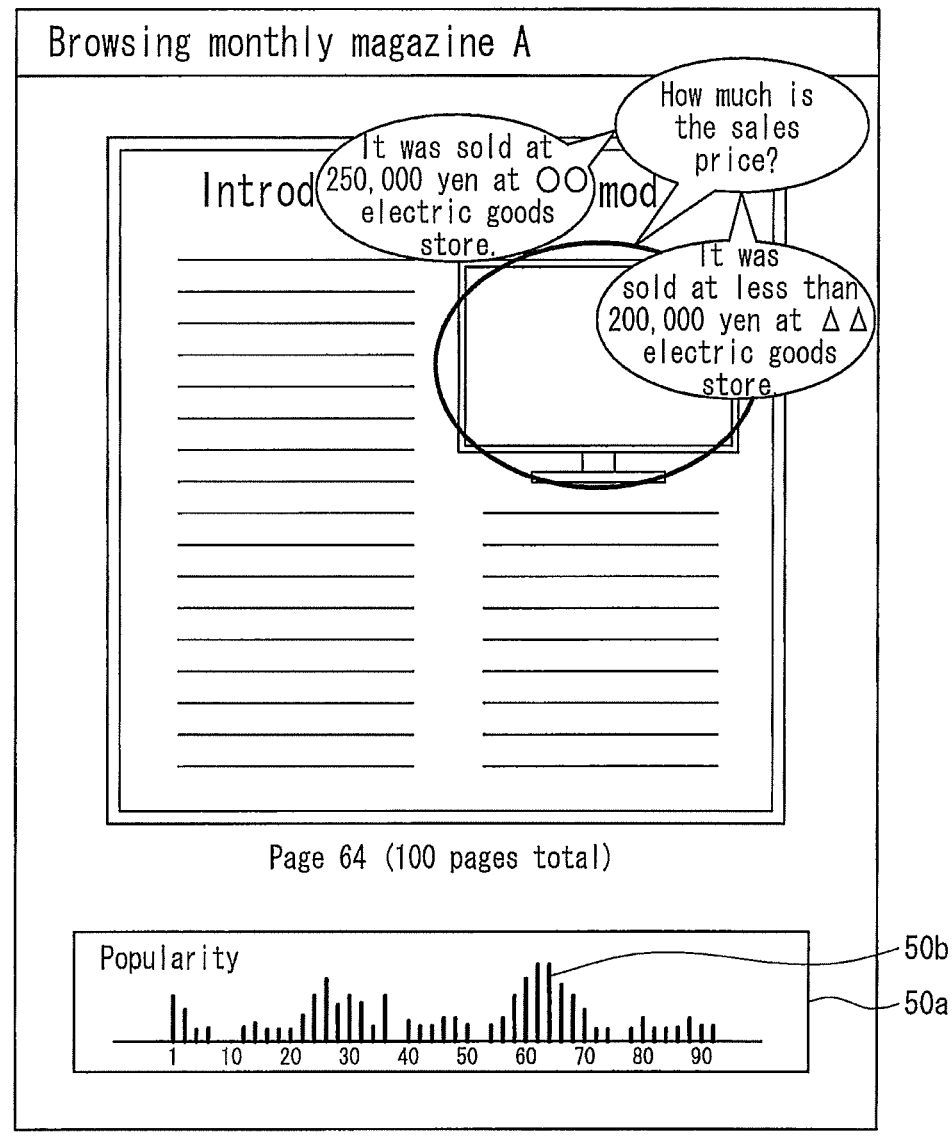
FIG. 15 is an exemplary schematic view showing a content browser window as a result of transition from the community page shown in FIG. 14.

With a click of a portion corresponding to an arbitrary page in the popularity graph 50*a* shown in FIG. 14, a transition of the display to the page can be achieved. For example, with a click of a portion 50*b* corresponding to page 64 with relatively high popularity in the popularity graph 50*a* shown in FIG. 14, a transition of the display to a state of displaying page 64 of the monthly magazine A can be achieved as shown in FIG. 15.

Thus, the popularity of each page of an electronic book is displayed, and a user can jump to an arbitrary page based on the information of popularity. Therefore, a user does not have to check the number of objects page by page, and can make easy access to an arbitrary page.

Though the above description explains a case where contents are electronic books, this configuration can be applied to contents of other types.

In the case where a content is music, the configuration may be such that the SNS server 1 creates a popularity graph in which the horizontal axis indicates, for example, pieces recorded in an album, and the vertical axis indicates, for example, the number of objects, the number of times of being reproduced, or the like. This allows a user to grasp easily which piece in one album is popular among users.

Figure 16:
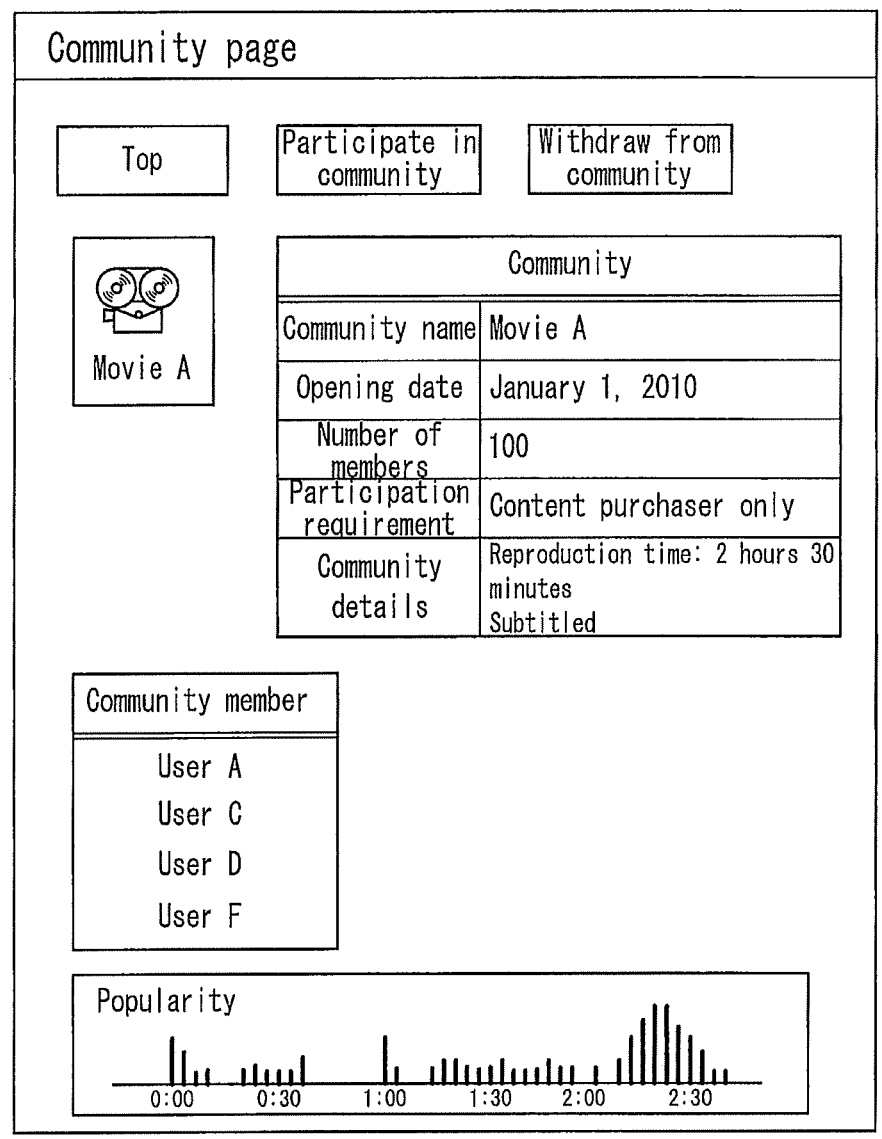
FIG. 16 is an exemplary schematic view showing a content browser window in the case where a content is a moving image.

In the case where a content is a moving image, the configuration may be such that the SNS server 1 creates a popularity graph in which the horizontal axis indicates, for example, a time axis of one moving image file, and the vertical axis indicates the number of objects, the number of times of being reproduced, or the like, as shown in FIG. 16. This allows a user to grasp easily which scene in one moving image file is popular among users.

In the case where a content is a newspaper, the configuration may be such that the SNS server 1 creases a popularity graph in which the horizontal axis indicates pages in one copy of a newspaper, or a time axis for a certain period (e.g., one month), and the vertical axis indicates the number of objects, the number of times of being browsed, or the like. This allows a user to easily specify which page in one copy of a newspaper is popular among users. Alternatively this allows a user to grasp easily which issue is popular among users, among issues of a newspaper during a certain period (e.g., one month).

In the case where a content is a game, the configuration may be such that the SNS server 1 crease a popularity graph in which the horizontal axis indicates, for example, scenes in the game, and the vertical axis indicates, for example, the number of objects, the number of plays, or the like. This allows a user to grasp easily which scene is popular among users.

In the present embodiment, information about popularity is represented by a graph, but this is a typical example; a display method other than the graph is available. For example, there is one method of quantifying the respective popularities of pages or scenes in a content, and arranging and displaying information of the pages or the scenes in a popularity descending order (ranking display).

Examples of quantified popularity information include, other than the number of times of being reproduced and the number of accesses, the counting from a viewpoint of attributes of objects; the counting from viewpoints including a temporal element; the counting from viewpoints including a human relationship element; and the counting from viewpoints including attributes of users. The counting from the viewpoint of attributes of objects is the counting obtained by, for example, quantifying lengths (the numbers of characters) of respective comments carried on objects, or sizes of respective objects, and counting the same. The counting from the viewpoints including a temporal element is according to, for example, a graph in which the horizontal axis indicates the object creation date, and the vertical axis indicates the number of objects. With this counting, for example, a page (a scene) can be specified to which in recent several days many objects have been added suddenly, though the number of all objects is not large. The counting from the viewpoints including a human relationship element is the counting of popularity by weighting comments of friends, weighting the times of being cited by friends, and weighting comments (and citation, etc.) of those who have close relationship to him/herself. The counting from viewpoints including attributes is the counting of popularity by weighting comments (and citation, etc.) of those who have the same attributes as those of him/herself (identical attributes such as sexuality, age group, similarity of owned contents). Particularly, the similarity of owned contents preferably is used as the viewpoint of counting, since it relates to the similarity in tastes of a user him/herself.

[6. Content Transmission Method]

Used as a method for transmitting a content is a method in which, upon purchase of a content by a user, the SNS server 1 gives the user the right for the content, as described above. Therefore, data themselves of the content are not held by a client terminal or a user, but by either a content provider or the SNS server 1.

Besides this transmission method, there is another method in which a user, upon purchase of a content, stores (downloads) the content in his/her client terminal.

Figure 17:
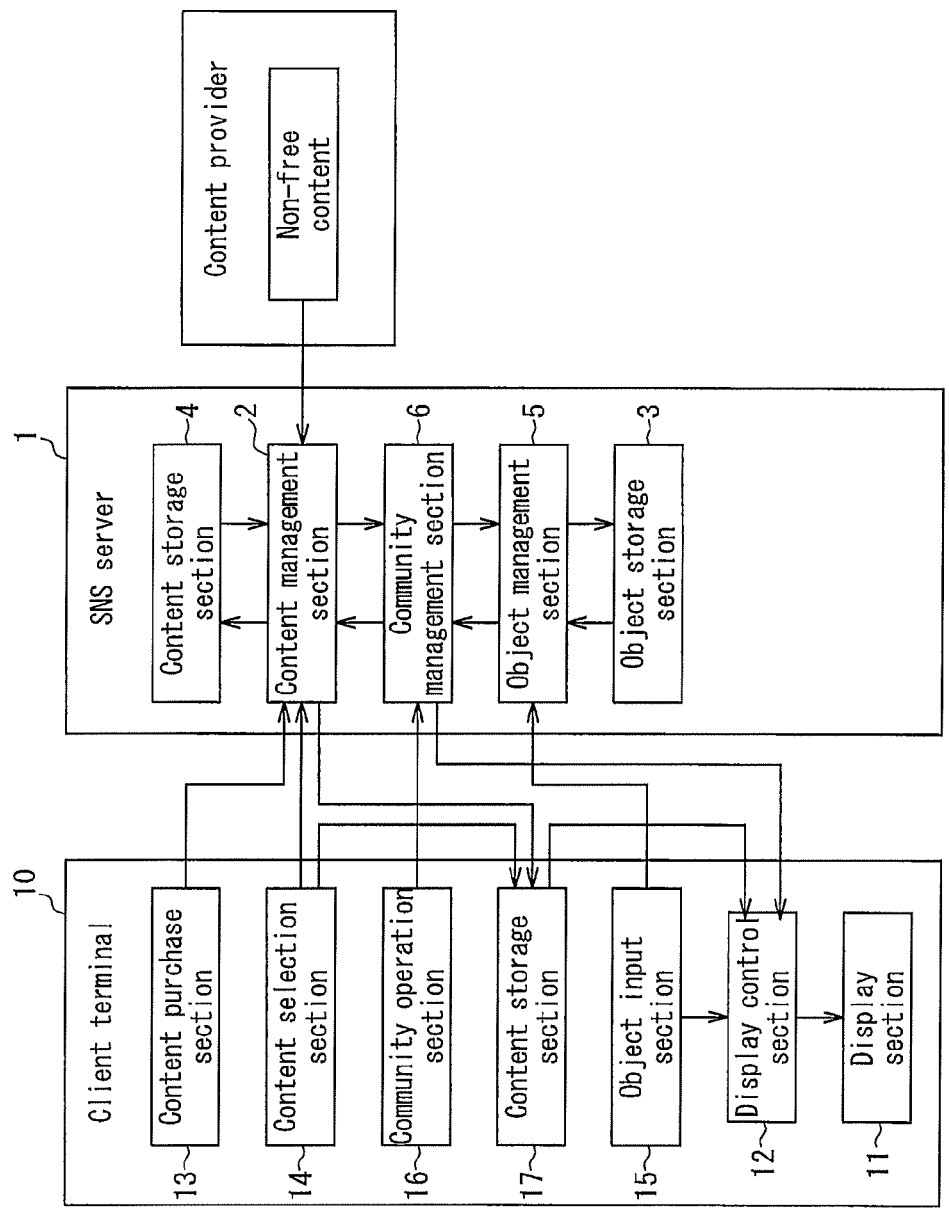
FIG. 17 is an exemplary block diagram showing another exemplary configuration of a communication service system.

FIG. 17 is a block diagram of a system in which a content can be stored in a client terminal. The block diagram shown in FIG. 17 is different from the block diagram shown in FIG. 3 in that a content storage section 17 is added to the client terminal 10. The content storage section 17 can be realized with a storage medium such as a semiconductor memory incorporated in the client terminal 10, a storage medium such as a semiconductor memory attachable to the client terminal 10, or the like. It should be noted that the form of the storage medium is not limited to a semiconductor memory, but may be a disk storage medium, or a tape storage medium, and the form of the storage medium is not limited as long as it is at least a medium to and from which data can be written and read.

In the system shown in FIG. 17, when a user performs a procedure for purchasing an arbitrary content by operating the client terminal 10, the content is transmitted to the client terminal 10 from a content provider or the SNS server 1. The content transmitted to the client terminal 10 is stored in the content storage section 17 (downloaded).

To browse a content, the user selects a content that he/she wishes to browse, by operating the content selection section 14. In the case where the selected content is held by the SNS server 1 or the content provider, the client terminal 10 receives the content transmitted by the SNS server 1 or the content provider as described above, but in the case where the selected content is stored in the content storage section 17, the SNS server 1 reads the content out of the content storage section 17. The content thus read out of the content storage section 17 is sent to the display control section 12, and is displayed by the display section 11.

It should be noted that in the system shown in FIG. 17, objects are managed by the SNS server 1. Therefore, in the case where an object associated with the content stored in the content storage section 17 is present in the SNS server 1, the content selection section 14 sends information about the selected content to the content management section 2. The content management section 2 searches the community management section 6 via the object management section 5, regarding the presence/absence of any object associated with the selected content. In the case where an object associated with the selected content is found as a result of the search, the community management section 6 sends data of the object to the display control section 12. The display control section 12 overlays an object based on object data sent from the community management section 6, on the content based on the content data read out of the content storage section 17, and causes the display section 11 to display the same.

It should be noted that the object data may be stored in a storage medium provided in the client terminal 10, unless the real time property is considered. Alternatively, a region for storing object data may be provided in the content storage section 17.

Though the above description explains a case where contents are electronic books, this configuration can be applied to contents of other types.

[7. Restriction on Content Browsing]

The system of the present embodiment has a function of disclosing contents owned by a user to the other users. As to the disclosure setting, the disclosure to an unlimited range, the disclosure to a limited range, or the disclosure prohibition may be set. Here, the "disclosure" does not means disclosure of all of contents of a content, but means disclosure of all or a part of the name of the content, information about evaluation of the content, information about impressions of the content, an icon of the content, etc. The "browsing" does not mean browsing of all of contents of a content, but means browsing of all or a part of the name of the content, information about evaluation of the content, information about impressions of the content, an icon of the content, etc.

Figure 18A:
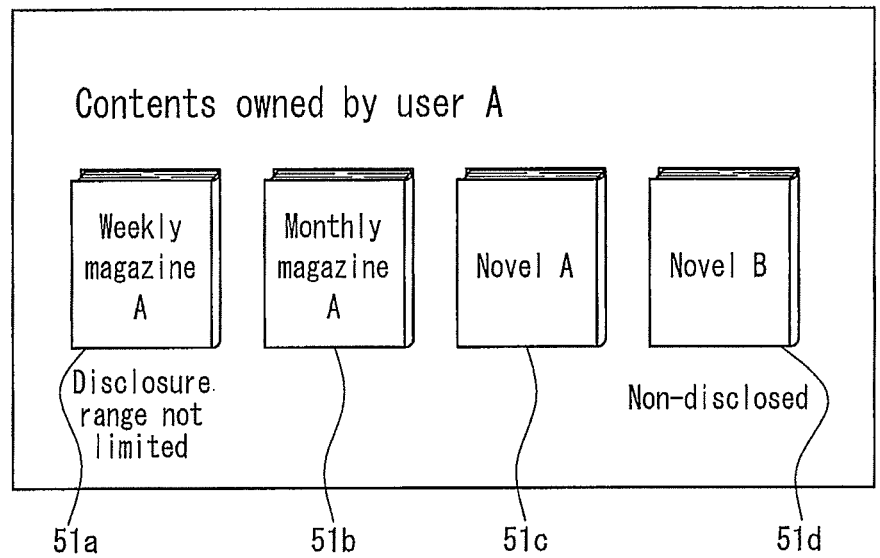
FIG. 18A is an exemplary schematic diagram showing exemplary contents owned by a user A.
Figure 18B:
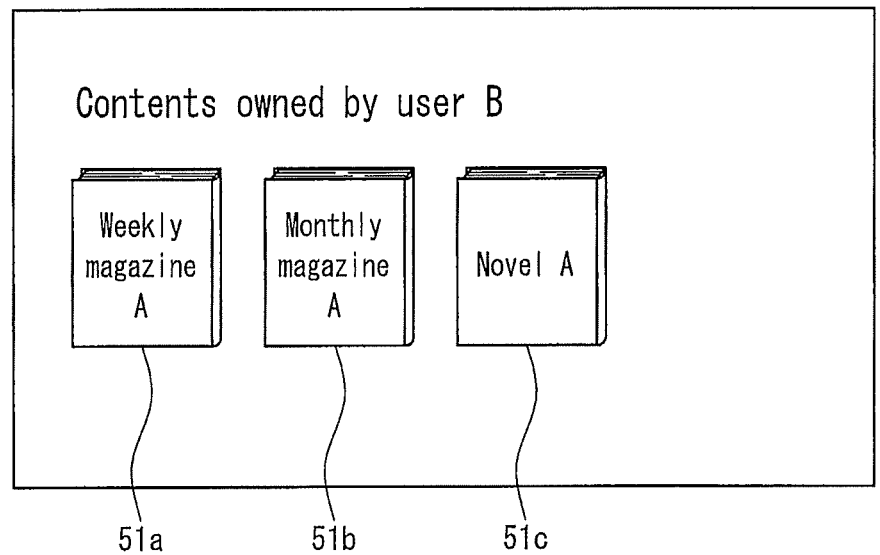
FIG. 18B is an exemplary schematic view showing exemplary contents owned by a user B.
Figure 18C:
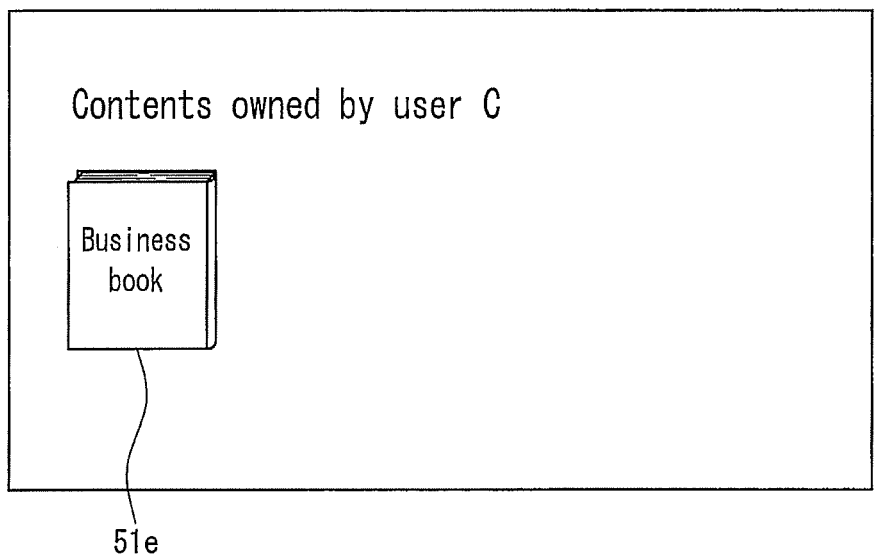
FIG. 18C is an exemplary schematic view showing an exemplary content owned by a user C.
Figure 19A:
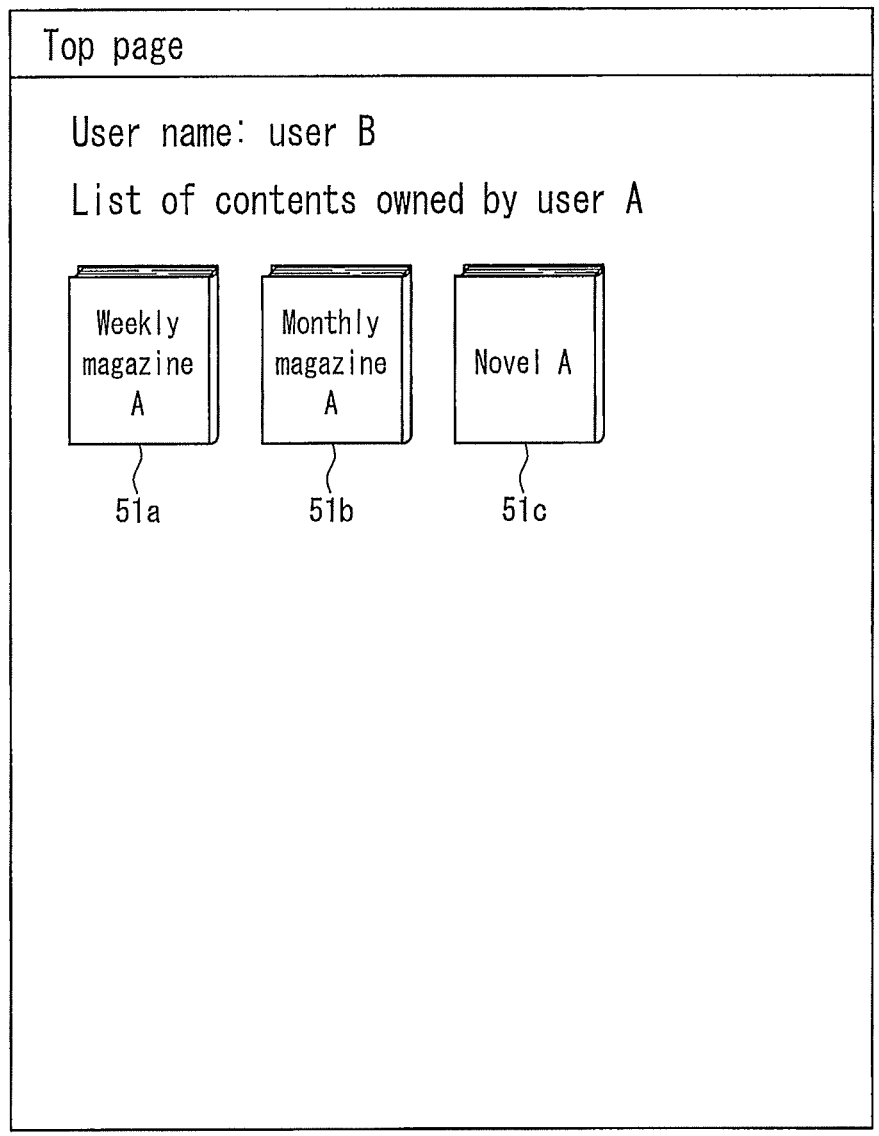
FIG. 19A is an exemplary schematic view showing a state in which the contents owned by the user A are referred to on a top page of the user B.
Figure 19B:
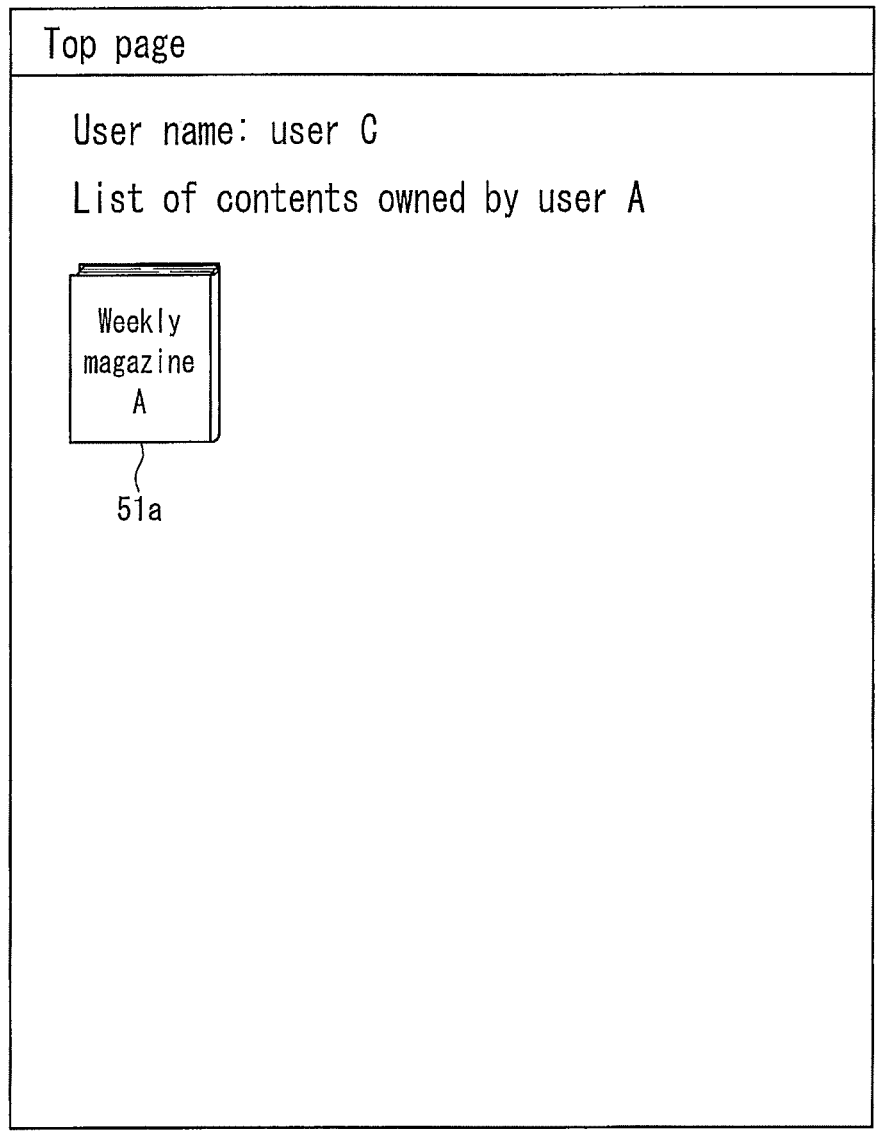
FIG. 19B is an exemplary schematic view showing a state in which the content owned by the user A is referred to on a top page of the user C.

FIG. 18A shows a list of contents owned by the user A. FIG. 18B shows a list of contents owned by the user B. FIG. 18C shows a list of contents owned by the user C. FIG. 19A shows a list of contents owned by the user A that can be browsed by the user B. FIG. 19B shows a list of contents owned by the user A that can be browsed by the user C.

First, it is assumed that the user A owns contents 51a, 51b, 51c, and 51d, as shown in FIG. 18A. The content 51a is a content for which the user A does not limit a disclosure range. The contents 51b and 51c are contents that the user A allows to be disclosed to only users who own the same contents. The content 51d is a content that the user A prohibits from being disclosed to users other than him/herself.

As shown in FIG. 18B, the user B owns contents 51a, 51b, and 51c. As shown in FIG. 18C, the user C owns a content 51e.

In this state, in the case where the user B attempts to refer to the contents owned by the user A, the user B can browse the content 51a since the user A does not limit the disclosure range, as shown in FIG. 19A. The user B can browse the contents 51b and 51c since the user A owns the same contents. The user B, however, cannot browse the content 51d, since the user A prohibits the disclosure of the same to the users other than him/herself.

Next, in the case where the user C attempts to browse the contents owned by the user A, the user C can browse the content 51a, since the user A does not limit the disclosure range, as shown in FIG. 19B. The user C, however, cannot browse the contents 51b and 51c, since the user C does not own the same contents. The user C cannot browse the content 51d, either, since the user A prohibits the disclosure of the same to the users other than him/herself.

Thus, a user discloses his/her own contents, so as to have the range of his/her own interest to be recognized by the other users. This allows the user to more deeply communicate with users with whom he/she has communicated since before, and also to communicate with users with which he/she has not communicated yet before.

Though the foregoing description explains a case where contents are electronic books, this configuration can be applied to contents of other types.

[8. Earning System]

Figure 20:
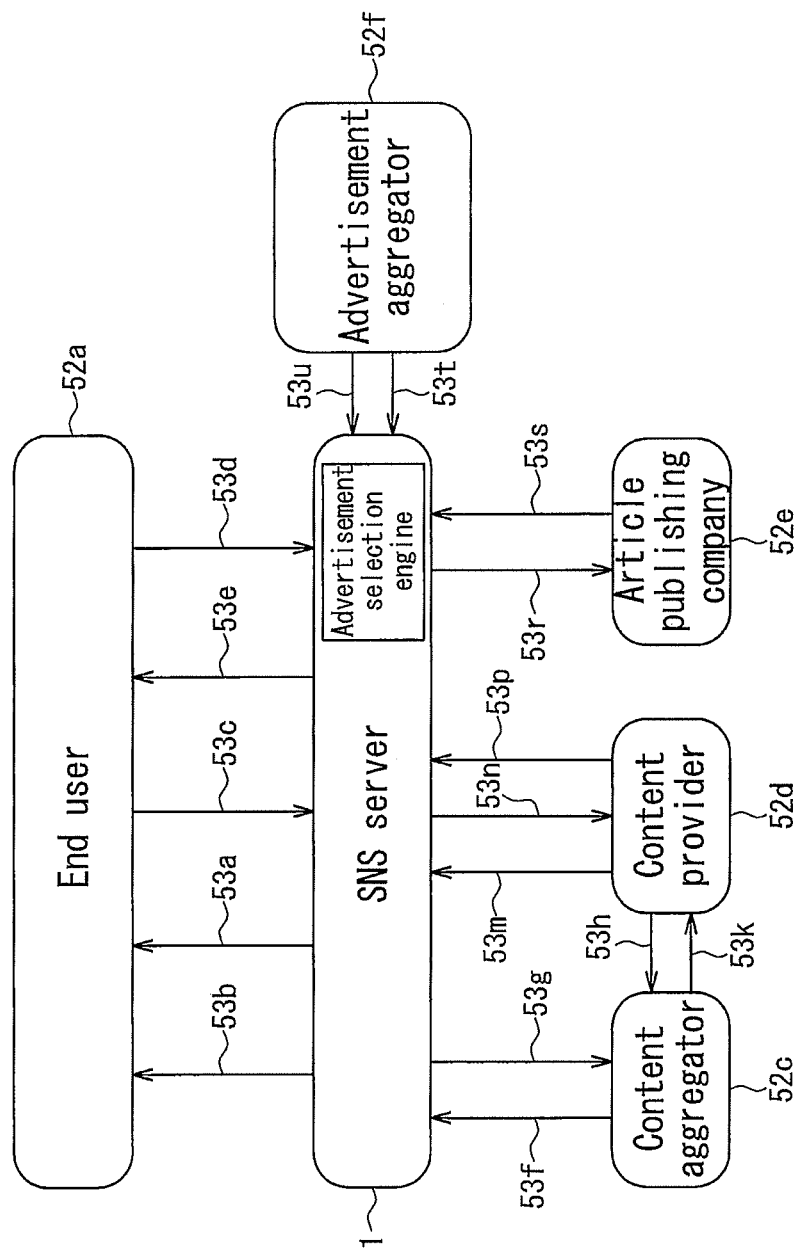
FIG. 20 is an exemplary block diagram of an earning system.

FIG. 20 is a block diagram showing flow of data and money when the present system is operated. It should be noted that FIG. 20 shows a configuration in the case where an electronic book is involved as an exemplary content.

As shown in FIG. 20, the present system has a configuration in which the SNS server 1 is accessible from an end user 52a, a content aggregator 52c, a content provider 52d, an article publishing company 52e, and an advertisement aggregator 52f. The end user 52a is a user who can purchase and browse a content. The content aggregator 52c manages contents from the content provider 52d. The content provider 52d holds contents. The content provider 52d is, for example, a publishing company, a production company, an author, or the like, who holds a copyright of a content. The article publishing company 52e provides an article to be carried on the electronic book. The advertisement aggregator 52f creates advertisement information in response to a request from an advertising client.

First, an electronic book contains contents as the electronic book created by the content provider 52d, and an article created by the article publishing company 52e. The content provider 52d, when using the SNS server 1 to transmit a content, has to pay a usage fee 53p to a manager of the SNS server 1. The article publishing company 52e, if having an article carried on the electronic book, has to pay an article publishing fee 53s to the manager of the SNS server 1. The advertisement aggregator 52f provides created advertisement information 53u to the SNS server 1, and pays an advertisement fee 53t to the manager of the SNS server 1.

In the case where the end user 52a purchases a content, the end user 52a first designates an arbitrary content, and sends content fee information 53c to the content provider 52d via the SNS server 1 and the content aggregator 52c. The content provider 52d, when receiving a content fee 53k, transmits an electronic book 53h to the end user 52a via the content aggregator 52c and the SNS server 1. Here, if advertisement information relating to the electronic book transmitted to the end user 52a is present in the SNS server 1, the advertisement information 53b is transmitted to the end user 52a.

The end user 52a sends information about times of browsing contents, information about times of browsing a community, information about a state of participation in the community, and the like, as browsing information 53d to the SNS server 1. The SNS server 1 counts and manages the browsing information 53d sent from the end user 52a. More specifically, the SNS server 1 gathers and manages browsing information 53d per end user, and provides suitable advertisement information 53b to each end user 52a.

For example, the SNS server 1 specifies each user's interest, taste, preference, etc. by referring to the advertisement information 53d gathered, and transmits advertisement information 53b relating to the same to him/her. Advertising relating to the interest, taste, preference, etc. of the end user 52a is transmitted to him/her, and the possibility of his/her obtaining an arbitrary commercial article or the like increases.

The SNS server 1 specifies each user's interest, taste, preference, etc. by referring to the advertisement information 53d gathered, and provides the information as marketing data 53n and 53r to the content provider 52d and the article publishing company 52e. The content provider 52d and the article publishing company 52e can grasp the trend of the market based on contents of the marketing data 53n. The content provider 52d can improve earnings by providing contents that match the trend thus grasped to the market. The article publishing company 52e may have an electronic book carry articles that match the trend thus grasped, so as to increase sales of a commercial product or the like mentioned in the article, and improve earnings.

The content provider 52d can provide special feature information to a community managed by the SNS server 1. The special feature information is, for example, autograph comments of an author in the case there the content is an electronic book, a video of an interview with a performer or a video of a filming scene in the case where the content is a movie, or the like. Such special feature information can be browsed via a community only by an end user who has purchased the content and participated in the community.

For example, the SNS server 1 manages users who own the same content as one community. In the case where an accompanying content as special feature information is made available to each user of a community managed by the SNS server 1, the SNS server 1 gives an authority of access to the accompanying content to each client terminal that has made access to the community. In other words, the SNS server 1 allows the user of the client terminal to own the accompanying content. By doing so, the special feature can be given to a user, without any change in the content itself, and the provision of a special feature at low costs is enabled. On the other hand, by giving a user an incentive as the accompanying content, his/her active participation in the community can be promoted. Further, since an accompanying content as special feature information can be made available at any time, this makes it easy to provide appropriate special feature information while watching interests and a trend of community participants.

It should be noted that the content provider 52d can make such setting that special feature information is disclosed, not only to content purchasing users, but also to those who have not purchased a content yet.

Though the foregoing description explains a case where contents are electronic books, this configuration can be applied to contents of other types.

[9. Effects of Embodiment, Etc.]

With the present embodiment, objects can be exchanged among a plurality of client terminals via the SNS server 1. Therefore, communication among users can be improved.

Besides, objects can be input freely by a user, with use of characters, graphics, etc. Therefore, a user can express freely what he/she wants to convey to other users, thereby becoming able to exchange subtly nuanced comments with other users.

Further, since an object can be overlaid on a content, it is possible to easily to input an object that matches contents of the content. Still further, since an object can be overlaid on a content, it is easy to grasp contents of the object.

Still further, since an object can be browsed and input by only users who have purchased a content and participated in a community, users who have similar interest, taste, and preference can communicate with one another. Besides, participation of a user who hinders communication among users can be controlled easily, and therefore, smooth communication can be achieved.

Embodiment 2

[1. Outline of Communication Service System]

A communication service system (hereinafter referred to as a "system") according to Embodiment 2 has the functions explained in the description of Embodiment 1, and additionally, a message transmission/reception function. The message transmission/reception function is a function of transmitting a message from a user's client terminal via the SNS server 1 to another client terminal, or receiving a message (mail) transmitted from another client terminal connected to the SNS server 1.

This message can cite a content. In the case where an object is associated with the content cited by the message, the object is also cited by the message. The foregoing description refers to a configuration in which a content is cited in a message, but the system may have a function of causing a content to be cited likewise in a diary text under a diary function of the SNS, and schedule contents under a scheduler function of the SNS.

A user receiving a message that cites a content can browse the cited content in the case where the user owns the cited content, and also can browse an object associated with the content. In the case where, however, the user who receives the message that cites the content does not own the cited content, he/she cannot browse the cited content. In this case, the object associated with the cited content is not non-free information, and therefore, it can be browsed by the user who has received the message. In the words, on a client terminal operated by the user who has received the message, the content is not displayed, and only the object is displayed. In such a display state, it is difficult to understand contents of the object.

Then, the system according to the present embodiment has a function of in the case where a user as a destination of a message does not own a content concerned, informing it to a user who is about to transmit the message. As a message transmission method, there are a method of designating a receiving-side user first, and a method of designating a cited content first.

[2. Message Transmission Method]

[2-1. In the Case where Receiving-Side User is Designated on Priority Basis]

Figure 21:
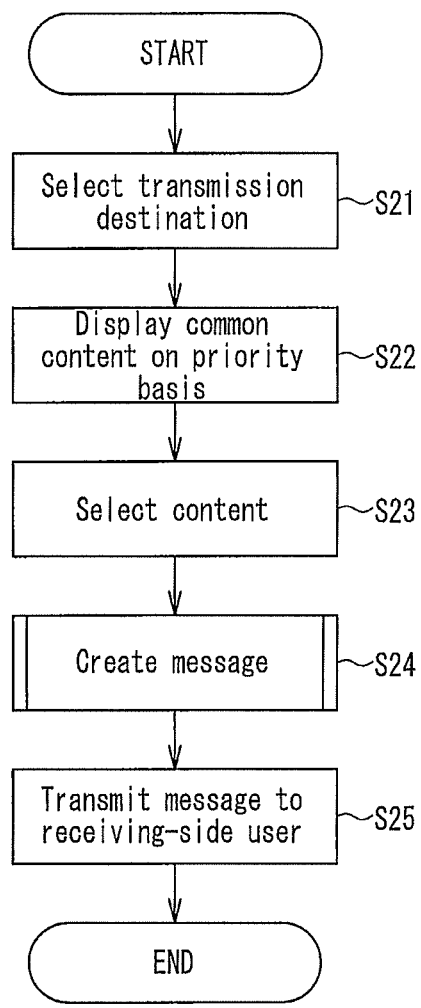
FIG. 21 is an exemplary flowchart showing operations by a transmitting-side user when he/she transmits a message to a receiving-side user.

FIG. 21 shows a flow of operations of a user who is about to transmit a message (hereinafter referred to as a transmitting-side user). FIGS. 22A to 22D show exemplary message transmission windows.

In the case where a transmitting-side user transmits a message to a user as a destination of transmission (hereinafter referred to as a "receiving-side user"), the transmitting-side user first selects a receiving-side user to whom the transmitting-side user wishes to transmit a message, by operating the transmitting-side user's client terminal (S21).

Figure 22A:
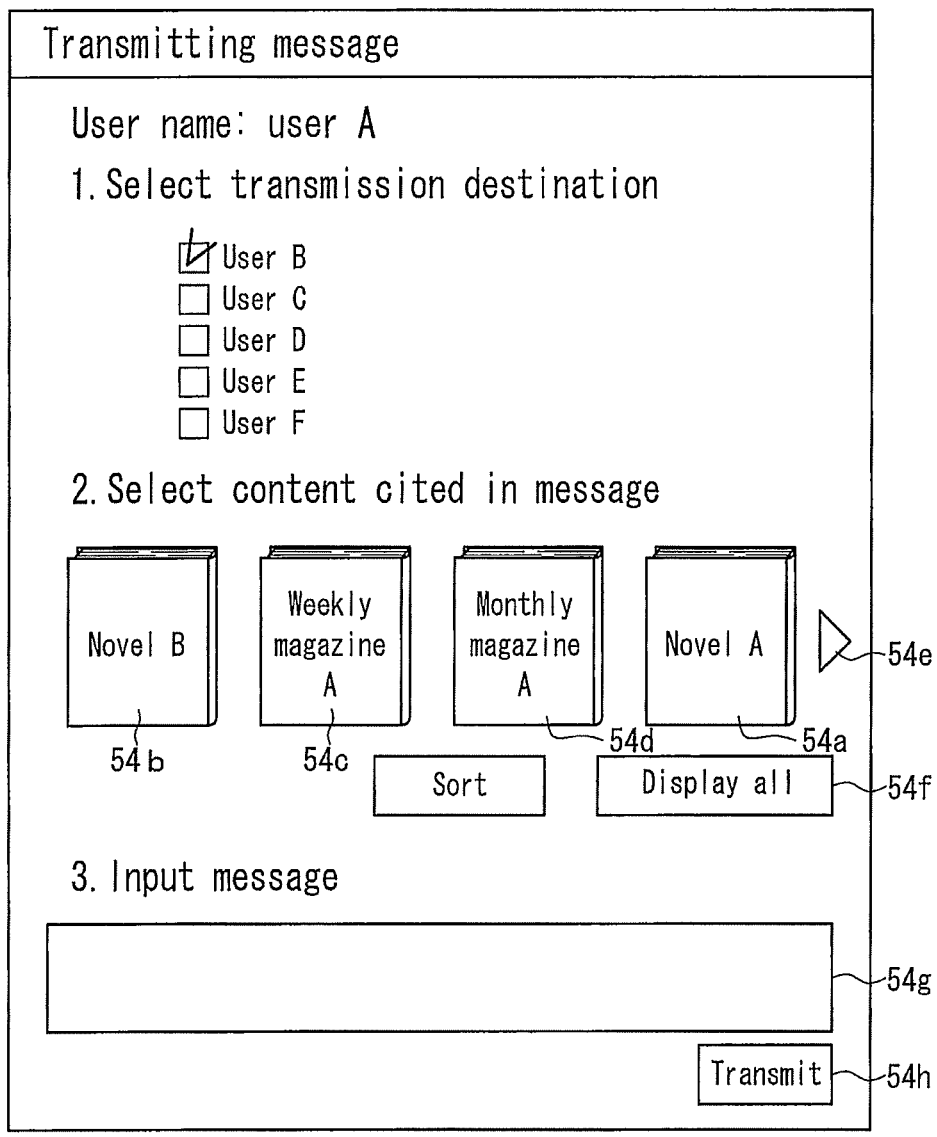
FIG. 22A is an exemplary schematic view showing a message transmission window.

More specifically, when the transmitting-side user operates the client terminal to activate the message transmission/reception function, a message transmission window, for example, as shown in FIG. 22A, is displayed on a display section of the transmitting-side user's client terminal. This message transmission window is sent from the SNS server 1. In the message transmission window shown in FIG. 22A, the transmitting-side user selects one or a plurality of users to whom the transmitting-side user wishes to transmit a message, among a plurality of users (users B to F) displayed thereon. In the example shown in FIG. 22A, the "user B" is selected.

When the transmitting-side user selects a receiving-side user as shown in FIG. 22A, the SNS server 1 refers to information about contents owned by the selected user. The SNS server 1 manages information about contents owned by users connected to the SNS server 1, based on, for example, the management table shown in FIG. 8. Therefore, by referring to the management table, the SNS server 1 can grasp this contents owned by respective users. The SNS server compares the contents owned by the selected user and the contents owned by the transmitting-side user, and displays contents that coincide (hereinafter referred to as "common contents") on a priority basis on the message transmission window (S22).

There are various display methods available for "displaying contents on a priority basis", and in the example shown in FIG. 22A, a common content is displayed on a head side in an array of content icons (the left side as viewed). For example, in the example shown in FIG. 22A, contents of a novel B, a weekly magazine A, and a monthly magazine A are common contents, and a novel A is a content that the user B does not own. Therefore, a content icon 54*b* corresponding to the novel B, a content icon 54*c* corresponding to the weekly magazine A, and a content icon 54*c* corresponding to the monthly magazine A are displayed in a left-side part in the drawing, and a content icon 54*a* corresponding to the novel A is displayed in a right-side part in the drawing.

Next, the transmitting-side user selects a content icon corresponding to a content cited in a message. One content may be cited in the message, or a plurality of contents may be cited therein. To display a content icon not displayed on the message transmission window, the user may click a scroll down button 54*e*, or a display all button 54*f*. By clicking the scroll down button 54*e*, the user can cause content icons below the content icon 54*a* to be displayed. By clicking the display all button 54*f*, the user can cause all the content icons to be displayed (S23).

Next, the transmitting-side user inputs a message to be transmitted to the receiving-side user in a message input section 54*a*. In the case where a hardware keyboard is not provided, when detecting that the message input section 54*g* is clicked by the user, the client terminal causes the display section to display a software keyboard on the display section. The user can input an arbitrary message by operating the software keyboard displayed on the display section (S24).

Finally, the transmitting-side user clicks a transmission button 54*h*. The SNS server 1, when detecting that the transmission button 54*h* is clicked, transmits the message input the message input section 54*g* and information about the cited content to the receiving-side user (S25).

As described so far, when the transmitting-side user transmits a message citing a content to the receiving-side user, common contents are displayed on a priority basis upon the selection of the receiving-side user, which allows the user to grasp common contents easily. Besides, the possibility of the user preferentially citing common contents can be increased.

It should be noted that the method for displaying contents on a priority basis is not limited to the display method shown in FIG. 22A. Any of display methods shown in FIGS. 22B to 22D may be used.

Figure 22B:
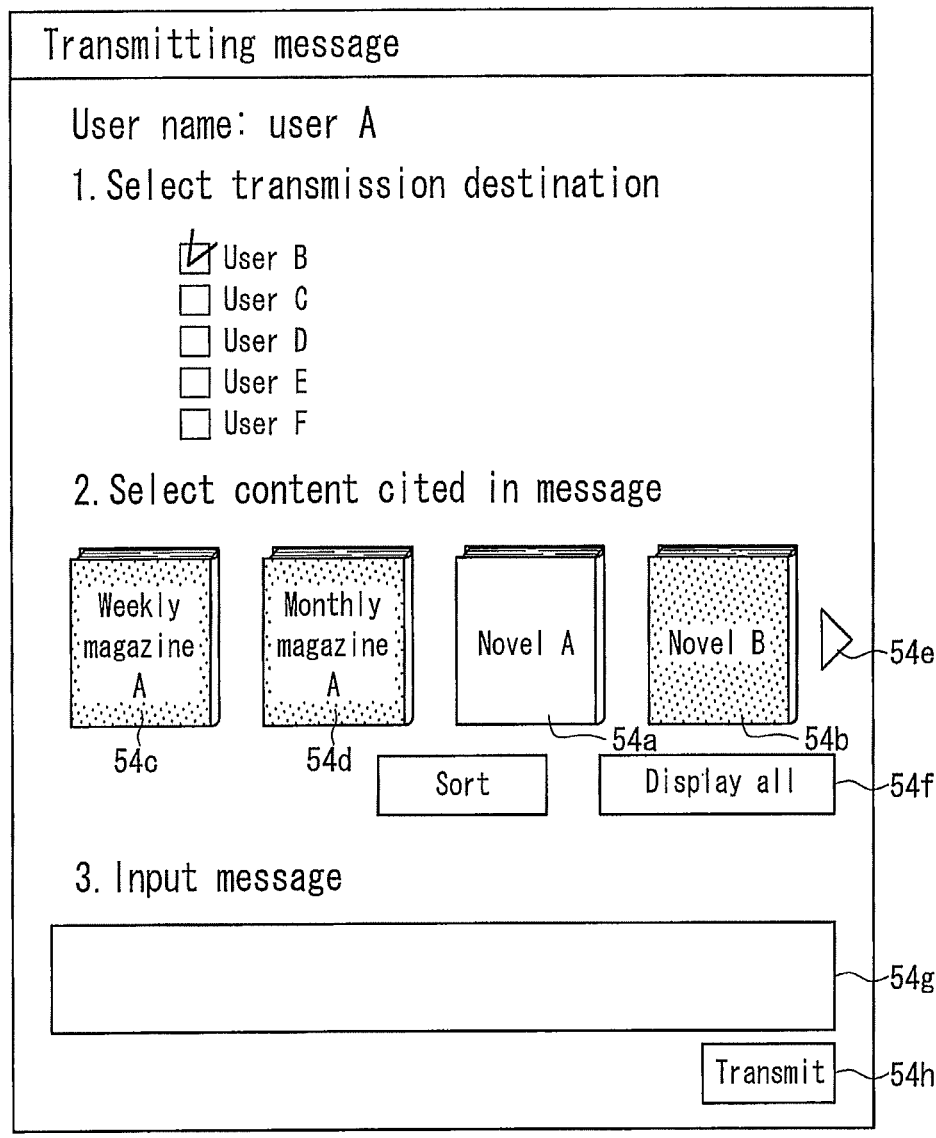
FIG. 22B is an exemplary schematic view showing a message transmission window.

FIG. 22B shows a display method in which the contents icons 54*b* to 54*d* corresponding common contents and the content icon 54*a* corresponding to a non-common content are colored in different display colors. It should be noted that the display color for the content icons 54*b* to 54*d* is preferably a conspicuous color as compared with the display color of the content icon 54*a*. Such a display method makes the content icons corresponding to the common contents conspicuous, thereby making it possible to select easily a content icon corresponding to a content icon to be cited.

Figure 22C:
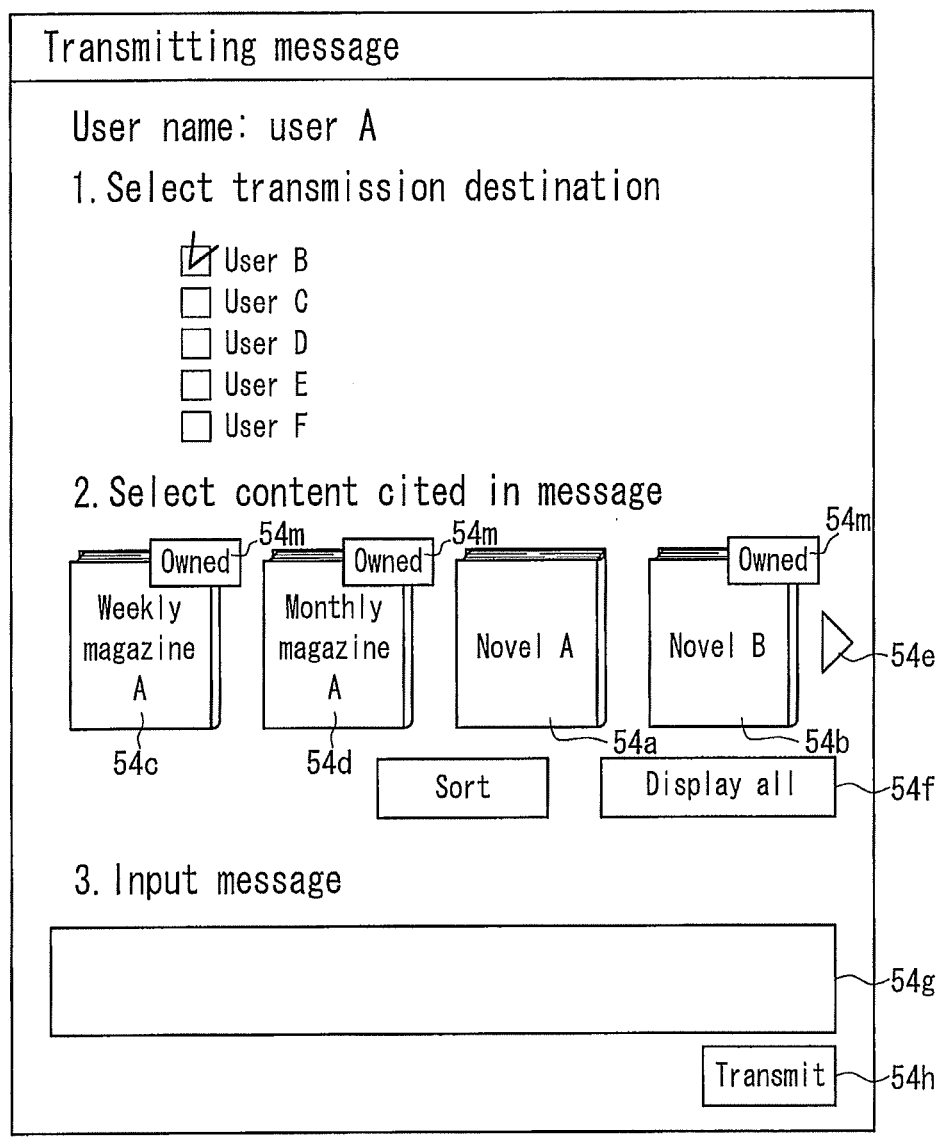
FIG. 22C is an exemplary schematic view showing a message transmission window.

FIG. 22C shows a display method in which ownership icons 54*m* indicating that the corresponding contents are owned by the receiving-side user are attached to the content icons 54*b* to 54*d* corresponding to common contents. Such a display method makes the content icons corresponding to the common contents conspicuous, thereby allowing a user to easily select a content icon corresponding to a content icon to be cited.

FIG. 22D shows a display method in which content icons corresponding to non-common contents are not displayed, and only the content icons 54*b* to 54*d* corresponding to the common contents are displayed. Such a display method eliminates the possibility that the user would select contents that are not common contents. Therefore, this allows the user to cite a common content in the message surely.

Though not shown in the drawings, a content icon display method of enlarging only content icons corresponding to common contents when displaying content icons is available, besides the above-described methods.

Alternatively, a combination of a plurality of methods selected from the above-described display methods may be used for displaying content icons.

Though the foregoing description explains a case where contents are electronic books, this configuration can be applied to contents of other types.

[2-2. In the Case Where Content is Designated on Priority Basis]

Figure 23:
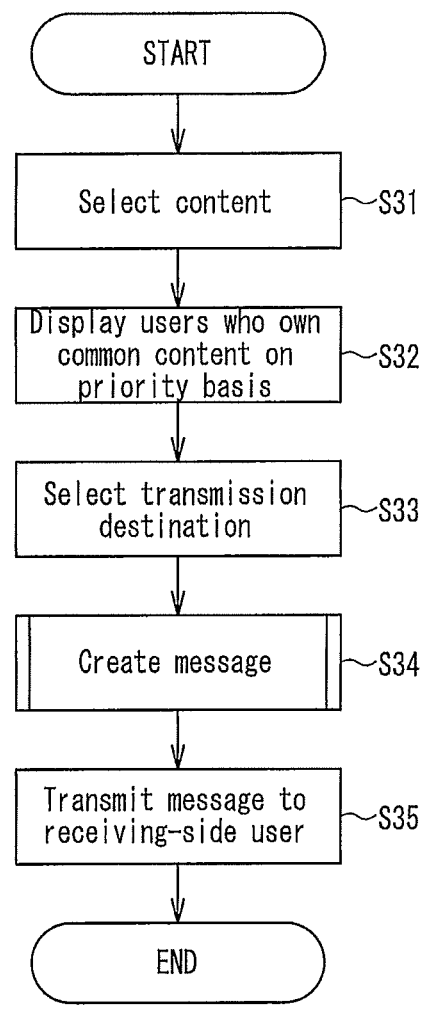
FIG. 23 is an exemplary flowchart showing operations by a transmitting-side user when he/she transmits a message to a receiving-side user.

FIG. 23 shows an operation flow upon message transmission, for a user who is about to transmit a message (hereinafter this user is referred to as a "transmitting-side user"). FIGS. 24A to 24D show exemplary message transmission windows.

In the case where a transmitting-side user transmits a message to a user at a destination of transmission (hereinafter referred to as a "receiving-side user"), the transmitting-side user operates his/her client terminal to select a content to be cited in the message (S31).

Figure 24A:
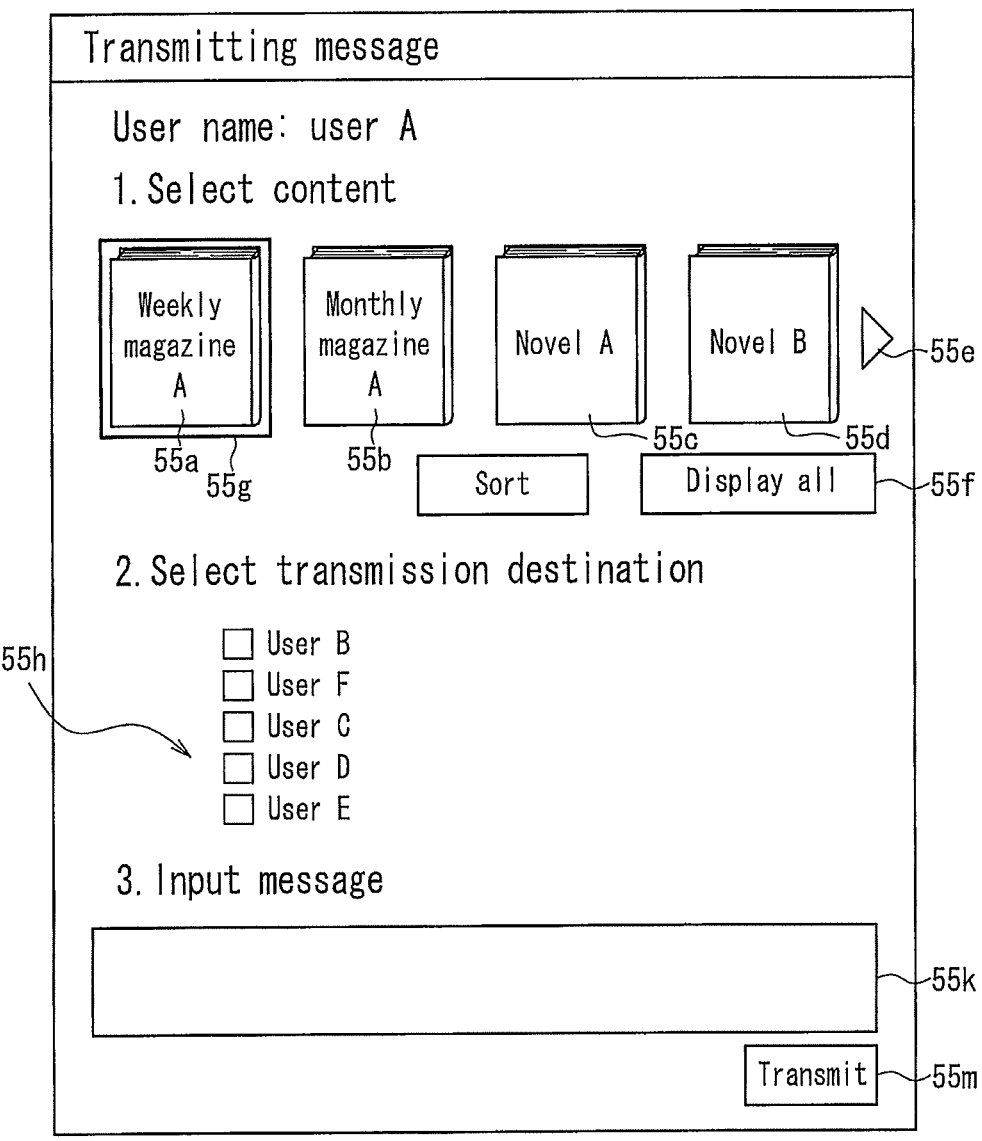
FIG. 24A is an exemplary schematic view of a message transmission window

More specifically, when the transmitting-side user activates a message transmission/reception function by operating the client terminal, a message transmission window, for example, as shown in FIG. 24A, is displayed on the display section of the client terminal. This message transmission window is sent from the SNS server 1. The transmitting-side user selects one or a plurality of content icons corresponding to contents to be cited in the message, out of a plurality of content icons 55*a* to 55*d* displayed on the message transmission window shown in FIG. 24A. It should be noted that the content icons displayed on the message transmission window are content icons corresponding to the contents owned by the user A. In order to have content icons that are not displayed on the message transmission window displayed thereon, the user clicks a scroll down button 55*e* or a display all button 55*f*.

In order to select a content icon, the user clicks an arbitrary content icon. when a content icon is clicked, a selection frame 55*g* is displayed around the clicked content icon, as shown in FIG. 24A.

When the transmitting-side user selects a content icon as shown in FIG. 24A, the SNS server 1 refers to information about the content corresponding to the selected content icon. As the SNS server 1 manages information about contents owned by users connected to the SNS server 1 on the basis of, for example, the management table shown in FIG. 8, the SNS server 1 can grasp the contents owned by each user by referring to the management table. Therefore, the SNS server 1 can grasp owner users regarding each content. The SNS server 1 causes the users who own the selected content to be displayed on the priority basis on the message transmission window (S32).

Various display methods are available for the "display of users on the priority basis", and in the example shown in FIG. 24A, those who own the selected content are displayed at positions above those who do not own the selected content, as shown in a user list 55h. For example, in the case where the user B and the user F own the content corresponding to the content icon 55a, the user B and the user F are displayed at positions above the users C to E, as shown in FIG. 24A.

Next, the transmitting-side user selects a user to whom he/she is to transmit a message, in the user list 55h. The message may be transmitted to one user, or a plurality of users (S33).

Next, the transmitting-side user inputs a massage to be transmitted to the receiving-side user, in a message input section 55k. In the case where the client terminal is not equipped with a hardware keyboard, the client terminal, upon detecting that the message input section 55k is clicked, causes a software keyboard to be displayed on the display section. The user can input an arbitrary message by operating the software keyboard displayed on the display section (S34).

Finally, the transmitting-side user clicks the transmission button 55m. The SNS server 1, upon detecting the transmission button 55m is clicked by a user, transmits the message input in the message input section 55k and information about the cited content to the receiving-side user (S35).

As described above so far, in the case where the transmitting-side user is to transmit a massage that cites a content to the receiving-side user, at the time of the selection of the content to be cited, users who own the content are displayed on a priority basis, which allows the transmitting-side user to grasp easily the users who own the selected content.

Figure 24B:
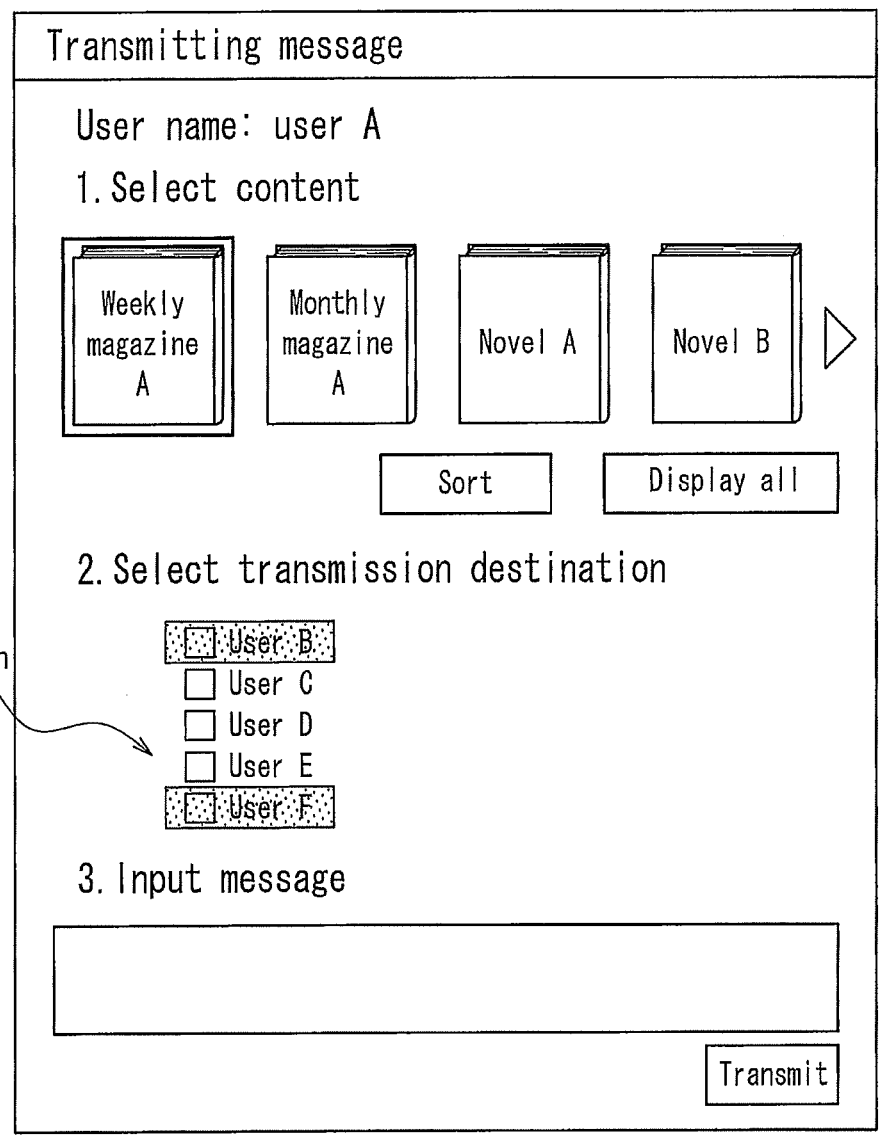
FIG. 24B is an exemplary schematic view of a message transmission window.
Figure 24C:
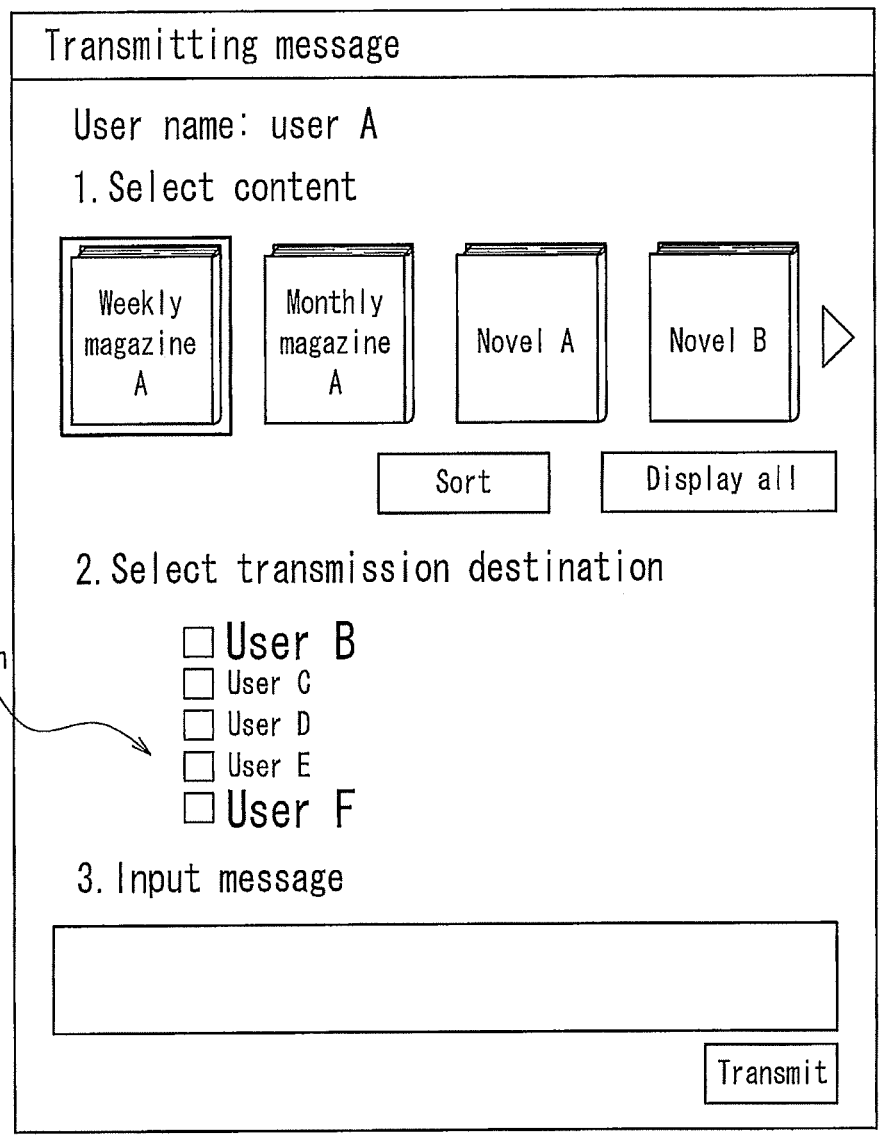
FIG. 24C is an exemplary schematic view of a message transmission window.
Figure 24D:
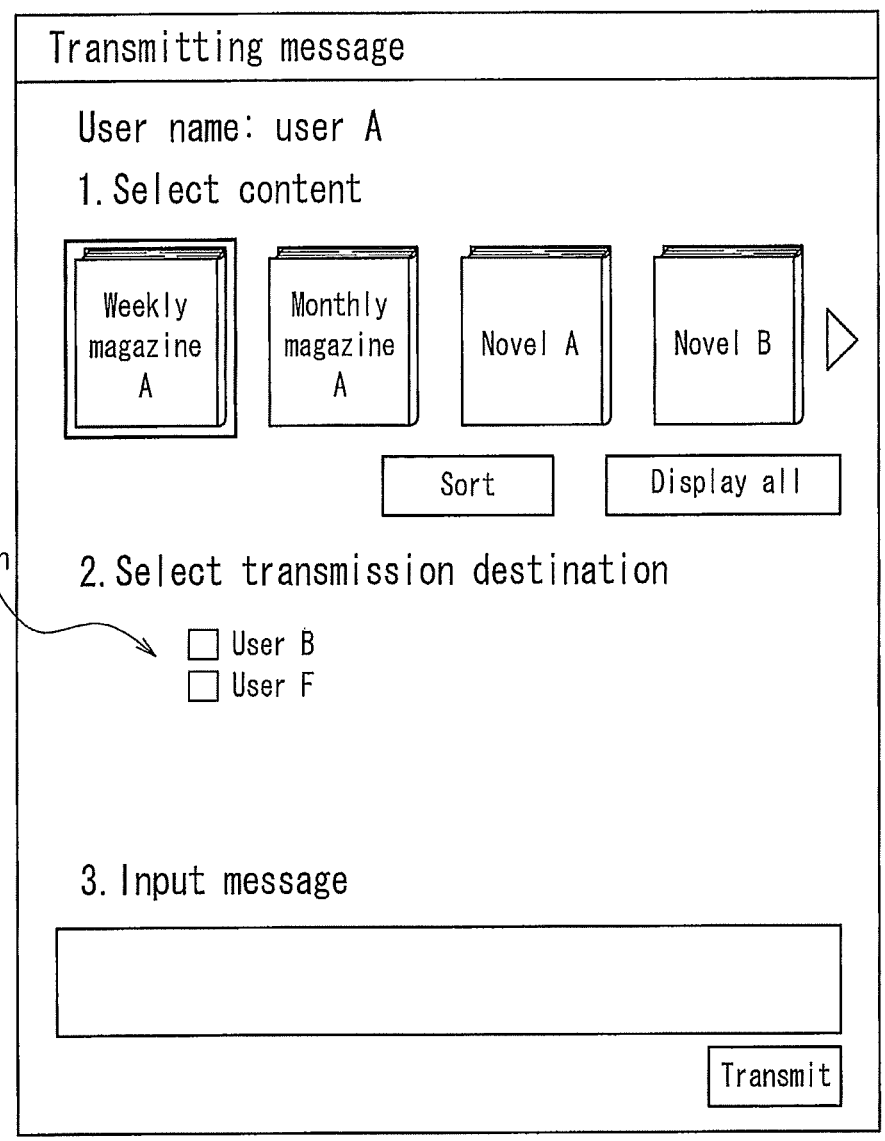
FIG. 24D is an exemplary schematic view of a message transmission window.

The method for display on a priority basis is not limited to the display method shown in FIG. 24, and it may be any of display methods shown in FIGS. 24B to 24D.

FIG. 24B shows a display method in which the users who own the selected content and the users who do not own the selected content are colored in different display colors in the user list 55h. In the example shown in FIG. 24B, the user B and the user F who own the selected content are colored. It should be noted that the display of the users who own the selected content is preferably set to be in a conspicuous color as compared with the color for the users who do not own the selected content. Such a display method makes the characters used for users who own the selected content conspicuous, thereby making it possible to select easily a user to whom the message is to be transmitted.

FIG. 24C shows a display method in which the characters used for the users who own the selected content are made larger in size than those for users who do not own the selected content. In the example shown in FIG. 24C, the characters used for the user B and the user F are made larger than those for the users C to E. Such a display method makes the characters used for the users who own the selected content conspicuous, thereby making it possible to select easily a user to whom the message is to be transmitted.

FIG. 24D shows a display method in which users who do not own the selected content are not displayed, and only users who own the selected content are displayed. Such a display method eliminates the possibility that a user who does not own the selected content would be selected.

Figure 24E:
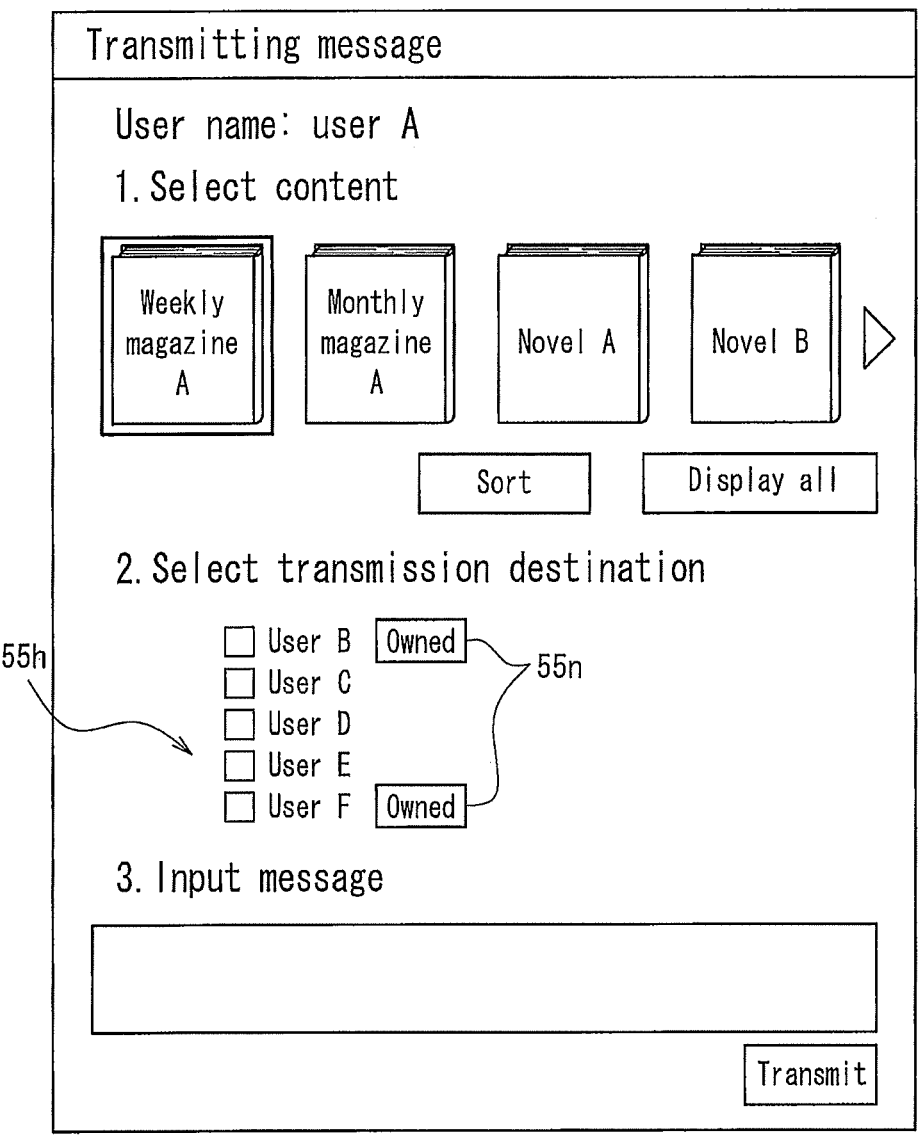
FIG. 24E is an exemplary schematic view of a message transmission window.

FIG. 24E shows a display method in which, in the user list 55h, ownership icons 55n are attached to users who own the selected content. Such a display method makes the users who own the selected content conspicuous, thereby making it possible to select easily a user to whom the message is to be transmitted.

Alternatively, a combination of a plurality of the above-described display methods may be used for display.

Though the foregoing description explains a case where contents are electronic books, this configuration can be applied to contents of other types.

[2-3. In the Case Where Content Not Owned by Receiving-Side User is Cited]

In the case where a transmitting-side user attempts to transmit a message citing a content to a receiving-side user who does not own the content, a warning is displayed.

Figure 25:
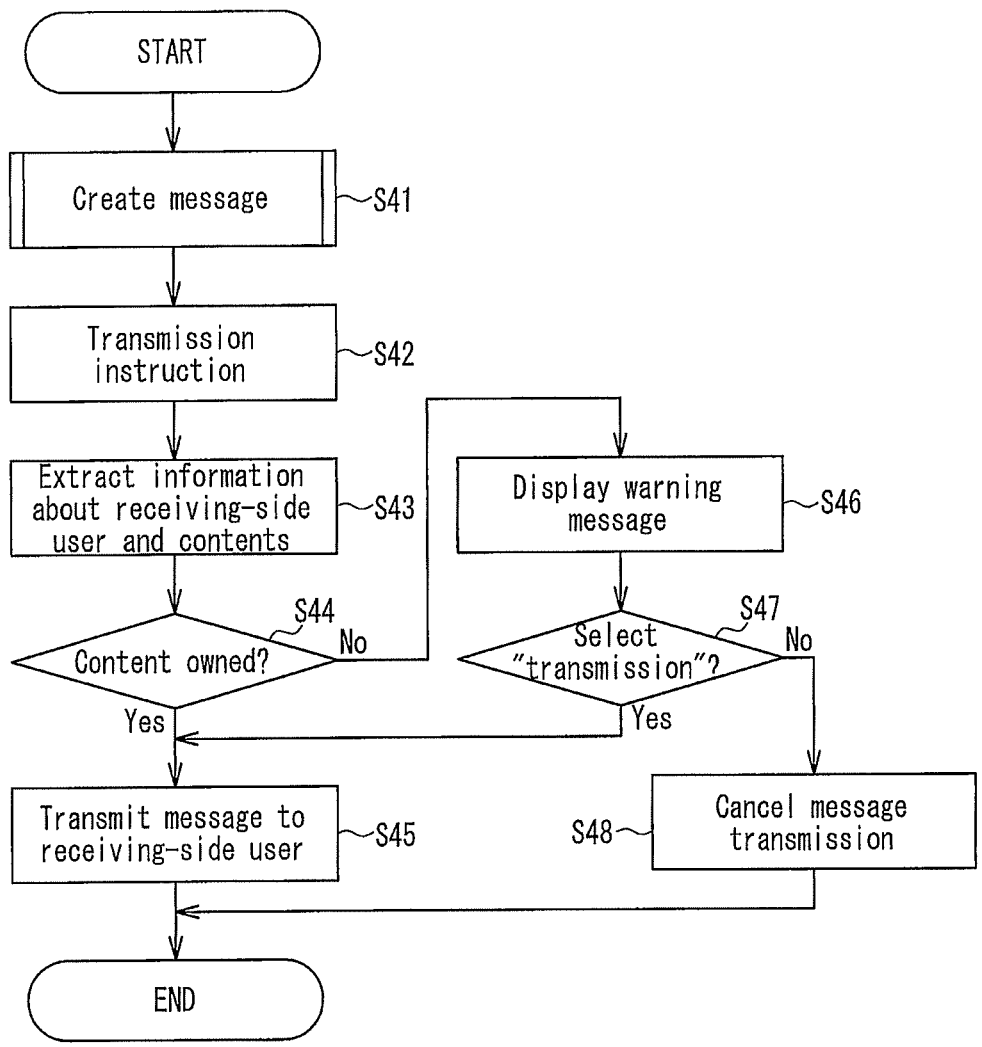
FIG. 25 is an exemplary flowchart showing operations of a transmitting-side user when he/she transmits a message to a receiving-side user.

FIG. 25 shows an operation flow in the case where a transmitting-side user attempts to transmit a message citing a content to a receiving-side user who does not own the content.

It is assumed that, for example, in a message transmission window shown in FIG. 22A, the transmitting-side user first selects the "User B" as the destination, selects the content icon 54a corresponding to a content that the user B does not own (e.g., "NovelA") as a content to be cited, and creates a message. Alternatively, it is assumed that, for example, in a message transmission window shown in FIG. 24A, the transmitting-side user selects a content icon 55c that the user B does not own (e.g., "Novel A") as a content to be cited, and creates a message (S41).

Next, when the transmitting-side user clicks the transmission button 54h (S42), the SNS server 1 refers to information about the selected receiving-side user, and information about the content corresponding to the selected content icon. The SNS server 1 manages information about contents owned by users connected to the SNS server 1, for example, based on the management table shown in FIG. 8. Therefore, by referring to the management table, the SNS server 1 can grasp contents owned by respective users (S43).

The SNS server 1 determines whether or not the selected receiving-side user owns the cited content (S44).

Figure 26:
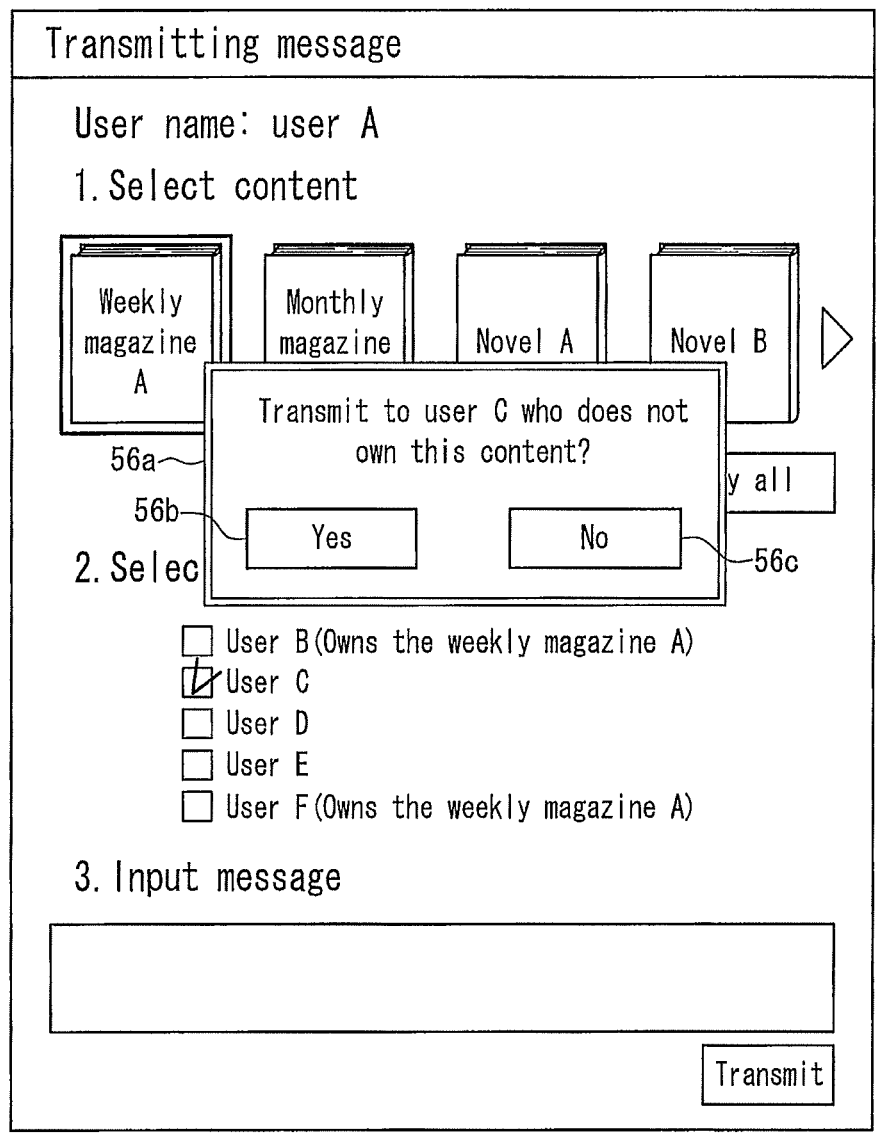
FIG. 26 is an exemplary schematic view showing a message transmission window.

When determining that the selected receiving-side user owns the cited content, the SNS server 1 transmits the message to the receiving-side user (S45). On the other hand, when determining that the selected receiving-side user does not own the cited content, the SNS server 1 causes the client terminal of the transmitting-side user to display a warning message. FIG. 26 shows an exemplary display of the warning message 56a (S46).

In the warning message 56a shown in FIG. 26, if the transmitting-side user clicks of a "Yes" button to permit the transmission (Yes at S47), the SNS server 1 transmits the message to the receiving-side user (S45). In this case, the receiving-side user can browse only objects, since he/she does not own the content cited in the message. As it is considered that contents would not be understandable with the browsing of objects alone, it is preferable that the SNS server 1 causes the receiving-side user's client terminal to display a message recommending the purchase of the cited content.

On the other hand, in the warning message 56a shown in FIG. 26, if the transmitting-side user clicks a "No" button to cancel the transmission (No at S47), the SNS server 1 stops the transmission of the message to the receiving-side user (S48).

It should be noted that a user who does not own the content has to purchase the content to browse contents in the content, but the configuration may be such that he/she may browse a sample image before the purchase. The sample image is an image having a resolution at such a level that contents cannot be grasped, for example, an image in a thumbnail size.

Though the foregoing description explains a case where contents are electronic books, this configuration can be applied to contents of other types.

[2-4. In the Case Where Receiving-Side User Owns Content as Paper Medium]

As described above, in the case where a transmitting-side user transmits a message citing a content that he/she owns to a receiving-side user who does not own the content, the receiving-side user cannot browse the content, and can browse only an object associated with the content. Even if browsing the object alone, however, it is difficult to understand the relationship with the content, and therefore it is difficult to understand contents of the object.

In the case where the receiving-side user owns a paper medium (a book) having the same contents as those of the electronic book owned by the transmitting-side user, that is, in the case where the receiving-side user does not own the electronic book, the following method is used.

[2-4-1. Method for Providing Page Information to Receiving-Side User]

Figure 27:
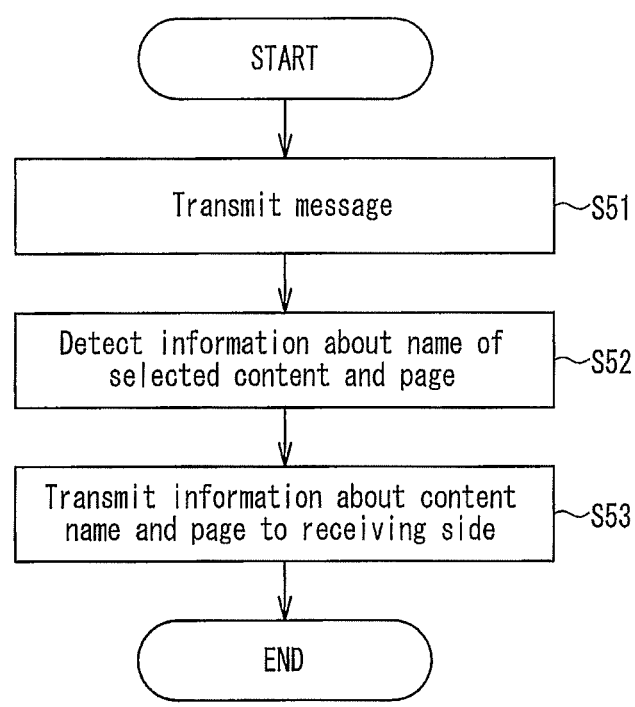
FIG. 27 is an exemplary flowchart showing operations of the communication service system when a message is transmitted to a receiving-side user who owns a content as a paper medium.

FIG. 27 shows a first example of a message transmission method in the case where the receiving-side user owns a book as a paper medium. It should be noted that the transmitting-side user owns an electronic book having the same contents as those of the book (paper medium) owned by the receiving-side user. For example, the medium type information that indicates the medium type of the content owned by the user (e.g., information indicating an electronic medium or a paper medium) is managed regarding each user in the management table shown in FIG. 8, so that the SNS server 1 can obtain the medium types (e.g., an electronic medium or a paper medium) of contents owned by the receiving-side user. It should be noted that the SNS server 1 may obtain the medium type information, by making an inquiry to the client terminal of the receiving-side user.

First, the transmitting-side user transmits a message citing a content to the receiving-side user by operating his/her client terminal. Here, the medium (e.g., an electronic medium) of the content cited in the message is assumed to be of a different type from that of a medium of the content owned by the receiving-side user (S51).

The SNS server 1 detects information of the content cited in the message transmitted from the transmitting-side user, and information of a page of the content to which an object is added. Since the information about the content and the information about the page are written in management information of the content in the case of an electronic book, the SNS server 1 reads out this management information, thereby detecting the information about the content and the information about the pages (S52).

Next, the SNS server 1 adds the detected information about the content and the detected information about the page to the message, and transmits the same to the client terminal of the receiving-side user. Here, the information about the content added to the message is preferably, for example, the title of the content (the title of the electronic book), since it makes it easy for the receiving-side user to identify the book as a paper medium (S53).

The receiving-side user opens the page concerned of the book as a paper medium that he/she owns, based on the title of the content and the information about the page that are carried on the received message, and browses the page, together with the object displayed on his/her client terminal. In this way, the association between the book as a paper medium and the object can be established, whereby the receiving-side user easily can understand the contents of the object.

The foregoing description explains a case where a display position of an object is specified with the title of the content and the information about the page, but the display positions of the object can be specified in more detail. For example, the SNS server 1 obtains coordinates of the display position of the object on the content based on operation instructions of the receiving-side user, and stores the object and content elements (e.g., images, sentences, etc. composing the content) that are present closest to the obtained coordinates in the object storage section 3 (comment holding section), in a state in which the content elements and the object are associated with each other. With this, the SNS server 1 is capable of adjusting the position information outputting form by specifying where the positions of the content elements associated with the object are on the content as a paper medium, and transmitting the adjusted position information of the content elements, together with the information about the content and the information about the page, to the receiving-side user's client terminal. For example, as the position information of the content elements, "upper right", "lower right", "upper left", "lower left", etc. in the page can be used.

The receiving-side user opens the page concerned of the book as a paper medium that he/she owns, based on the title of the content, the page information, and the position information of the content elements carried on the received message, and browses the same, together with the object displayed on the client terminal. With this, the association between the book as a paper medium and the object can be established more clearly, whereby the receiving-side user easily can understand the contents of the object.

Though the foregoing description explains a case where a content is an electronic book, this configuration can be applied to any content as long as it is a content that can be distributed as a paper medium. Examples of a content that can be distributed as a paper medium include newspapers, scores, lyrics sheets, and fingering diagrams, other than books.

[2-4-2. Method for Photographing Paper Medium and Overlaying Object on Receiving Side]

Figure 28:
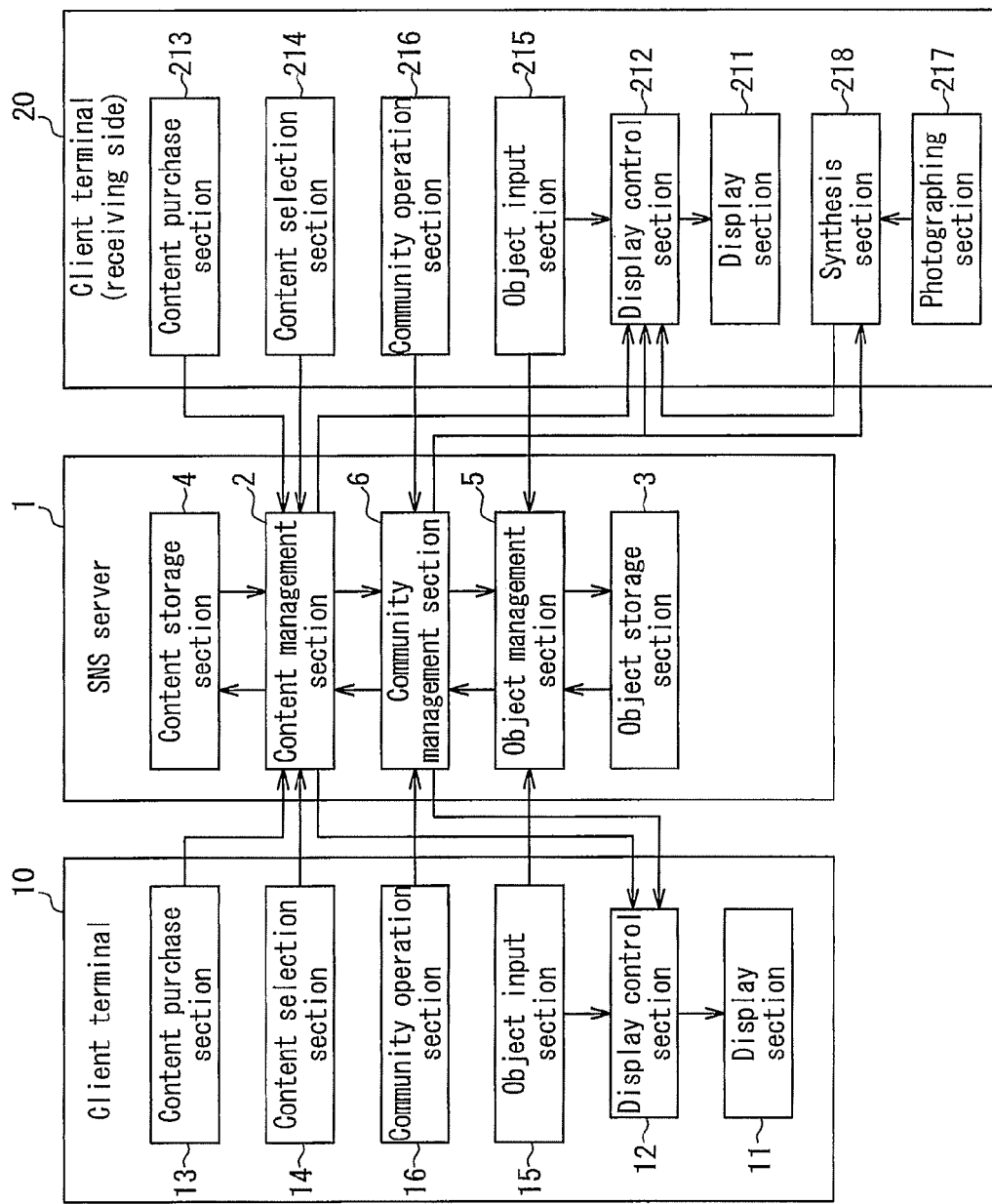
FIG. 28 is an exemplary block diagram of a communication service system that allows a message to be transmitted to a receiving-side user who owns a content as a paper medium.

FIG. 28 is a block diagram showing a configuration of a system for realizing a method for photographing a paper medium and overlaying objects. In FIG. 28, the same members as those shown in the block diagram shown in FIG. 3 are designated by the same reference numerals, and detailed descriptions of the same are omitted. The block diagram shown in FIG. 28 shows a configuration obtained by adding a receiving-side client terminal 20 to the configuration shown in the block diagram of FIG. 3.

The client terminal 20 includes a display section 211 having the same function as that of the display section 11, a display control section 212 having the same function as that of the display control section 12, a content purchase section 213 having the same function as that of the content purchase section 13, a content selection section 214 having the same function as that of the content selection section 14, an object input section 215 having the same function as that of the object input section 15, a community operation section 216 having the same function as that of the community operation section 16, a photographing section 217 capable of photographing a subject, and a synthesis section 218 for synthesizing a photographed image sent from the photographing section 217 and an object sent from the community management section 6.

Figure 29:
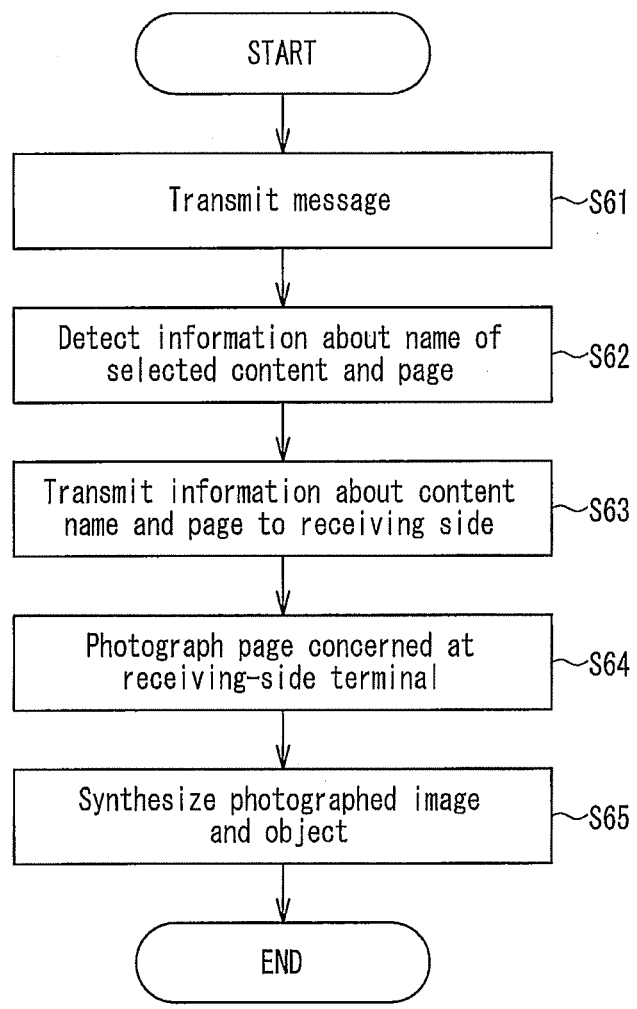
FIG. 29 is an exemplary flowchart showing operations of the communication service system when a message is transmitted to a receiving-side user who owns a content as a paper medium.

FIG. 29 shows an operation flow of the present system. Herein, operations of the present system are explained. It should be noted that the receiving-side user has a book as a paper medium, and the transmitting-side user has an electronic book having the same contents as those of the book (paper medium) owned by the receiving-side user.

First, the transmitting-side user, by operating his/her client terminal, transmits a message that cites the content to the receiving-side user. Here, the content cited in the message is assumed to be a content having the same contents as those of a book owned by the receiving-side user that is not an electronic book but a paper medium (S61).

The SNS server 1 detects information about the content cited in the message transmitted from the transmitting-side user, and a page in the content where an object is added. Since the information about the content and the information about the page are written in management information of the content in the case of an electronic book, the SNS server 1 can detect the information of the content and the information of the page by reading out this management information (S62).

Next, the SNS server 1 adds the detected information of the content and the detected information of the page to the message, and transmits the message to the receiving-side user's client terminal. The information about the content added to the message is preferably, for example, the title of the content (the title of the electronic book), since it makes it easy for the receiving-side user to identify the book. Here, the community management section 6 transmits an object associated with the detected page of the content, to the receiving-side client terminal 20 (S63).

The receiving-side user opens the pages concerned of the book as a paper medium that he/she owns, based on the title of the content and the information about the page that are carried on the received message, and photographs the page with the photographing section 217 (S64).

Next, the synthesis section 218 synthesizes the image of the page of the paper medium thus photographed with the photographing section 217 and the object transmitted from the community management section 6, thereby generating a synthetic image. The synthetic image is sent to the display control section 212. The display control section 212 causes the synthesized image to be displayed on the display section 211 (S65).

Thus, the association between the content (paper medium) and the object can be established, whereby the receiving-side user easily can understand the contents of the object.

It should be noted that the synthesis of the photographed image and the object by the synthesis section 218 may be carried out by simply overlaying them, or alternatively, by using the augmented reality technology. The "augmented reality" refers to the technology for presenting additional information in a reality environment with use of a computer, and the environment itself obtained by presenting additional information.

Though the foregoing description explains a case where a content is an electronic book, this configuration can be applied to any content as long as it is a content that can be distributed as a paper medium. Examples of a content that can be distributed as a paper medium include newspapers, scores, lyrics sheets, and fingering diagrams, other than books.

[2-4-3. Method for Photographing Paper Medium and Overlaying Object on Transmitting Side]

Figure 30:
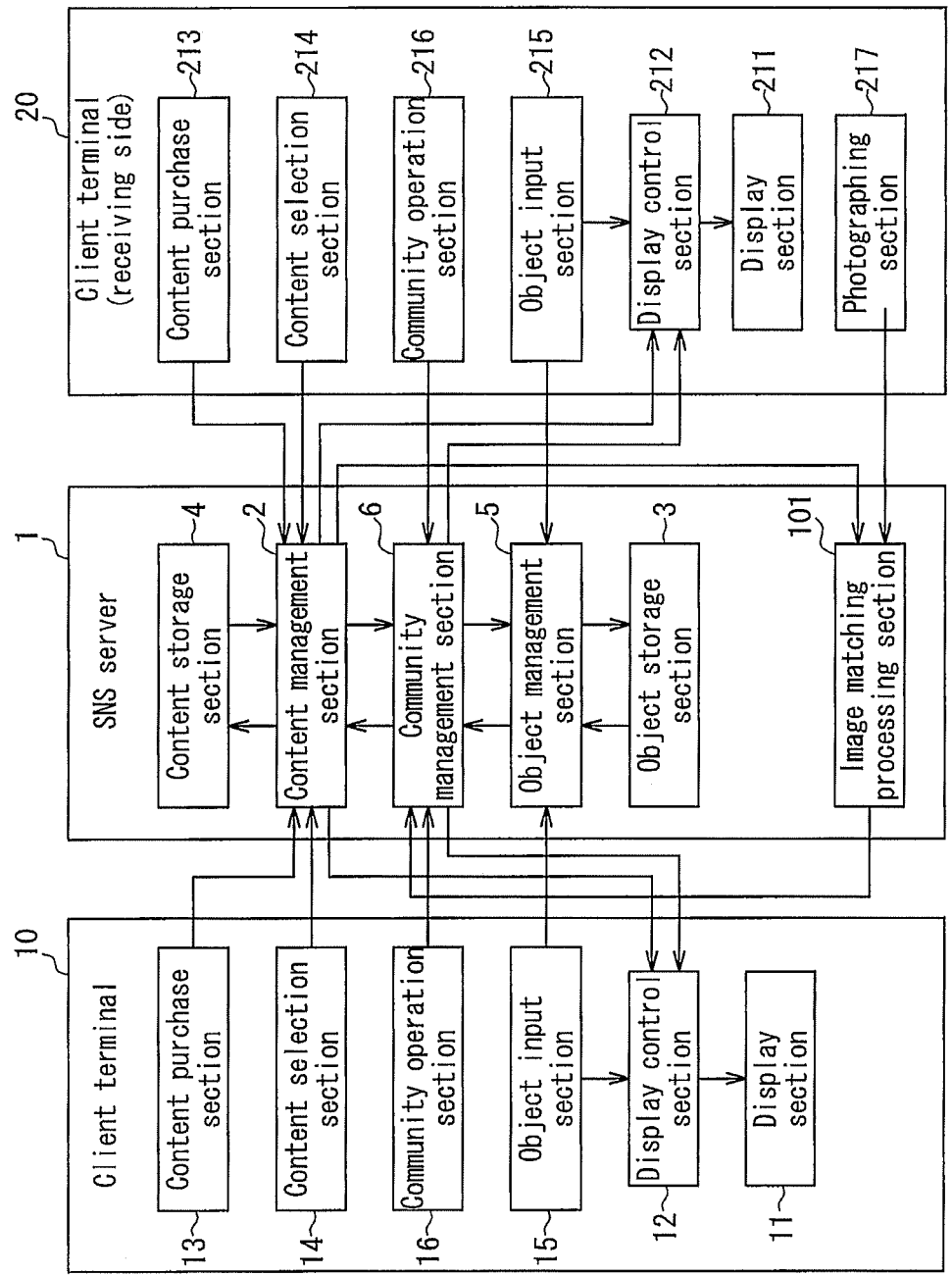
FIG. 30 is an exemplary block diagram of a communication service system that allows a message to be transmitted to a receiving-side user who owns a content as a paper medium.

FIG. 30 is a block diagram showing a configuration of a system for realizing a method for photographing a paper medium and overlaying objects on the transmitting side. The system shown in FIG. 30 is a system effective in the case where a transmitting-side user does not own an electronic book but owns a book as a paper medium, while a receiving-side user owns an electronic book having the same contents as those of the aforementioned book (paper medium).

In FIG. 30, the same members as those shown in the block diagram shown in FIG. 28 are designated by the same reference numerals, and detailed descriptions of the same are omitted. The block diagram shown in FIG. 30 shows a configuration obtained by deleting the synthesis section 218 from the block diagram shown in FIG. 28, and adding an image matching processing section 101 to the SNS server 1. The image matching processing section 101 recognizes an image photographed by the photographing section 217, and identifies a content and a page. It should be noted that in FIG. 30, the client terminal 20 is assumed to be on the transmitting side, and the client terminal 10 is assumed to be on the receiving side.

Figure 31:
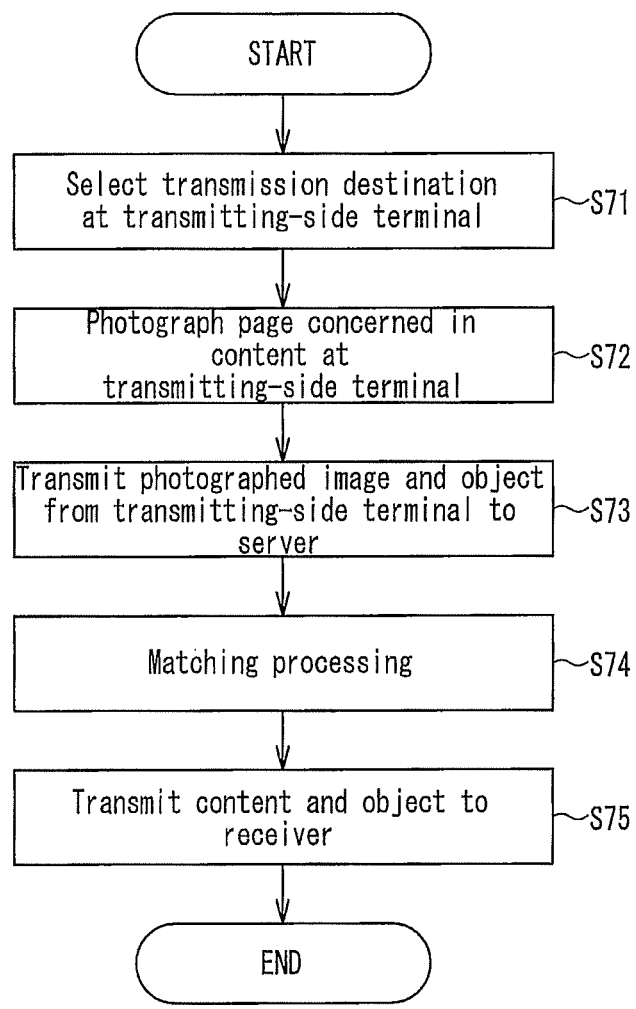
FIG. 31 is an exemplary flowchart showing operations of the communication service system when a message is transmitted to a receiving-side user who owns a content as a paper medium.

FIG. 31 is an operation flow of the present system. Herein, operations of the present system are explained.

First, the transmitting-side user selects a receiving-side user to whom he/she is to send a message, by operating the client terminal 20 (S71).

Next, the transmitting-side user photographs an arbitrary page of the book as a paper medium that he/she owns, with the photographing section 217. An image photographed is sent to the image matching processing section 101 of the SNS server 1 (S72).

Next, the transmitting-side user creates an arbitrary object by operating the object input section 215, and sends the same to the SNS server 1. The community management section 6 of the SNS server 1 sends the object transmitted from the object input section 215, to the image matching processing section 101 (S73).

The image matching processing section 101 recognizes contents of the photographed image sent from the photographing section 217, and identifies the title of the book and the page photographed by the photographing section 217. To identify the title of the book and the page, the image matching technology is used. For example, in the case where a content as an electronic book having the same contents as the photographed book is owned by the SNS server 1 (the content storage section 4), or in the case where it is possible that the user is provided with such an electronic book from the content provider, the matching processing may be performed between the contents of each page of the content and the photographed image, whereby the book and the page can be identified. The image matching processing section 101 sends the result of the matching processing to the community management section 6 (S74).

Next, the community management section 6 overlays the object associated with the identified page of the book, on the page concerned in the content (electronic book). The content (electronic book) may be a content transmitted from a content provider, or a content stored in the content storage section 4. The community management section 6, when detecting that the receiving-side user has a right for the content concerned, sends the content on which the object is overlaid to the display control section 12 of the client terminal 10. Here, it is preferable that the community management section 6 sends the content to the display control section 12, in a state in which the content is opened at the page where the object is laid (S75).

The display control section 12 causes the display section 11 to display the content sent from the community management section 6.

Thus, the association between the content (paper medium) and the object can be established, whereby the receiving-side user easily can understand contents of the object.

It should be noted that the image matching processing section 101, which identifies the page from the photographed image by using image matching processing, may further use the history of comments (objects) exchanged between the users for the further narrowing down.

Further, in the case where the user manually inputs the title of the content and the page at the transmitting-side client terminal 20, the photographing of the book by the photographing section 217 is not necessary Still further, though the foregoing description explains a case where a content is an electronic book, this configuration can be applied to any content as long as it is a content that can be distributed as a paper medium. Examples of a content that can be distributed as a paper medium include newspapers, scores, lyrics sheets, and fingering diagrams, other than books.

Further, though the foregoing description explains an operation in the case where the receiving-side user owns a book as a paper medium, communication can be made even in the case of a user having a device without a communication function or a device unable to be connected with the SNS server, using the photographing or the augmented reality technology, as is the case with the user having the paper medium.

[2-5. In the Case Where Right for Content is Extinguished]

The explanation of the present embodiment has been made on the premise that a user purchases a content, thereby obtaining a right for the content (a right for using the content as long as the copyright of the content is not infringed), but the content can be, not only purchased, but also made viewable/listenable during a limited viewing/listening period, or assigned. The right for the content is extinguished or transferred in some cases when the viewing/listening period for the content is limited or the content is assigned. For example, in the case where a user is allowed to view/listen a content during a limited viewing/listening period, the right for the content belongs to the user during a viewing/listening period preliminarily determined by a content provider. When the viewing/listening period for the content expires, the right for the content is extinguished. In the case where a user who has purchased a content assigns the content to somebody else, the right for the content is transferred from the user to the somebody to whom the content is assigned. Thus, in some cases, a right for a content is extinguished from a user, or is transferred from a user to somebody else.

In the present embodiment, if a right for a content is extinguished from a user, or a user transfers a right for a content to somebody else, the user becomes unable to continue communication that he/she has made while he/she owned the content. In the case where a user loses a right for a content, the SNS server 1 preferably notifies it to the other users who have made communication regarding the content with him/her.

Further, in the case where the user again obtains the right for the content that he/she lost once before, the SNS server 1 preferably notifies it to the other users who have made communication regarding the content with him/her.

It should be noted that the configuration is preferably such that in the case where a user loses a right of a content during conversation with another user with use of the message function, the SNS server 1 notifies it to the another user who has been in the conversation.

[3. Effects of Embodiment, Etc.]

With the present embodiment, the SNS server 1 manages information about contents owned by respective users, whereby it is possible to prevent a message from being transmitted mistakenly to a user who does not have a content.

In the case where a content owned by a transmitting-side user is not owned by a receiving-side user and the receiving-side user owns the same content as a paper medium, the SNS server 1 transmits information about the content cited in a message by the transmitting-side user and an object, to the receiving-side user. This allows the receiving-side user to refer to the content as a paper medium and the object sent from the SNS server 1, and thereby easily grasp contents of the object.

In the case where a content owned by a receiving-side user is not owned by a transmitting-side user and the transmitting-side user owns the same content as a paper medium, the SNS server 1 grasps the content as a paper medium owned by the transmitting-side user based on a photographed image of the paper medium sent from the transmitting-side user. The SNS server 1 sends the same content (electronic data) of the content as a paper medium thus grasped, together with an object, to the receiving-side user. The receiving-side user, having the right for the content, can browse the content and the object associated with the content, which are sent from the SNS server 1.

The present invention is useful for a communication service system.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A communication service system comprising a server device and a plurality of client terminals,
    wherein for each of the client terminals the server device:
        manages presence and/or absence of an authority for use of a content per client terminal,
        authorizes the client terminal that actually has the authority for use of the content to transmit an object to the server device, the object being associated with and added to a content element included in the content, the object being arranged on a different layer from that of the content, and the object being displayed in an overlaid state on the content element by overlaying the layer on the content,
        manages the object in association with the content element, and
        authorizes the client terminal that actually has the authority for use of the content to browse the content including the content element to which the object is added, and
    wherein the client terminal that actually has the authority for use of the content:
        displays the object in a vicinity of the content or in an overlaid state on the content element, and
        accepts an input of the object at a coordinate position in the vicinity of the content element or at a coordinate position overlaying on the content element, and the server device manages the object in association with the content element included in the content based on the coordinate position at which the client terminal that actually has the authority for use of the content has accepted the input of the object.

2. The communication service system according to claim 1, wherein a display area of the content and a display area of the layer coincide with each other.

3. The communication service system according to claim 1, wherein the object is displayed at a position where a user can browse the content element without obstruction.

4. The communication service system according to claim 1, comprising a plurality of the objects, wherein when a number of the objects associated with and added to the content element or an area needed for displaying the objects exceeds a threshold, the objects are narrowed down under predetermined conditions.

5. The communication service system according to claim 1, comprising a plurality of the objects, wherein when a number of the objects associated with and added to the content element or an area needed for displaying the objects exceeds a threshold, the objects are displayed by overlaying one object on another.

6. The communication service system according to claim 1, comprising a plurality of the objects, wherein when a number of the objects associated with and added to the content element or an area needed for displaying the objects exceeds a threshold, the objects are narrowed down to those inputted before a designated time.

7. The communication service system according to claim 1, comprising a plurality of the objects, wherein when a number of the objects associated with and added to the content element or an area needed for displaying the objects exceeds a threshold, the objects are displayed in a transparent or semitransparent state.

8. The communication service system according to claim 1, comprising a plurality of the objects, wherein when a number of the objects associated with and added to the content element or an area needed for displaying the objects exceeds a threshold, one of the objects is displayed as an example and the number of the objects associated with and added to the content element is displayed, and when the object displayed as an example is selected, all or some of the objects associated with and added to the content element are displayed.

9. The communication service system according to claim 1, comprising a plurality of the objects, wherein when a number of the objects associated with and added to the content element or an area needed for displaying the objects exceeds a threshold, a display style of each object is determined based on a degree of priority that is set based on attributes of each user who inputted the object.

10. The communication service system according to claim 1, wherein when the content is a moving image, the server device manages the object in association with a content element of each of a plurality of serial frames that compose the moving image.

11. The communication service system according to claim 1, wherein when the content is a moving image or a game, the server device manages the object in association with a content element included in one or more still images that compose the moving image or the game.

12. The communication service system according to claim 1, wherein the client terminal that actually has the authority for use of the content displays the object independently from the content.

13. The communication service system according to claim 12, wherein while displaying the object independently from the content, the client terminal that actually has the authority for use of the content accepts the input of another object, and the server device manages the another object accepted by the client terminal that actually has the authority for use of the content in association with a time and date of the acceptance of the input and the content element included in the content.

14. The communication service system according to claim 12, wherein the client terminal that actually has the authority for use of the content accepts, as part of the object, an input of information for citing a certain portion of the content, and the server device manages the information accepted by the client terminal that actually has the authority for use of the content and related to the certain portion of the content in association with a time and date of the acceptance of the input and the content element included in the content.

15. The communication service system according to claim 14, wherein the object includes link information for specifying a the certain portion of the content, the client terminal that actually has the authority for use of the content sends the link information to the server device when the link information is selected, and the server device specifies the certain portion of the content based on the link information and allows the client terminal that actually has the authority for use of the content to display the certain portion of the content.

16. The communication service system according to claim 1, wherein the client terminal that actually has the authority for use of the content is configured such that a first display style or a second display style can be selected when accepting the input of the object, wherein in the first display style, the client terminal that actually has the authority for use of the content displays the object in a vicinity of the content element or in an overlaid state on the content, and in the second display style, the client terminal that actually has the authority for use of the content displays the object independently from the content.

17. The communication service system according to claim 16, wherein the client terminal that actually has the authority for use of the content sends to the server device display style selection information for selecting one of the first display style and the second display style, and the server device determines a display style of the content having the content element to which the object is added.

18. The communication service system according to claim 16, comprising a plurality of the objects, wherein when a number of the objects associated with and added to the content element or an area needed for displaying the objects exceeds a threshold in the first display style, information advising switching the first display style to the second display style is displayed.

19. The communication service system according to claim 1, wherein when accepting the input of the object, the client terminal that actually has the authority for use of the content displays the object in a vicinity of the content element or in an overlaid state on the content element in a first area and displays the object independently from the content in a second area.

20. The communication service system according to claim 1, wherein the server device manages user-owned contents per users, and when one user and another user own identical or associated contents, respectively, the server device can disclose to the another user that the one user owns the identical or associated contents.

21. A communication service method using a server device and a plurality of client terminals,
wherein the server device
manages presence and/or absence of an authority for use of a content per client terminal,
authorizes the client terminal that actually has the authority for use of the content to transmit an object to the sever device, the object being associated with and added to a content element included in the content, the object being arranged on a different layer from that of the content, and the object being displayed in an overlaid state on the content element by overlaying the layer on the content,
manages the object in association with the content element included in the content, and
authorizes the client terminal that actually has the authority for use of the content to browse the content having the content element to which the object is added, and
wherein the client terminal that actually has the authority for use of the content:
displays the object in a vicinity of the content or in an overlaid state on the content element, and accepts an input of the object at a coordinate position in the vicinity of the content element or at a coordinate position overlaying on the content element, and the server device manages the object in association with the content element included in the content based on the coordinate position at which the client terminal that actually has the authority for use of the content has accepted the input of the object.

\* \* \* \* \*